United States Patent
Leone et al.

(10) Patent No.: US 7,721,710 B2
(45) Date of Patent: May 25, 2010

(54) WARM UP STRATEGY FOR ETHANOL DIRECT INJECTION PLUS GASOLINE PORT FUEL INJECTION

(75) Inventors: Thomas G. Leone, Ypsilanti, MI (US); Donald J. Lewis, Howell, MI (US); Robert A. Stein, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/210,970

(22) Filed: Sep. 15, 2008

(65) Prior Publication Data
US 2009/0070021 A1    Mar. 12, 2009

Related U.S. Application Data

(63) Continuation of application No. 11/846,373, filed on Aug. 28, 2007, now Pat. No. 7,426,925, which is a continuation of application No. 11/291,808, filed on Nov. 30, 2005, now Pat. No. 7,395,786.

(51) Int. Cl.
*F02M 43/00* (2006.01)
*F02M 25/14* (2006.01)
(52) U.S. Cl. .............. 123/431; 123/1 A; 123/576; 123/578; 123/25 C; 123/25 E
(58) Field of Classification Search ........... 123/1 A, 123/431, 575, 576, 578, 25 C, 25 E
See application file for complete search history.

(56) References Cited

U.S. PATENT DOCUMENTS

| 2,221,405 A | 11/1940 | Nallinger |
| 3,589,348 A | 6/1971 | Reichhelm |
| 3,783,849 A * | 1/1974 | Bramfitt ............ 123/576 |
| 3,794,000 A | 2/1974 | Hodgkinson |
| 4,031,864 A | 6/1977 | Crothers |
| 4,136,652 A | 1/1979 | Lee |
| 4,205,650 A | 6/1980 | Szwarcbier |
| 4,256,075 A | 3/1981 | Fukui et al. |

(Continued)

FOREIGN PATENT DOCUMENTS

EP          1057988          1/2006

(Continued)

OTHER PUBLICATIONS

U.S. Appl. No. 11/776,120, filed Jul. 11, 2007, Stein et al.

(Continued)

*Primary Examiner*—Erick Solis
(74) *Attorney, Agent, or Firm*—Allan J. Lippa; Alleman Hall McCoy Russell & Tuttle LLP

(57) ABSTRACT

A system for an engine, comprising of a cylinder of the engine; a first injector configured to inject a first substance to said cylinder; a second injector configured to inject a second substance to said cylinder; and a controller configured to commence combustion in the engine by injecting fuel into said cylinder, where said fuel is injected by only one of said first and second injectors during said start and/or warm-up.

20 Claims, 31 Drawing Sheets

U.S. PATENT DOCUMENTS

| | | | |
|---|---|---|---|
| 4,311,118 A | 1/1982 | Slagle | |
| 4,325,329 A | 4/1982 | Taylor | |
| 4,331,121 A | 5/1982 | Stokes | |
| 4,402,296 A | 9/1983 | Schwarz | |
| 4,411,243 A | 10/1983 | Hardenberg et al. | |
| 4,459,930 A | 7/1984 | Flory | |
| 4,480,616 A | 11/1984 | Takeda | |
| 4,489,596 A | 12/1984 | Linder et al. | |
| 4,502,453 A | 3/1985 | Kabasin et al. | |
| 4,558,665 A | 12/1985 | Sandberg et al. | |
| 4,590,904 A | 5/1986 | Wannenwetsch | |
| 4,648,367 A | 3/1987 | Gillbrand et al. | |
| 4,706,630 A | 11/1987 | Wineland et al. | |
| 4,810,929 A | 3/1989 | Strumbos | |
| 4,817,576 A | 4/1989 | Abe et al. | |
| 4,930,537 A | 6/1990 | Farmer | |
| 4,945,881 A | 8/1990 | Gonze et al. | |
| 4,962,789 A | 10/1990 | Benscoter | |
| 4,993,386 A | 2/1991 | Ozasa et al. | |
| 4,998,518 A | 3/1991 | Mitsumoto | |
| 5,017,826 A | 5/1991 | Oshima et al. | |
| 5,018,483 A | 5/1991 | Kashima et al. | |
| 5,044,331 A | 9/1991 | Suga et al. | |
| 5,044,344 A | 9/1991 | Tuckey et al. | |
| 5,056,490 A | 10/1991 | Kashima | |
| 5,056,494 A | 10/1991 | Kayanuma | |
| 5,060,610 A | 10/1991 | Paro | |
| 5,111,795 A | 5/1992 | Thompson | |
| 5,131,228 A | 7/1992 | Mochizuki et al. | |
| 5,174,247 A | 12/1992 | Tosa et al. | |
| 5,188,087 A | 2/1993 | Saito | |
| 5,204,630 A | 4/1993 | Seitz et al. | |
| 5,230,309 A | 7/1993 | Suga et al. | |
| 5,233,944 A | 8/1993 | Mochizuki | |
| 5,335,637 A | 8/1994 | Davis et al. | |
| 5,336,396 A | 8/1994 | Shetley | |
| 5,357,908 A * | 10/1994 | Sung et al. | 123/3 |
| 5,360,034 A | 11/1994 | Der Manuelian | |
| 5,408,979 A | 4/1995 | Backlund et al. | |
| 5,417,239 A | 5/1995 | Ford | |
| 5,469,830 A | 11/1995 | Gonzalez | |
| 5,477,836 A | 12/1995 | Hyodo et al. | |
| 5,508,582 A | 4/1996 | Sugimoto et al. | |
| 5,555,873 A * | 9/1996 | Nolen | 123/575 |
| 5,565,157 A | 10/1996 | Sugimoto et al. | |
| 5,694,908 A | 12/1997 | Hsu | |
| 5,740,784 A | 4/1998 | McKinney | |
| 5,782,092 A | 7/1998 | Schultalbers et al. | |
| 5,806,500 A | 9/1998 | Fargo et al. | |
| 5,875,743 A | 3/1999 | Dickey | |
| 5,887,566 A | 3/1999 | Glauber et al. | |
| 5,921,222 A | 7/1999 | Freeland | |
| 6,112,705 A | 9/2000 | Nakayama et al. | |
| 6,112,725 A | 9/2000 | McKinney | |
| 6,119,637 A | 9/2000 | Matthews et al. | |
| 6,189,516 B1 | 2/2001 | Hei Ma | |
| 6,213,086 B1 | 4/2001 | Chmela et al. | |
| 6,229,253 B1 | 5/2001 | Iwata et al. | |
| 6,234,123 B1 | 5/2001 | Iiyama et al. | |
| 6,318,083 B1 | 11/2001 | Machida et al. | |
| 6,325,039 B1 | 12/2001 | Goto | |
| 6,382,225 B1 | 5/2002 | Tipton | |
| 6,467,470 B1 * | 10/2002 | Carlsson et al. | 123/576 |
| 6,494,192 B1 | 12/2002 | Capshaw et al. | |
| 6,505,579 B1 | 1/2003 | Lee | |
| 6,553,974 B1 | 4/2003 | Wickman et al. | |
| 6,617,769 B2 | 9/2003 | Suzuki | |
| 6,619,242 B2 | 9/2003 | Kaneko | |
| 6,622,664 B2 | 9/2003 | Holder et al. | |
| 6,622,690 B2 | 9/2003 | Ando et al. | |
| 6,651,432 B1 | 11/2003 | Gray, Jr. | |
| 6,659,068 B2 | 12/2003 | Urushihara et al. | |
| 6,691,669 B2 | 2/2004 | Surnilla et al. | |
| 6,698,387 B1 | 3/2004 | McFarland et al. | |
| 6,711,893 B2 | 3/2004 | Ueda et al. | |
| 6,792,966 B2 | 9/2004 | Harvey | |
| 6,845,616 B2 | 1/2005 | Jauss | |
| 6,928,983 B2 | 8/2005 | Mashiki | |
| 6,951,202 B2 | 10/2005 | Oda | |
| 6,959,693 B2 | 11/2005 | Oda | |
| 6,972,093 B2 | 12/2005 | Partridge et al. | |
| 6,978,762 B2 | 12/2005 | Mori | |
| 6,988,485 B2 | 1/2006 | Ichise et al. | |
| 6,990,956 B2 | 1/2006 | Niimi | |
| 7,055,500 B2 | 6/2006 | Miyashita et al. | |
| 7,082,926 B2 | 8/2006 | Sadakane et al. | |
| 7,159,568 B1 * | 1/2007 | Lewis et al. | 123/431 |
| 7,178,503 B1 | 2/2007 | Brehob | |
| 7,225,787 B2 | 6/2007 | Bromberg et al. | |
| 7,255,080 B1 | 8/2007 | Leone | |
| 7,261,064 B2 | 8/2007 | Bhaisora et al. | |
| 7,278,396 B2 | 10/2007 | Leone et al. | |
| 7,287,492 B2 | 10/2007 | Leone et al. | |
| 7,287,509 B1 | 10/2007 | Brehob | |
| 7,293,552 B2 | 11/2007 | Leone et al. | |
| 7,302,933 B2 | 12/2007 | Kerns | |
| 7,395,786 B2 * | 7/2008 | Leone et al. | 123/1 A |
| 7,412,966 B2 * | 8/2008 | Lewis et al. | 123/431 |
| 7,428,895 B2 | 9/2008 | Leone et al. | |
| 7,444,987 B2 * | 11/2008 | Cohn et al. | 123/431 |
| 7,546,835 B1 * | 6/2009 | Hilditch | 123/575 |
| 2001/0035215 A1 | 11/2001 | Tipton | |
| 2003/0089337 A1 | 5/2003 | Cohn et al. | |
| 2003/0127072 A1 * | 7/2003 | Gmelin et al. | 123/431 |
| 2004/0035395 A1 | 2/2004 | Heywood et al. | |
| 2004/0065274 A1 | 4/2004 | Cohn et al. | |
| 2004/0083717 A1 | 5/2004 | Zhu et al. | |
| 2004/0250790 A1 | 12/2004 | Heywood et al. | |
| 2004/0261763 A1 | 12/2004 | Hashimoto et al. | |
| 2005/0051135 A1 | 3/2005 | Tomoda et al. | |
| 2005/0066939 A1 | 3/2005 | Shimada et al. | |
| 2005/0097888 A1 | 5/2005 | Miyashita | |
| 2005/0103285 A1 | 5/2005 | Oda | |
| 2005/0109316 A1 | 5/2005 | Oda | |
| 2005/0109319 A1 | 5/2005 | Oda | |
| 2005/0155577 A1 | 7/2005 | Ichise et al. | |
| 2005/0155578 A1 | 7/2005 | Ichise et al. | |
| 2005/0166896 A1 | 8/2005 | Sadakane | |
| 2005/0172931 A1 * | 8/2005 | Mori | 123/305 |
| 2005/0178356 A1 | 8/2005 | Shibagaki | |
| 2005/0178360 A1 | 8/2005 | Satou | |
| 2005/0183698 A1 | 8/2005 | Yonezawa | |
| 2005/0235959 A1 * | 10/2005 | Sadakane et al. | 123/431 |
| 2005/0274353 A1 | 12/2005 | Okubo et al. | |
| 2006/0016429 A1 | 1/2006 | Mashiki | |
| 2006/0075991 A1 | 4/2006 | Heywood et al. | |
| 2006/0090732 A1 | 5/2006 | Shibagaki | |
| 2006/0102136 A1 | 5/2006 | Bromberg et al. | |
| 2006/0102145 A1 * | 5/2006 | Cohn et al. | 123/406.29 |
| 2006/0102146 A1 * | 5/2006 | Cohn et al. | 123/406.29 |
| 2006/0180099 A1 | 8/2006 | Aimoto et al. | |
| 2006/0191727 A1 | 8/2006 | Usami et al. | |
| 2007/0028861 A1 | 2/2007 | Kamio et al. | |
| 2007/0028905 A1 | 2/2007 | Shinagawa et al. | |
| 2007/0034192 A1 | 2/2007 | Kamio et al. | |
| 2007/0119391 A1 | 5/2007 | Fried et al. | |
| 2007/0119392 A1 | 5/2007 | Leone et al. | |
| 2007/0119394 A1 | 5/2007 | Leone | |
| 2007/0119412 A1 | 5/2007 | Leone et al. | |
| 2007/0119413 A1 | 5/2007 | Lewis et al. | |
| 2007/0119414 A1 | 5/2007 | Leone et al. | |
| 2007/0119415 A1 | 5/2007 | Lewis et al. | |
| 2007/0119416 A1 | 5/2007 | Boyarski | |
| 2007/0119421 A1 | 5/2007 | Lewis et al. | |

| | | | |
|---|---|---|---|
| 2007/0119422 | A1 | 5/2007 | Lewis et al. |
| 2007/0119425 | A1 | 5/2007 | Lewis et al. |
| 2007/0204813 | A1 | 9/2007 | Arai et al. |
| 2007/0215069 | A1 | 9/2007 | Leone |
| 2007/0215071 | A1 | 9/2007 | Dearth et al. |
| 2007/0215072 | A1 | 9/2007 | Dearth et al. |
| 2007/0215101 | A1 | 9/2007 | Russell et al. |
| 2007/0215102 | A1 | 9/2007 | Russell et al. |
| 2007/0215104 | A1 | 9/2007 | Hahn |
| 2007/0215110 | A1 | 9/2007 | Stein et al. |
| 2007/0215111 | A1 | 9/2007 | Surnilla |
| 2007/0215125 | A1 | 9/2007 | Dearth et al. |
| 2007/0215127 | A1 | 9/2007 | Dearth et al. |
| 2007/0215130 | A1 | 9/2007 | Shelby et al. |
| 2007/0219674 | A1 | 9/2007 | Leone |
| 2007/0219701 | A1 | 9/2007 | Hashimoto et al. |
| 2007/0221163 | A1 | 9/2007 | Kamio |
| 2007/0234976 | A1 | 10/2007 | Dearth et al. |
| 2007/0289573 | A1 | 12/2007 | Leone et al. |
| 2007/0295307 | A1 | 12/2007 | Kerns |
| 2008/0035106 | A1 | 2/2008 | Stein |
| 2008/0041334 | A1 | 2/2008 | Brehob |
| 2008/0046161 | A1 | 2/2008 | Blumberg et al. |
| 2008/0053399 | A1 | 3/2008 | Bromberg et al. |
| 2008/0072881 | A1 | 3/2008 | Leone et al. |
| 2008/0127933 | A1 | 6/2008 | Blumberg et al. |
| 2008/0156303 | A1 | 7/2008 | Bromberg et al. |
| 2008/0173278 | A1 | 7/2008 | Bromberg et al. |

FOREIGN PATENT DOCUMENTS

| | | |
|---|---|---|
| JP | 61065066 | 4/1986 |
| JP | 2007/056754 | 3/2007 |
| WO | 2004/097198 | 11/2004 |
| WO | 2006/055540 | 5/2006 |
| WO | 2007/106354 | 9/2007 |
| WO | 2007/106416 | 9/2007 |

OTHER PUBLICATIONS

U.S. Appl. No. 11/871,496, filed Oct. 12, 2007, Zubeck et al.
U.S. Appl. No. 11/955,246, filed Dec. 12, 2007, Pursifull et al.
U.S. Appl. No. 11/962,683, filed Dec. 21, 2007, Pursifull et al.
U.S. Appl. No. 12/014,952, filed Jan. 16, 2008, Leone et al.
U.S. Appl. No. 12/048,395, filed Mar. 14, 2008, Boyarski.
U.S. Appl. No. 12/117,167, filed May 8, 2008, Leone et al.
U.S. Appl. No. 12/145,110, filed Jun. 24, 2008, Lewis et al.
U.S. Appl. No. 12/176,832, filed Jul. 21, 2008, Lewis et al.
Bromberg, V. et al., "Calculations of Knock Suppressions in Highly Turbocharged Gasoline/Ethanol Engines Using Direct Ethanol Injection", Jul. 7, 2005, Massachusetts Institute of Technology.
Brusca, S. et al., "Water Injection in IC-SI Engines to Control Detonation and to Reduce Pollutant Emissions", SAE Technical Paper No. 2003-01-1912, May 19-22, 2003.
Cohn, D.R. et al., "Direct Injection Ethanol Boosted Gasoline Engines: Biofuel Leveraging for Cost Effective Reduction of Oil Dependence and CO2 Emissions", Mar. 15, 2005, Massachusetts Institute of Technology.
Hunter, M. Park, "1962 Oldsmobile Jetfire," originally appeared in Special Interest Autos, Apr. 1996, http://www.tctc.com/~park/mph/pageCLIP/page62JET/62jet.htm, Nov. 7, 2006.
Russ, Stephen "A Review of the Effect of Engine Operating Conditions on Borderline Knock", SAE Technical Paper Series 960497, Feb. 26-29, 1996.
Vance, Bill, "Turbocharger Boosted Engine's Efficiency: Developed to maintain high-altitude performance," for the Calgary Herald Edmonton, www.ucalgary.ca/~csimpson/Articles/JetFire.html, Nov. 7, 2006.

* cited by examiner

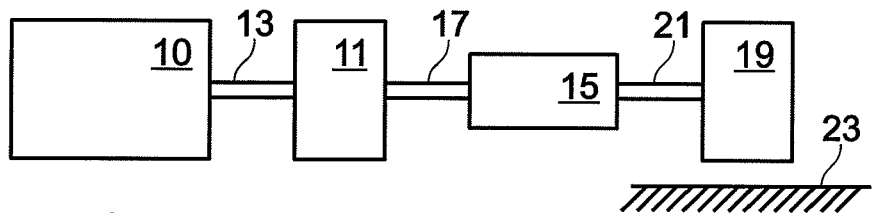
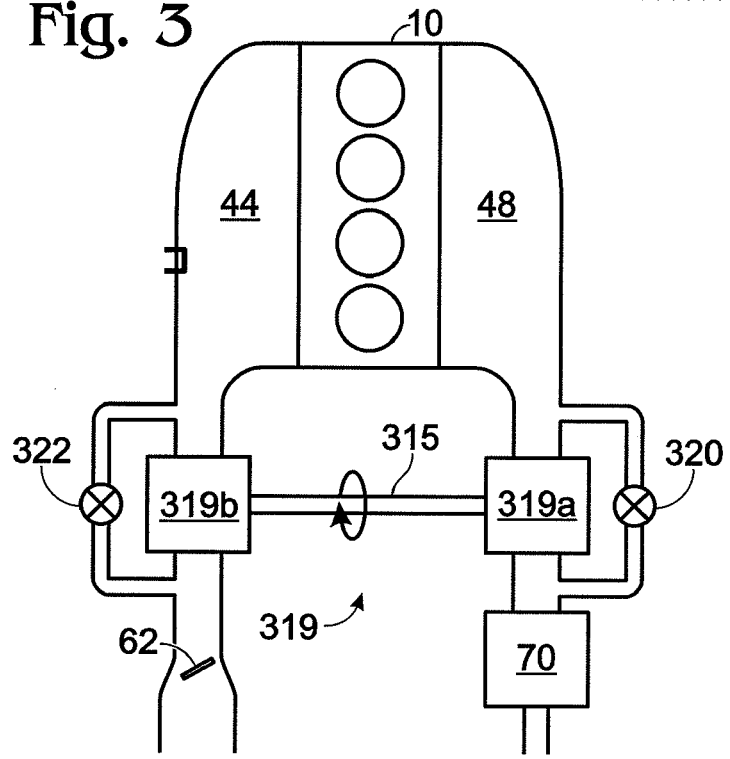
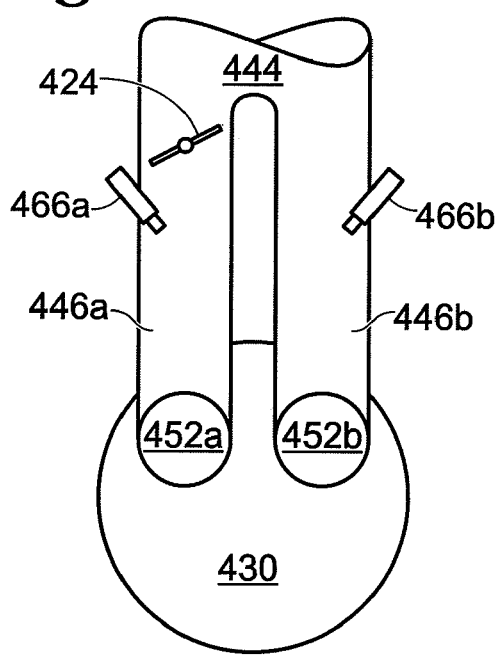
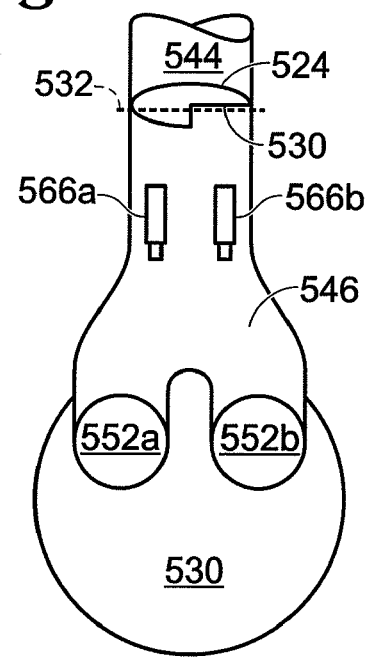

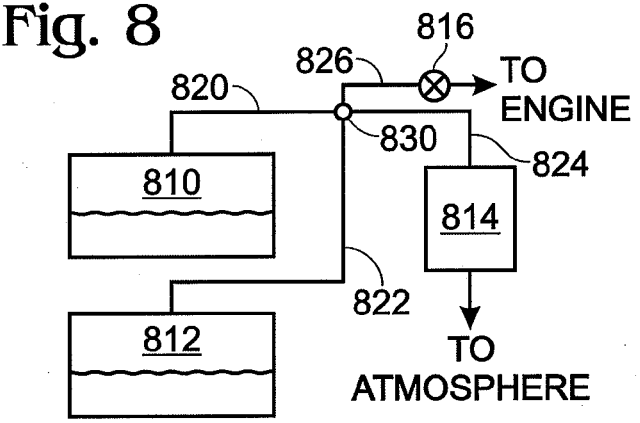
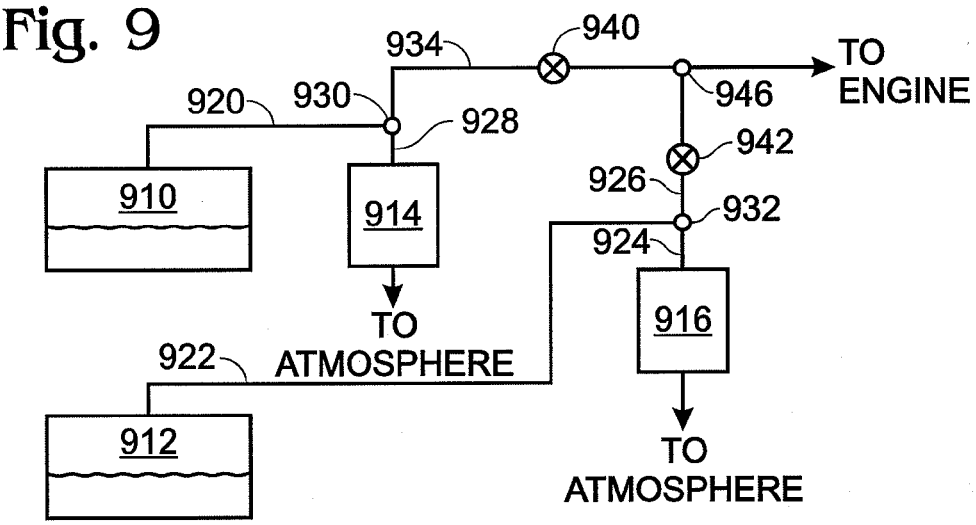
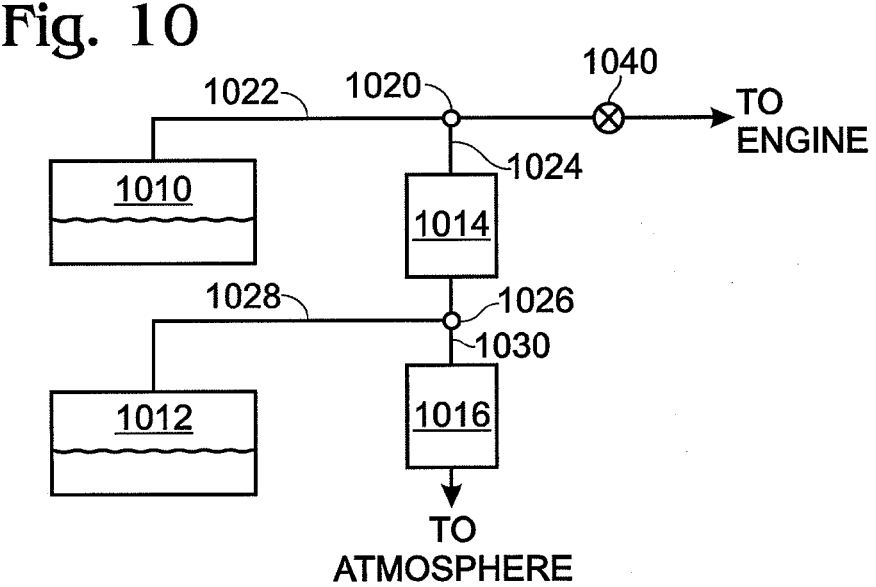

TO Fig. 14B

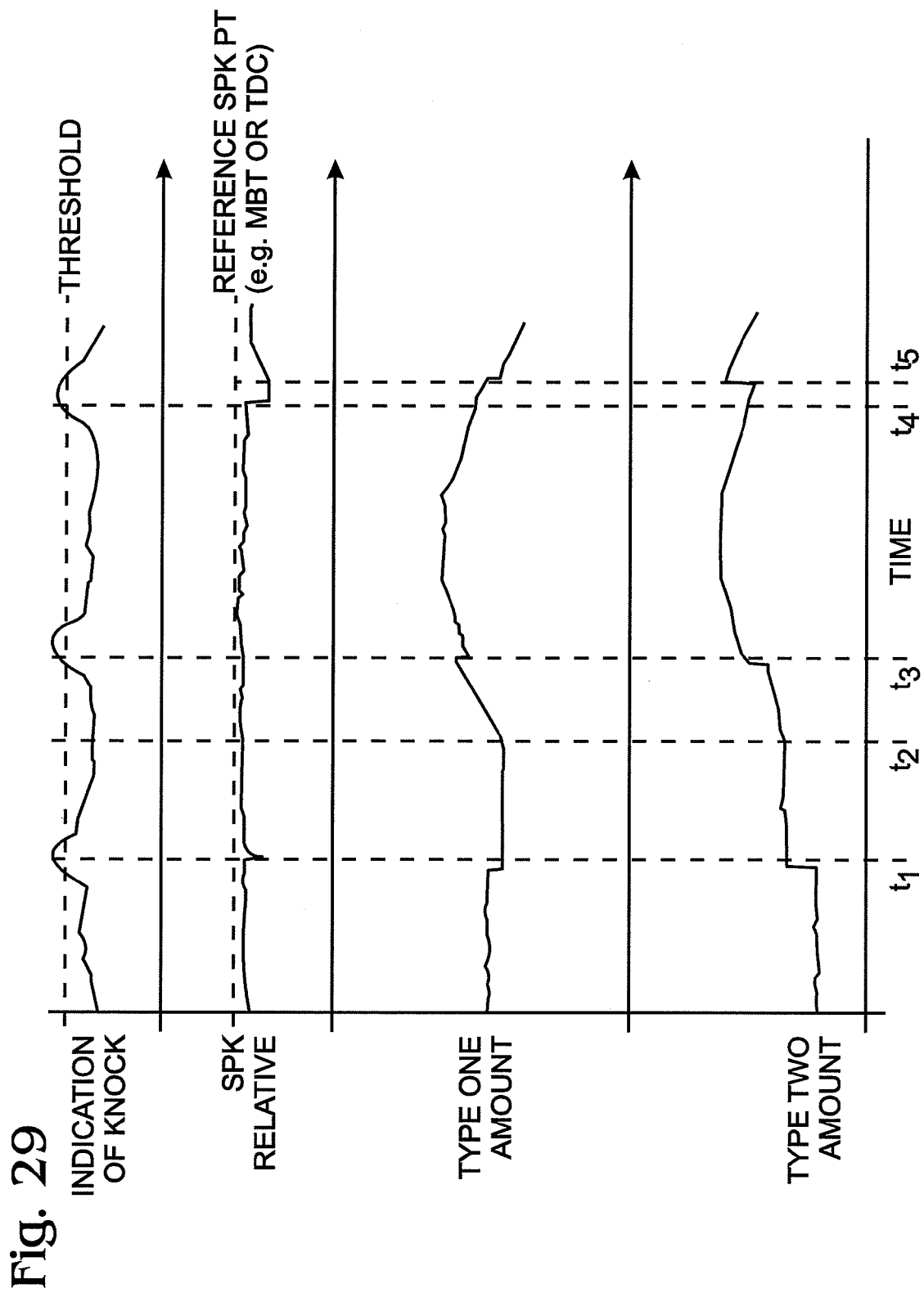

WARM UP STRATEGY FOR ETHANOL DIRECT INJECTION PLUS GASOLINE PORT FUEL INJECTION

The present application is a continuation of U.S. patent application Ser. No. 11/846,373, titled "Warm Up Strategy for Ethanol Direct Injection Plus Gasoline Port Fuel Injection," filed Aug. 28, 2007 now U.S. Pat. No. 7,426,925, which is a continuation of U.S. patent application Ser. No. 11/291,808, filed Nov. 30, 2005 now U.S. Pat. No. 7,395,786, the entire contents of each incorporated herein by reference.

BACKGROUND AND SUMMARY

Engines may use various forms of fuel delivery to provide a desired amount of fuel for combustion in each cylinder. One type of fuel delivery uses a port injector for each cylinder to deliver fuel to respective cylinders. Still another type of fuel delivery uses a direct injector for each cylinder.

Engines have also been described using more than one injector to provide fuel to a single cylinder in an attempt to improve engine performance. Specifically, in US 2005/0155578 an engine is described using a port fuel injector and a direct injector in each cylinder of the engine.

Another approach utilizing multiple injection locations for different fuel types is described in the papers titled "Calculations of Knock Suppression in Highly Turbocharged Gasoline/Ethanol Engines Using Direct Ethanol Injection" and "Direct Injection Ethanol Boosted Gasoline Engine: Biofuel Leveraging for Cost Effective Reduction of Oil Dependence and CO2 Emissions" by Heywood et al. Specifically, the Heywood et al. papers describe directly injecting ethanol to improve charge cooling effects, while relying on port injected gasoline for providing the majority of combusted fuel over a drive cycle.

However, the inventors herein have recognized several issues with such systems. For example, warmed-up engine operation may be optimized for various speed or load ranges by using multiple injectors per cylinder to each inject a portion of total fuel to give improved operation. However, when such speeds or loads are encountered during engine starting or warm-up, degraded operation may result due to effects on fuel injection and combustion caused by engine run-up, cold cylinder or valve temperatures, and other factors.

Thus, in one approach, a system is provided for an engine, comprising: a cylinder of the engine; a first injector configured to inject a first substance for said cylinder; a second injector configured to inject a second substance for said cylinder; a controller configured to commence combustion in the engine by injecting fuel for said cylinder, where said fuel is injected by only one of said first and second injectors during said start and warm-up.

In this way, it is possible to reduce the effects of degraded engine starting and warm-up under various operating conditions by using the injector most suited to the specific conditions of the start and warm-up, such as reduced engine temperature, reduced air temperature, or reduced barometric pressure.

In another approach, a system for an engine is provided, comprising: a cylinder of the engine; an injector configured to inject a mixture of gasoline and an alcohol for said cylinder; and a controller configured to vary a relative amount of said gasoline and alcohol to increase an amount of gasoline combusted in the engine during engine starting and warm-up. In this way, it is possible to provide improved engine starting and warm-up by preferentially using gasoline, at least under some conditions, to compensate for reduced engine temperature and other factors.

DESCRIPTION OF THE DRAWINGS

FIG. 1 is a block diagram of a vehicle illustrating various components of the powertrain system;

FIG. 3 shows an engine with a turbocharger;

FIGS. 4-5 show example engine cylinder and port configurations;

FIGS. 8-10 shows fuel vapor purge system configurations;

FIGS. 16-18 show high level flow charts for engine starting and running operation;

FIG. 29 shows graphs illustrating example knock control operation;

DETAILED DESCRIPTION

Figure 2:
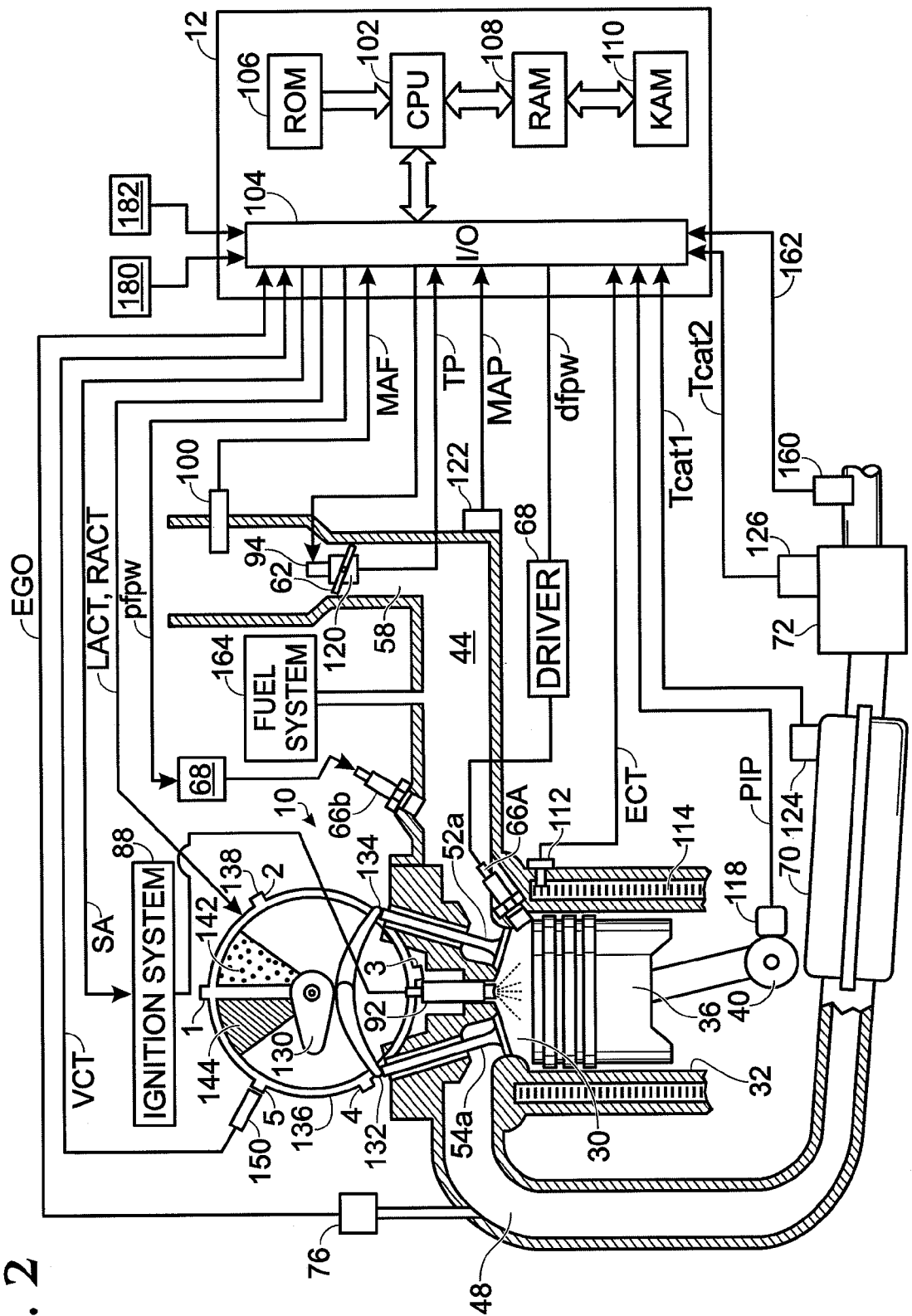
FIG. 2 shows a partial engine view.

Referring to FIG. 1, in this example, internal combustion engine 10, further described herein with particular reference to FIGS. 2 and 3, is shown coupled to torque converter 11 via crankshaft 13. Torque converter 11 is also coupled to transmission 15 via turbine shaft 17. Torque converter 11 has a bypass, or lock-up clutch 14 which can be engaged, disengaged, or partially engaged. When the clutch is either disengaged or partially engaged, the torque converter is said to be in an unlocked state. The lock-up clutch 14 can be actuated electrically, hydraulically, or electro-hydraulically, for example. The lock-up clutch 14 receives a control signal (not shown) from the controller, described in more detail below. The control signal may be a pulse width modulated signal to engage, partially engage, and disengage, the clutch based on engine, vehicle, and/or transmission operating conditions. Turbine shaft 17 is also known as transmission input shaft. Transmission 15 comprises an electronically controlled transmission with a plurality of selectable discrete gear ratios. Transmission 15 also comprises various other gears, such as, for example, a final drive ratio (not shown). Transmission 15 is also coupled to tire 19 via axle 21. Tire 19 interfaces the vehicle (not shown) to the road 23. Note that in one example embodiment, this powertrain is coupled in a passenger vehicle that travels on the road.

In an alternative embodiment, a manual transmission operated by a driver with a clutch may be used. Further, various types of automatic transmissions may be used.

FIG. 2 shows one cylinder of a multi-cylinder engine, as well as the intake and exhaust path connected to that cylinder. In the embodiment shown in FIG. 2, engine 10 is capable of using two different fuels, and/or two different injectors in one example. For example, engine 10 may use gasoline and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gas), etc. In another example, two fuel systems are used, but each uses the same fuel, such as gasoline. In still another embodiment, a single injector (such as a direct injector) may be used to inject a mixture of gasoline and such an alcohol based fuel, where the ratio of the two fuel quantities in the mixture may be adjusted by controller 12 via a mixing valve, for example. In still another example, two different injectors for each cylinder are used, such as port and direct injectors. In even another embodiment, different sized injectors, in addition to different locations and different fuels, may be used.

As will be described in more detail below, various advantageous results may be obtained by various of the above systems. For example, when using both gasoline and a fuel having alcohol (e.g., ethanol), it may be possible to adjust the relative amounts of the fuels to take advantage of the increased charge cooling of alcohol fuels (e.g., via direct injection) to reduce the tendency of knock. This phenomenon, combined with increased compression ratio, and/or boosting and/or engine downsizing, can then be used to obtain large fuel economy benefits (by reducing the knock limitations on the engine).

FIG. 2 shows one example fuel system with two fuel injectors per cylinder, for at least one cylinder. Further, each cylinder may have two fuel injectors. The two injectors may be configured in various locations, such as two port injectors, one port injector and one direct injector (as shown in FIG. 2), or others.

Also, as described herein, there are various configurations of the cylinders, fuel injectors, and exhaust system, as well as various configuration for the fuel vapor purging system and exhaust gas oxygen sensor locations.

Continuing with FIG. 2, it shows a dual injection system, where engine 10 has both direct and port fuel injection, as well as spark ignition. Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

In one particular example, piston 36 may include a recess or bowl (not shown) to help in forming stratified charges of air and fuel, if desired. However, in an alternative embodiment, a flat piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

Fuel injector 66A is shown directly coupled to combustion chamber 30 for delivering injected fuel directly therein in proportion to the pulse width of signal dfpw received from controller 12 via electronic driver 68. While FIG. 2 shows injector 66A as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing.

Fuel may be delivered to fuel injector 66A by a high pressure fuel system (not shown) including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank (or tanks) may (each) have a pressure transducer providing a signal to controller 12.

Fuel injector 66B is shown coupled to intake manifold 44, rather than directly to cylinder 30. Fuel injector 66B delivers injected fuel in proportion to the pulse width of signal pfpw received from controller 12 via electronic driver 68. Note that a single driver 68 may be used for both fuel injection systems, or multiple drivers may be used. Fuel system 164 is also shown in schematic form delivering vapors to intake manifold 44. Various fuel systems and fuel vapor purge systems may be used, such as those described below herein with regard to FIGS. 8-10, for example.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. Further details of air-fuel ratio control are included herein.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66A during a compression stroke. In another example, a homogenous mixture may be formed by operating one or both of injectors 66A and 66B during an intake stroke (which may be open valve injection). In yet another example, a homogenous mixture may be formed by operating one or both of injectors 66A and 66B before an intake stroke (which may be closed valve injection). In still other examples, multiple injections from one or both of injectors 66A and 66B may be used during one or more strokes (e.g., intake, compression, exhaust, etc.). Even further examples may be where different injection timings and mixture formations are used under different conditions, as described below.

Controller 12 can control the amount of fuel delivered by fuel injectors 66A and 66B so that the homogeneous, stratified, or combined homogenous/stratified air/fuel mixture in chamber 30 can be selected to be at stoichiometry, a value rich of stoichiometry, or a value lean of stoichiometry.

Emission control device 72 is shown positioned downstream of catalytic converter 70. Emission control device 72 may be a three-way catalyst or a NOx trap, or combinations thereof.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In a one example, sensor 118, which is also used as an engine speed sensor, produces a predetermined number of equally spaced pulses every revolution of the crankshaft.

In this particular example, temperature Tcat1 of catalytic converter 70 is provided by temperature sensor 124 and temperature Tcat2 of emission control device 72 is provided by temperature sensor 126. In an alternate embodiment, temperature Tcat1 and temperature Tcat2 may be inferred from engine operation.

Continuing with FIG. 2, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

While this example shows a system in which the intake and exhaust valve timing are controlled concurrently, variable intake cam timing, variable exhaust cam timing, dual independent variable cam timing, or fixed cam timing may be used. Further, variable valve lift may also be used. Further, camshaft profile switching may be used to provide different cam profiles under different operating conditions. Further still, the valvetrain may be roller finger follower, direct acting mechanical bucket, electromechanical, electrohydraulic, or other alternatives to rocker arms.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of oxygen concentration in the exhaust gas via signal 162, which provides controller 12 a voltage indicative of the O2 concentration. For example, sensor 160 can be a HEGO, UEGO, EGO, or other type of exhaust gas sensor. Also note that, as described above with regard to sensor 76, sensor 160 can correspond to various different sensors.

As described above, FIG. 2 merely shows one cylinder of a multi-cylinder engine, and that each cylinder has its own set of intake/exhaust valves, fuel injectors, spark plugs, etc.

Also, in the example embodiments described herein, the engine may be coupled to a starter motor (not shown) for starting the engine. The starter motor may be powered when the driver turns a key in the ignition switch on the steering column, for example. The starter is disengaged after engine starting, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 44 via an EGR valve (not shown). Alternatively, a portion of combustion gases may be retained in the combustion chambers by controlling exhaust valve timing.

As noted above, engine 10 may operate in various modes, including lean operation, rich operation, and "near stoichiometric" operation. "Near stoichiometric" operation can refer to oscillatory operation around the stoichiometric air fuel ratio. Typically, this oscillatory operation is governed by feedback from exhaust gas oxygen sensors. In this near stoichiometric operating mode, the engine may be operated within approximately one air-fuel ratio of the stoichiometric air-fuel ratio. This oscillatory operation is typically on the order of 1 Hz, but can vary faster and slower than 1 Hz. Further, the amplitude of the oscillations are typically within 1 a/f ratio of stoichiometry, but can be greater than 1 a/f ratio under various operating conditions. Note that this oscillation does not have to be symmetrical in amplitude or time. Further note that an air-fuel bias can be included, where the bias is adjusted slightly lean, or rich, of stoichiometry (e.g., within 1 a/f ratio of stoichiometry). Also note that this bias and the lean and rich oscillations can be governed by an estimate of the amount of oxygen stored in upstream and/or downstream three way catalysts.

As described below, feedback air-fuel ratio control is used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) can be adjusted based on a desired air-fuel ratio and the air-fuel ratio from the sensor. Further still, individual cylinder air-fuel ratio control could be used, if desired. As described in more detail below, adjustments may be made with injector 66A, 66B, or combinations therefore depending on various factors.

Also note that various methods can be used to maintain the desired torque such as, for example, adjusting ignition timing, throttle position, variable cam timing position, exhaust gas recirculation amount, and number of cylinders carrying out combustion. Further, these variables can be individually adjusted for each cylinder to maintain cylinder balance among all the cylinders.

Referring now to FIG. 3, an example engine 10 is shown with four in-line cylinders. In one embodiment, engine 10 may have a turbocharger 319, which has a turbine 319a coupled in the exhaust manifold 48 and a compressor 319b coupled in the intake manifold 44. While FIG. 3 does not show an intercooler, one may optionally be used. Turbine 319a is typically coupled to compressor 319b via a drive shaft 315. Various types of turbochargers and arrangements may be used. For example, a variable geometry turbocharger (VGT) may be used where the geometry of the turbine and/or compressor may be varied during engine operation by controller 12. Alternately, or in addition, a variable nozzle turbocharger (VNT) may be used when a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as a waste gate valve. FIG. 3 shows an example bypass valve 320 around turbine 319a and an example bypass valve 322 around compressor 319b, where each valve may be controller via controller 12. As noted above, the valves may be located within the turbine or compressor, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.). Further, a supercharger may be used, if desired.

Referring now to FIG. 4, an alternative embodiment of engine 10 is shown with two port fuel injectors per cylinder for cylinders with three or more valves (e.g., two or more intake valves, such as a 3-valve engine or a 4-valve engine). Even though this example utilizes port injection, it may still be possible to exploit increased charge cooling effects of various fuels (such as ethanol, gasoline, mixtures thereof, etc). For example, in some cases, port injection can attain some charge cooling benefits at wide-open throttle conditions by using open valve injection (OVI). However, since an additional injector is supplied, the wide-open throttle OVI benefit may not be reduced by the need to design single port-injector systems to satisfy other constraints, such as: control at low fuel flows, cold start fuel behavior, and transient fuel behavior (usually with closed-valve injection). Thus, by using two fuel injectors it is possible to better exploit open valve injection, while still retaining desired functionality during various operating conditions.

As one example, since two injectors are used, they may each be designed with smaller valve flows/openings so that under low load conditions it may be possible to provide more accurate quantity control (e.g., by using only one of the injectors).

As another example, when using different fuels for two the injectors (e.g., one injecting gasoline and one injecting a fuel having an alcohol component, such as ethanol or E85) many of the above system constraints can be satisfied. For example, by using separate port injectors for fuels with alcohol (e.g., ethanol) and gasoline, and using the alcohol injector at higher loads when the engine is warmed up, some of the constraints at low fuel flow and cold start are avoided for the alcohol injector. Further, if the alcohol injector is operated with OVI timing, or at least partial OVI timing, then transient fuel problems may also be reduced for the ethanol injector.

Additionally, using OVI timing (at least under some conditions) allows the alcohol injector spray pattern and targeting to be optimized for OVI. The spray could be much narrower angle than for the gasoline port injector, to increase the probability that most of the fuel enters the cylinder as a liquid, instead of evaporating from intake port and intake valve metal surfaces. This would increase the evaporative cooling benefit in a manner similar to direct injection. Also, the injector targeting may be selected to reduce bore wash issues, in which liquid fuel washes oil off cylinder walls, potentially causing excessive wear.

In this way, in some cases, it may be possible to achieve advantageous results without requiring direct injection. For example, by using two port fuel injectors per cylinder it may be possible to reduce system cost, reduce required fuel rail pressure (high fuel rail pressure can reduce fuel economy due to parasitic losses of the fuel pump), and reduce packaging issues (direct injection may require compromised valve sizes and/or angles, intake or exhaust port shapes, etc.).

Specifically, FIG. 4 shows a cylinder 430 with two intake ports 446a and 446b of intake manifold 444 coupled respectively to intake valves 452a and 452b. A first injector 466A is coupled in port 446a, and a second injector 466B is coupled in port 446b. If desired, valve 424 may be used to deactivate port 446a under selected engine speed, load, and/or temperature conditions. Alternatively, a charge motion control valve may be used, if desired.

While FIG. 4 shows injector 466a downstream of valve 424, it may also be placed upstream of valve 424 in an alternative embodiment.

In one embodiment, injector 466A injects a fuel having alcohol, such as ethanol, methanol, or a mixture of gasoline with an alcohol (e.g., E85, M85, or other such blends and ratios), while injector 466B injects gasoline. The gasoline injection may be performed at least partially during conditions when valve 452b is open. Alternatively, gasoline injection from injector 466B may be performed at least partially during conditions when valve 452b is closed. In still another example, gasoline injection from injector 466B may be performed at least partially during conditions when valve 452b is closed and at least partially during conditions when valve 452b is open. In yet another example, under some conditions open valve injection may be used while in other conditions closed valve injection may be used. Thus, the two injectors may be of a different type due to physical location, type of substance being injected, operating strategy, etc.

In one example, the valve 424 may be adjusted to reduce airflow (i.e., made more closed) under lower engine load conditions where fuel is primarily provided by injector 466B. While a single valve is shown, multiple valves may be used if desired. Also, each cylinder may have such a valve, and each of such valves may be controlled by a single actuation. In this way, it is possible to position a valve to obtain the desired flow for the injectors that are active under different conditions.

Referring now to FIG. 5, it shows a cylinder 530 with a single intake port 546 of intake manifold 544 coupled respectively to intake valves 552a and 552b. A first injector 566A and a second injector 566B are coupled to port 546. If desired, valve 524 may be a charge motion control valve which restricts flow around injector 566A to a greater extent than injector 566B under selected engine speed, load, and/or temperature conditions. Again, injector 566A injects a fuel having alcohol, such as ethanol, methanol, or a mixture of gasoline with an alcohol (e.g., E85, M85, or other such blends and ratios), while injector 566B injects gasoline. Thus, the two injectors may be of a different type due to physical location, type of substance being injected, mixture of substance being injected, heat of vaporization of substance being injected, or operating strategy, etc.

FIG. 5 shows valve 524 being an elliptical valve with an asymmetric notch 530 removed from the plate. The notch provides airflow near injector 566B whether the valve is open, closed, or partially open/closed, yet can restrict airflow to a greater extent near injector 566A. The valve rotates about an axis 532 in response to actuation by controller 12.

By adjusting valve 424 (or 524), it is possible to take advantage of the fact that at high loads, both ethanol injection and open (or partially open) valve operation provide improved performance. At lower loads, the valve(s) may be closed (or partially closed), and the gasoline injector can spray fuel into the active intake port, and the ethanol injector may be deactivated. At higher loads, the valve would be open or partially open, and ethanol could be injected into one port while gasoline is injected into the other port.

Further, by using different operation of the two port injectors (e.g., different timing, different fuels, different injectors for a cylinder, etc.) it is possible to reduce a compromise between package-space and air/fuel mixing. Further, it allows one injector to be placed in each intake port, and ensures that fuel can always be supplied to a port that is flowing air. By reducing airflow in a port when the injector is not injecting fuel, it is possible to maintain acceptable air-fuel mixing in the other port that is flowing air with injected fuel. Further, such an approach may provide improved packaging compared with twin-spray injectors that may require a more central injector location between the ports, making it more difficult to package two injectors per cylinder.

Figure 6:
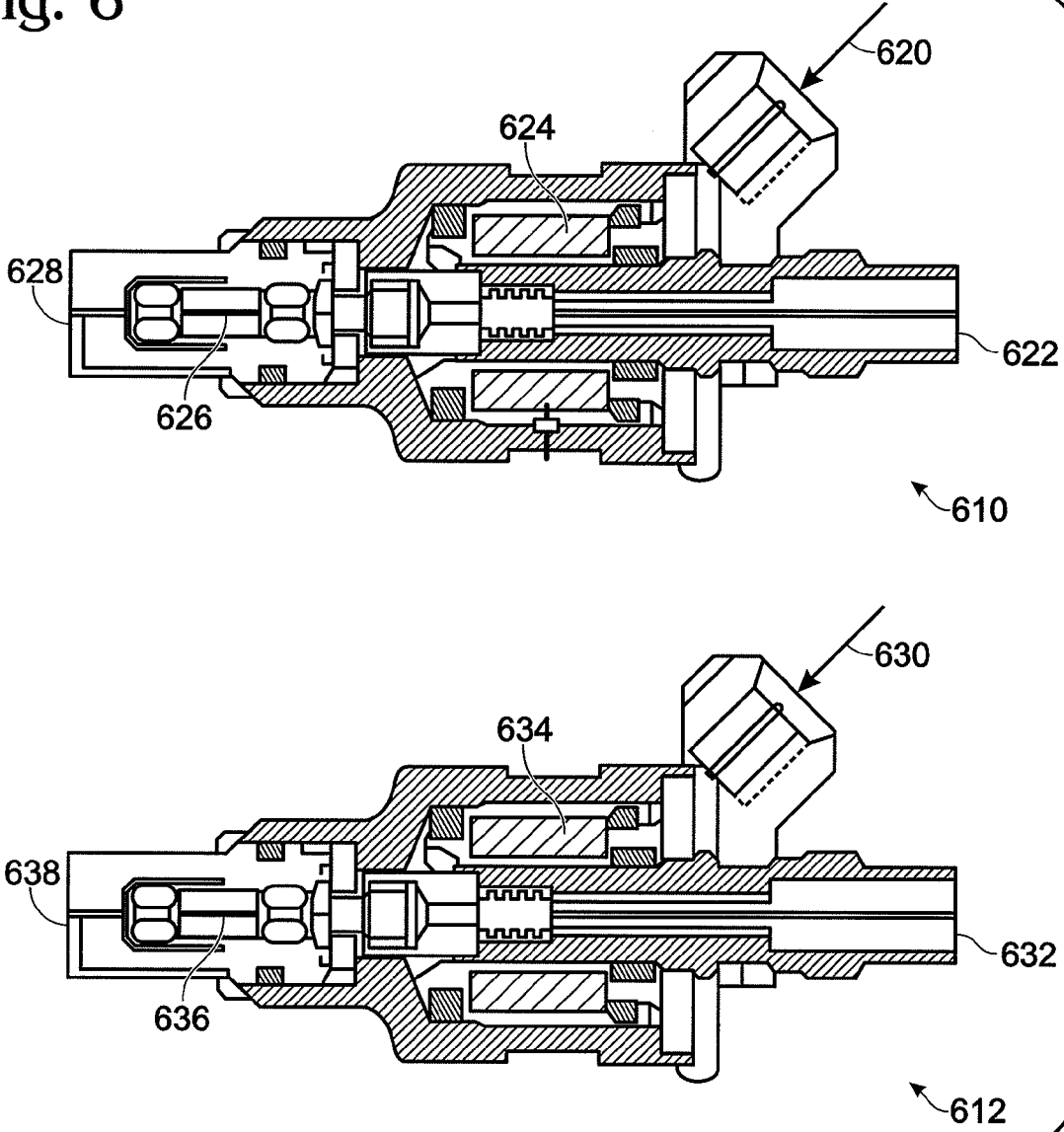
FIG. 6 shows two fuel injectors.

Referring now to FIG. 6, two fuel injectors are shown (610 and 612) with at least one different characteristic. Injector 610 may be used as injector 66A, 466A, 566A, etc., while injector 612 may be used as injector 66B, 466B, 566B, or vice versa, or combinations thereof, etc. The differing characteristic(s) between the injectors may be one or more of the following: injector size, injector dynamic range, materials, minimum pulse width, injector slope (flow to pulse width), orifice size, spray pattern, spray pattern area, spray targeting, or others as discussed herein.

In one example, both injectors are sized to meet peak torque requirements (for example a maximum airflow or air-charge). However, in an example where one injector provides gasoline and the other injector provides an alcohol blend (e.g., ethanol, E85, methanol, etc.), the power densities of the fuels may be different. In such a case, the injector for the alcohol based fuel may be sized to provide a different maximum fuel flow (e.g., approximately 37% higher to account for pure ethanol).

Referring now specifically to FIG. 6, injector 610, which may be a direct cylinder injector or a port injector, is shown receiving a command signal 620 from controller 12. Pressurized fuel is supplied to inlet 622, the flow of which is governed by an electromagnetic actuator having coil 624, coupled to needle 626 cooperating with pintle 628. The shape of pintle 628 may affect the spray geometry as well as the flow rate of the injector. Further, the size and shape of the needle may also affect flow and spray patterns, as well as response time.

FIG. 6 also shows injector 612, with similarly labeled components, including a command signal 630, inlet 632, coil 634, needle 636, and pintle 638. As noted above, the pintles 628 and 638 may different in size, shape, material, or combinations thereof. Further, inlets 622/632, coils 624/634, and/ or needles 626/636 may have different geometry, shapes, sizes, materials, weights, surface finishes, etc.

In this way, the respective injectors may be designed to provide different functionality and/or injection type (e.g., fuel type) compatibility so that improved engine operation and control may be achieved. As noted herein, an injection type may refer to different injection locations, different substances being injected (e.g., water vs. fuel), different fuel types being injected, different fuel blends being injected, different alcohol contents being injected (e.g., 0% vs. 85%), etc. Further note that different injection types may also refer to different substances being injected via a common injector, where a type 1 injection may be a gasoline amount in the injection and type 2 injection may be an alcohol amount in the injection.

Figure 7:
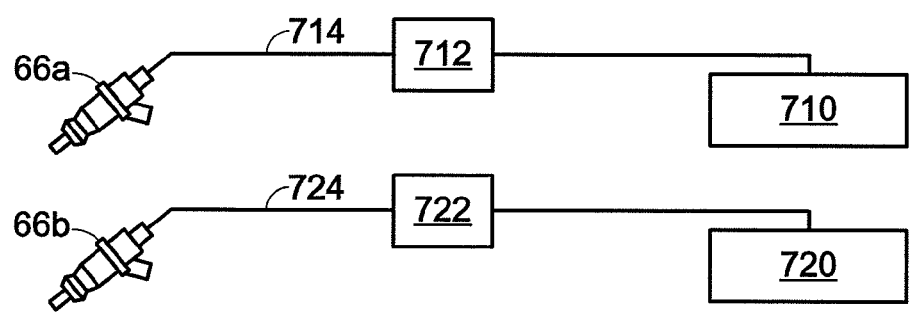
FIG. 7 shows a fuel pump system.

Referring now to FIGS. 7-10, various fuel and vapor handling systems are described. Specifically, FIG. 7 shows an example fuel pump configuration, while FIGS. 8-10 show various fuel vapor purge system configurations.

Referring now specifically to FIG. 7, an example fuel pump configuration is shown where a separate fuel pump and tank is provided for a first and second fuel type. Specifically, a first tank 710 is shown for holding liquid fuel of a first type, with pump 712 leading to injector 66A via fuel rail 714. Likewise, a second tank 720 is shown for holding liquid fuel of a second type, with pump 722 leading to injector 66B via fuel rail 724. While the pumps are shown outside the tank, in an alternative example one or both of the pumps may be located within the tank. Further, a second, high pressure fuel pump may be added to one or both the fuel lines downstream of respective low pressure pumps.

One or both the fuel systems may be returnless-type fuel systems, return-type fuel systems, or combinations thereof. Further, the fuel systems may have different characteristics, such as different size tanks, different size pump, different pump capacity, different pump pressure, different pump maximum flows, different on/off cycles (e.g., pump 712 may run more intermittently than pump 722), etc. Note that in some examples, only one pump may operate under some conditions. For example, if fuel from tank 710 is not needed, or not enabled (e.g., during cold start conditions), pump 712 may be deactivated (or not activated) while pump 722 operates. In this way, less battery power may be used, and less vapors may be generated.

In one example, the first tank contains an alcohol blend, such as ethanol or an ethanol-gasoline mixture, while the second tank contains gasoline. However, other fuel types may also be used.

Referring now specifically to FIGS. 8-10, example fuel purging system configurations are described in cases where two different fuel sources are provided, which may be in engines having two injectors per cylinder (e.g., a port injector and a direct injector, or two port injectors). As noted above, one fuel may be gasoline, where a second fuel may be an alcohol or an alcohol blend. In such a case, the fuels may have different volatility, vaporization, etc., which may be used to advantage.

One example embodiment is shown in FIG. 8, in which a first tank 810 may be used for a first fuel (e.g., gasoline) and tank 812 may be used for a second fuel (e.g., ethanol). The tanks may be separate (as shown) or integrally formed. Further, the size or volume of the tanks may be different, for example tank 812 may be substantially smaller than tank 810.

In FIG. 8, tank 810 has a vapor conduit 820, tank 812 has a vapor conduit 822, both leading to junction 830. Junction 830 leads to canister 814 (which can have a check valve venting to the atmosphere). Junction 830 may have a parallel conduit 826 leading to vapor management valve 816, which controls vapor flow to engine 10 (via intake manifold 44, for example). In this way it is possible to enable vapor from both tanks (or tank sections) to the engine using a single canister and a single vapor control valve (although more canisters and/or valves may be used if desired).

However, one fuel may be more volatile than another fuel (for example, 10% vaporization occurs at approximately 100 deg F. for gasoline vs 160 deg F. for 85% ethanol). Thus, in this example, when tank 812 fuel level is low, the total vapor volume (ullage space) of the system may be relatively high, which can make vapor control more difficult. Also, fuel from one tank may mix with a different fuel in the other tank (e.g., contaminating the ethanol tank with excessive amounts of gasoline due to evaporation from the gasoline tank and condensation in the ethanol tank). Some of the above issues may be reduced by making the sizes of conduits 820 and 822 relatively differently sized, for example.

Another approach that may be used is shown in FIG. 9. In this example, first tank 910 may be used for a first fuel (e.g., gasoline) and tank 912 may be used for a second fuel (e.g., ethanol). The tanks may be separate (as shown) or integrally formed. Further, the size or volume of the tanks may be different, for example tank 912 may be substantially smaller than tank 910. In the example of FIG. 9, separate canister systems (e.g., canisters 914 and 916) may be used for each of tanks 910 and 912. Specifically, tank 910 has a vapor conduit 920 leading to junction 930, which is coupled to conduit 928 leading to canister 914 (which then vents to atmosphere via a check valve). Further, tank 912 has a conduit 922 which leads to junction 932, which then may lead to canister 916 via conduit 924. Junction 930 also leads to a first valve 940 via conduit 934, while junction 932 may lead to a second valve 942 via conduit 926. Each of valves 940 and 942 are coupled to junction 946, which then leads to intake manifold 44 of the engine 10. Alternatively, each of valves 940 and 942 may be directed separately to separate locations of the intake manifold. As above, additional canisters may be used, if desired. Further, canisters 914 and 916 may have different characteristics (e.g., size, charcoal loading, storage capacity, or others), and valves 940 and 942 may have different characteristics, such as sizes, mounting orientations, maximum flows, minimum flows, orifice areas, actuation mechanisms, etc. Valves 940 and 942 may be completely separate, or may be packaged together in a single housing.

In this way, it is possible to enable vapor from both tanks (or tank sections) to the engine in controllable differential amounts while reducing contamination from one tank to another tank.

FIG. 10 shows still another alternative embodiment, which is similar to that of FIG. 9, yet a single vapor control valve is used, while maintaining separation between the two tanks (or tank sections). Specifically, in FIG. 10, tanks 1010 and 1012 are shown (which as noted above may have different characteristics and may be separately or integrally formed) along with canisters 1014 and 1016 (which also may have different characteristics). Tank 1010 is coupled to junction 1020 via conduit 1022 and canister 1014 is coupled to junction 1020 via conduit 1024 at a first outlet of the canister. A second outlet of the canister 1014 is coupled to junction 1026, along with tank 1012 via conduit 1028 and canister 1016 via conduit 1030. Further, junction 1020 leads to valve 1040, which then directs flow to the engine intake manifold.

In one example, a one-way check valve may be placed in line 1028 to reduce vapor flow from tank 1010 to tank 1012. Further, such a valve may also be placed in line 1022. However, the presence of canister 1014 may be sufficient to reduce flow of vapors from tank 1010 to tank 1012, and vice versa.

In this way, a single valve may be used (although more may be added if desired), yet the system provides at least some separation between the tanks via a canister (in this example, canister 1014). Canister 1014 may be sized large enough to reduce the amount of a first fuel vapor (e.g., gasoline) that enters the tank 1012 to an acceptable level, and since it is in series with canister 1016, this can enable canister 1014 to have a reduced size or capacity.

In any of the examples herein with more than one canister, the canisters may be packaged in a single housing if desired.

As will be described in more detail below, control of fuel vapors, adaptive learning, vapor concentration learning, vapor blend learning, along with air-fuel ratio, may be affected by the fuel system type and configuration. For example, in some examples vapors from one or more fuel source may be concurrently delivered to the engine, in varying amounts, and thus the controller may estimate the blend of the vapors (e.g., the percentage of alcohol in a gas/alcohol blend, for example) to determine stoichiometry of the vapors, etc., that can then be used to adjust fuel injection, etc.

For example, under some conditions, purging of a first fuel type may be advantageous, and under other conditions, purging of a second fuel type may be advantageous. Further still, under still other conditions, both types may be concurrently purged. Factors that may influence which of these are selected may include, for example, the amount of fuel vapors of each being inducted. Thus, if the vapors contain mostly a fuel corresponding to a first injector, purging from that source may be given preference and continued for a longer period, or performed with a greater purge flow rate, for example. Alternatively, an estimated blend in the reservoirs(s) may influence which reservoir is purged (and how much volume from that source is purged). For example, some reservoirs may generate more vapors than other reservoirs, and thus need longer or more frequent, or higher volume, purging.

Further, note that the desired/delivered amounts of type 1 and type 2 injection, or for example, the relative amount of type 1 to type 2 injection, may vary depending on the source of fuel vapors being inducted into the engine. Thus, the injection amounts may be varied based on the source of vapors, or based on whether any vapors are being inducted into the engine, or based on the concentration of vapors being inducted into the engine, and/or based on the blend of vapors being inducted into the engine.

Figure 11:
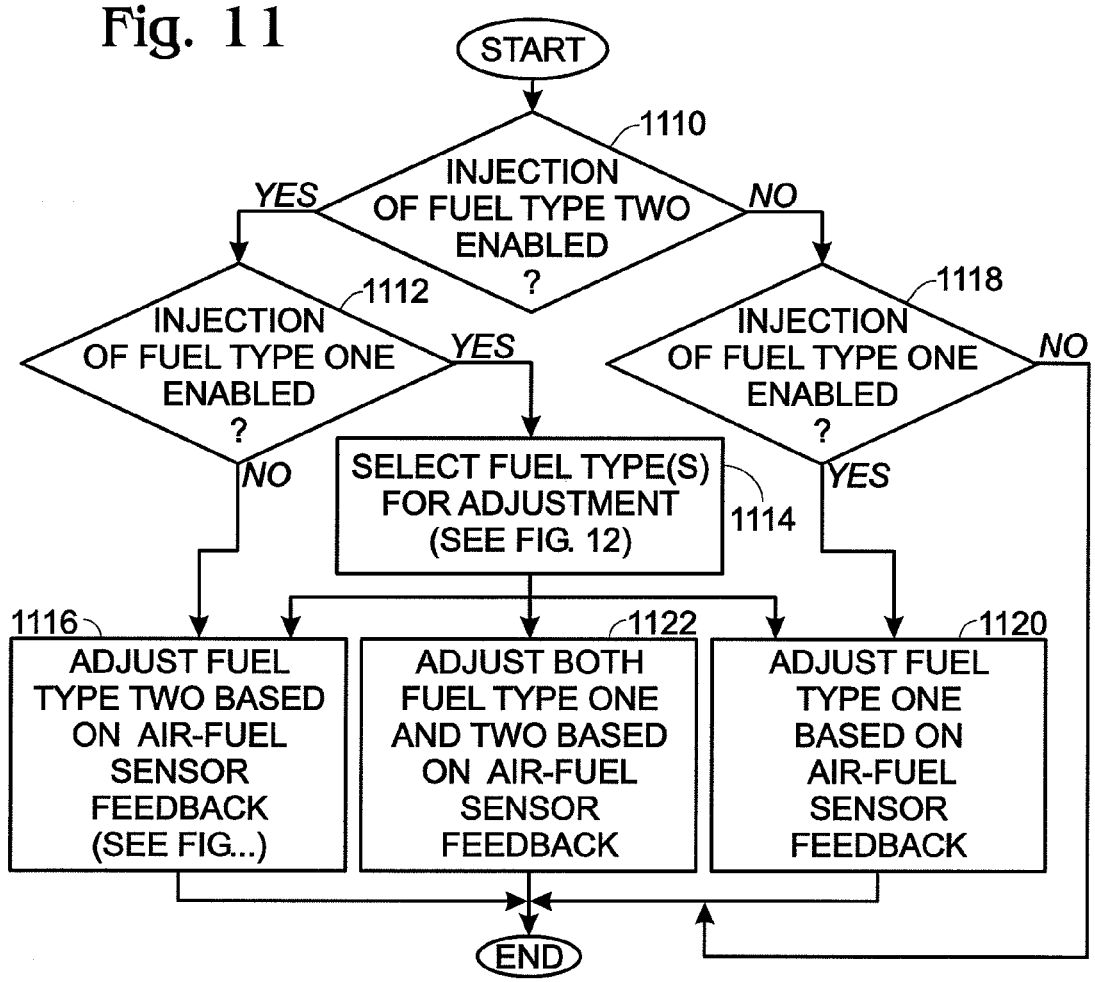
FIGS. 11-12 shows high level flow charts for air-fuel ratio feedback control.

Referring now to FIG. 11, a routine is described for implementing adjustments in fuel injection amounts in response to feedback from an exhaust gas oxygen sensor (or other sources) to provide a desired overall air-fuel ratio. In particular, in cases where more than one injection type may be provided to a cylinder, the routine determines which type of fuel may be adjusted based on feedback. As used herein, different fuel or injection types may refer to different fuels (e.g., alcohol containing fuels vs. gasoline) or may refer to different injector locations (e.g., port vs. direct), or may be different sized injectors (e.g., one having higher maximum flow than the other), or may refer to other injection characteristics, fuel delivery characteristics, spray characteristics, fuel property characteristics (e.g., temperature, heat capacity, power density, etc.) or may refer to gasoline injection versus water injection, or others, or may refer to different fuel blends (where one fuel type has relatively more or less ethanol than another fuel type). Also, the fuel types may be separately delivered to the combustion chamber, or mixed before delivery to the combustion chamber.

Specifically, in 1110, the routine determines whether injection or delivery of fuel type 2 is enabled. As described in more detail herein, various factors may be used to determine whether to enable delivery or injection of fuel type 2, such as engine temperature, exhaust temperature, an amount of type 2 injection (e.g., fuel type) on-board (e.g., in a fuel tank), etc. If the answer to 1110 is yes, the routine continues to 1112 to determine if injection or delivery of fuel type 1 is enabled. Again, as described in more detail herein, various factors may be used to determine whether to enable delivery or injection of fuel type 1, such as engine temperature, exhaust temperature, an amount of type 1 injection (e.g., fuel type) on-board (e.g., in a fuel tank), etc. If the answer to 1112 is yes, the routine continues to 1114, otherwise the routine continues to 1116.

When the answer to 1110 is no, the routine continues to 1118 where again the routine determines if injection or delivery of fuel type 1 is enabled. If not, the routine ends. Otherwise, the routine continues to 1120.

In 1114, the routine selects a fuel type for adjustment as described below in more detail with regard to FIG. 12. For example, if type 1 is selected, the routine continues to 1120, if type 2 is selected, the routine continues to 1116, and if both fuel types are selected, the routine continues to 1122. While the routine of FIG. 12 considers factors such as a bandwidth of needed adjustments, minimum and maximum pulse width limits, and others, various other factors can influence which injectors are adjusted in response to feedback information, and/or relative amounts of adjustment between multiple injectors based on feedback information. In one embodiment where water is included in the type 2 injection (e.g., a water-alcohol or water-ethanol mix), adjustment of type 2 injection in response to air-fuel ratio errors becomes decreasingly effective as the water fraction in the mix increases. Thus, in such an embodiment, selection of type 2 injection adjustment to affect air-fuel ratio (e.g., in response to exhaust gas oxygen sensor feedback) may be stopped or disabled when the water fraction surpasses a limit, such as 0.7, for example, and thus all or most all of the adjustments can be made with a type 1 injection, such as gasoline injection. Another criteria that may be used in selecting injectors for feedback control may be based on how much fuel is in the respective tanks, and thus if one fuel is low, it may be not be increased in response to feedback to conserve that fuel.

Figure 17A:
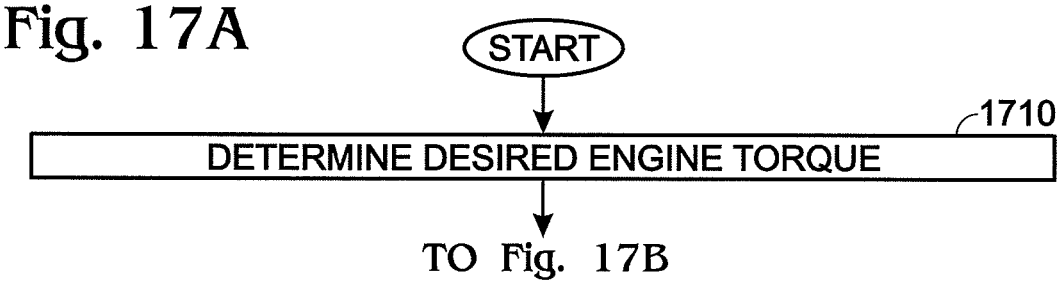
Figure 17B:
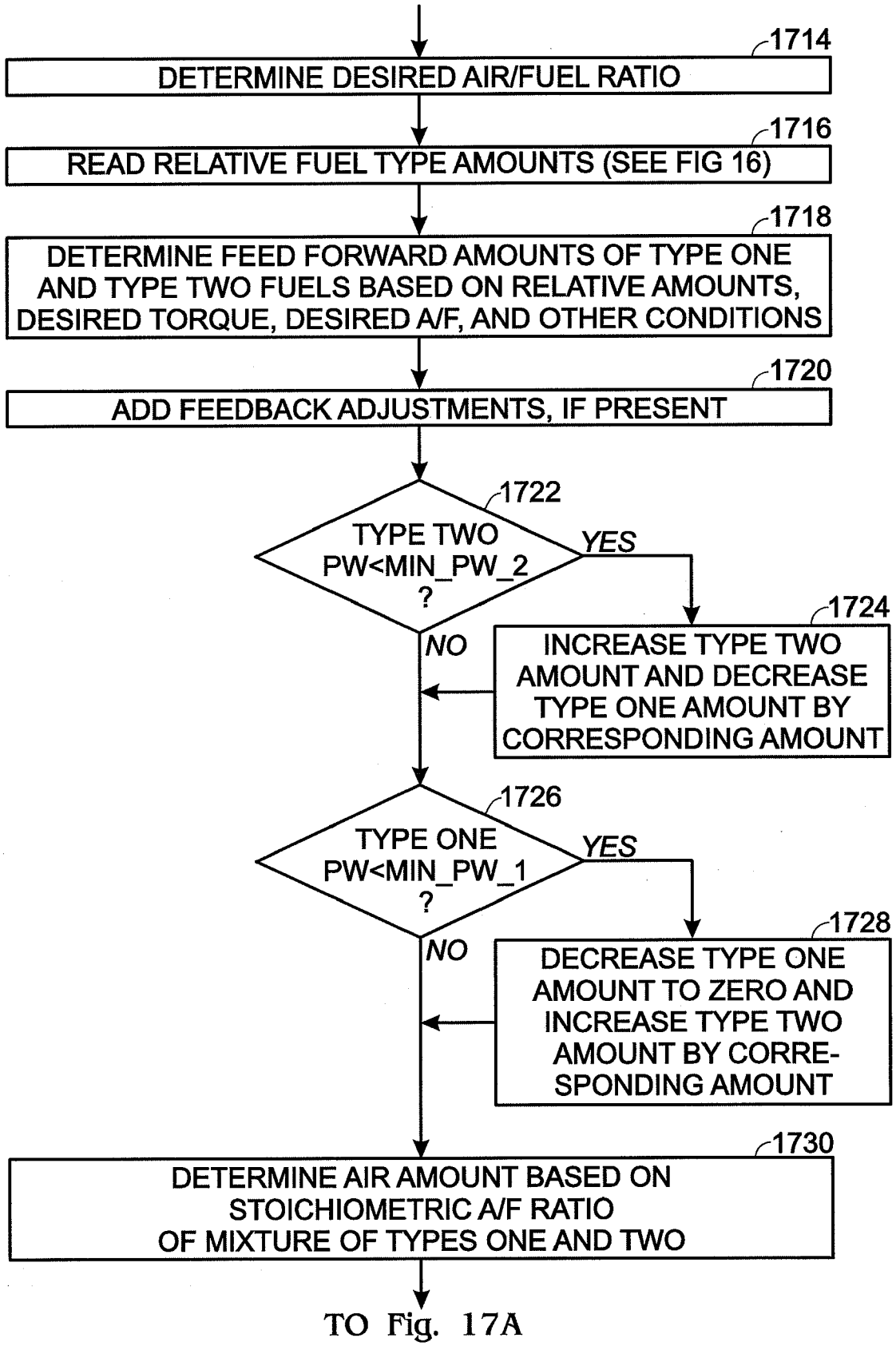

In 1116, the routine adjusts fuel type 2 based on air-fuel ratio sensor feedback (see also FIG. 17). For example, a PI controller may be used to process an error signal (between a desired and measured air-fuel ratio) to generate a feedback correction to adjust an amount of injected or delivered fuel of fuel type 2. Note also that more than one sensor may be used to generate upstream and downstream feedback corrections.

In 1120, the routine adjusts fuel type 1 based on air-fuel ratio sensor feedback (see also FIG. 17). For example, a PI controller may be used to process an error signal (between a desired and measured air-fuel ratio) to generate a feedback correction to adjust an amount of injected or delivered fuel of fuel type 1. Again note that more than one sensor may be used to generate upstream and downstream feedback corrections.

In 1122, the routine adjusts both fuel type 1 and 2 based on air-fuel ratio sensor feedback (see also FIG. 17). For example, a PI controller may be used to process an error signal (between a desired and measured air-fuel ratio) to generate a feedback correction. The correction may then be divided into two parts, one to adjust an amount of injected or delivered fuel of fuel type 1, and another to adjust an amount of injected or delivered fuel of fuel type 2. Again note that more than one sensor may be used to generate upstream and downstream feedback corrections. Further, the upstream correction may be applied to fuel type 2 while the downstream correction may be applied to fuel type 1, or vice versa. In another example, lean corrections may be applied to fuel type 2 while rich corrections may be applied to fuel type 1, or vice versa to adjust a relative amount of fuel types. Also, greater corrections may be made with fuel type 1 under a first set of selected engine operating conditions, and greater corrections may be made with fuel type 2 under a second set of selected engine operating conditions.

In this way, different fuel types (e.g., injection locations, fuel qualities, fuel densities, fuel heat capacities, etc.) may be used under different conditions and in different amounts to facilitate air-fuel feedback corrections depending on operating conditions.

Figure 12:
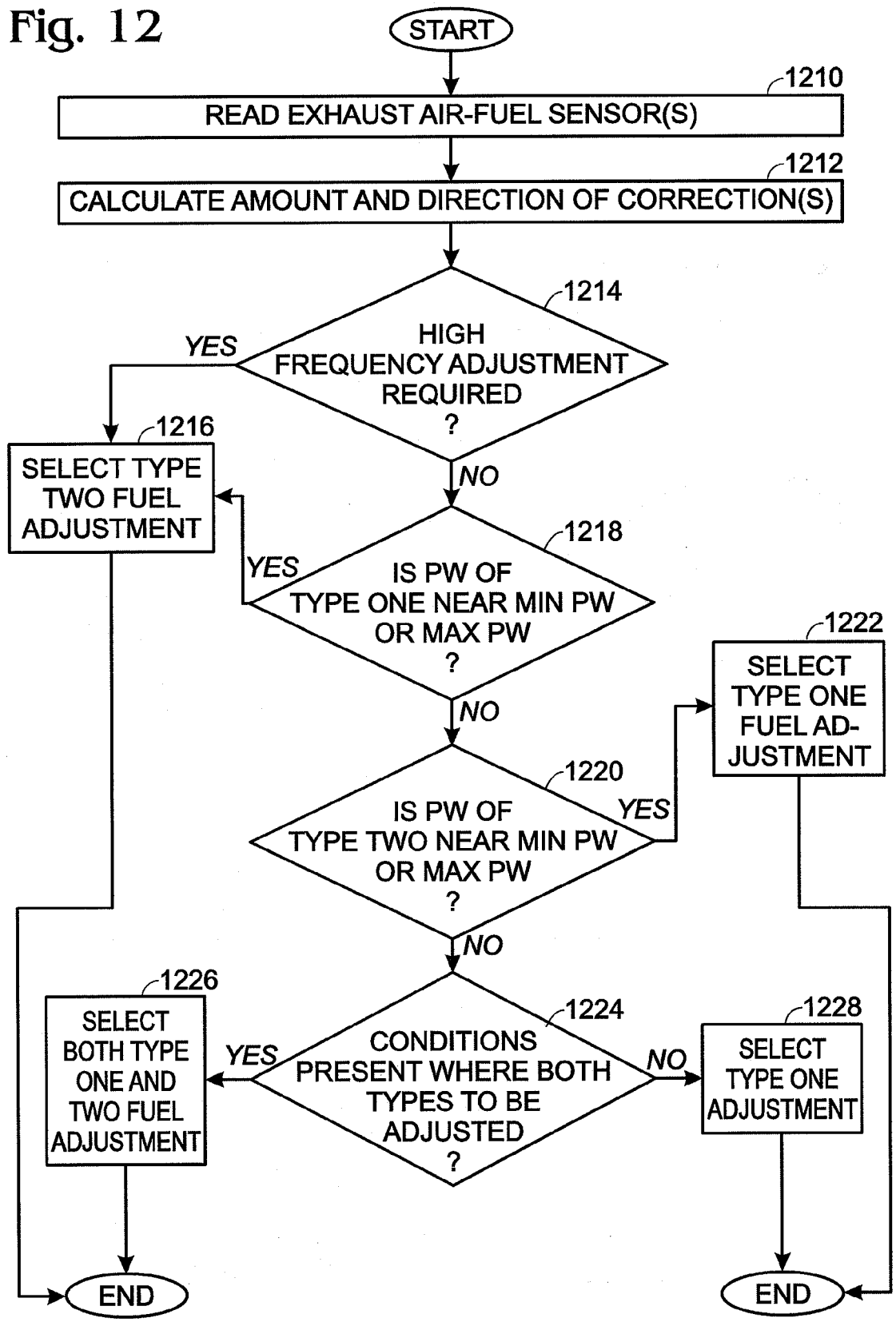

Referring now to FIG. 12, an example routine for selecting which fuel type to use for feedback adjustment of air-fuel ratio is described. As noted above, various factors may be considered, and while the routine described in FIG. 12 shows some of these factors, others may also be added, or only some or none of the factors shown may be considered, if desired.

In 1210, the routine reads exhaust air-fuel ratio sensor information from one or more exhaust gas sensors. Then in 1212, the routine calculates an amount and direction of correction or corrections. For example, a PI controller may be used, or multiple PI control loops may be used, such as based on upstream and downstream sensors. Then, in 1214, the routine determines whether a high frequency adjustment is required in the amount of fuel delivered. For example, if a rapid (and possibly large) change in exhaust air-fuel ratio is encountered, it may be possible to more rapidly correct this error using type 2 injection (e.g., fuel type, such as when type 2 fuel is injected directly, or injected more closely to the cylinder, or if an injector for type 2 fuel has a higher bandwidth than an injector for type 1 fuel). If the answer to 1214 is yes, the routine continues to 1216 to select type 2 fuel adjustment and then ends.

Otherwise, the routine continues to 1218 to determine if a corresponding pulse width (PW) of the injector for the type 1 injection is near a minimum PW value for the injector or a maximum PW for the injector. If so, the routine again proceeds to 1216. If the answer to 1218 is no, the routine continues to 1220 to determine if a corresponding pulse width (PW) of the injector for the type 2 injection is near a minimum PW value for the injector or a maximum PW for the injector. If so, the routine proceeds to 1222 to select type 1 fuel for adjustment. If the answer to 1220 is no, the routine continues to 1224.

In 1224, the routine determines whether conditions are present to adjust both fuel types based on feedback information. For example, it may be determined that higher frequency adjustments are made with type 2 injection (e.g., fuel type) adjustments and lower frequency adjustments be made with type 1 fuel adjustments. In this way, in the example where type 2 injection is direct fuel injection and type 1 injection is port fuel injection, wall wetting dynamic delays can be reduced. Alternatively, both fuels may be selected for adjustment, where a portion of the adjustment is made by each fuel type. This portion, which may be a percentage or other ratio, may be adjusted with engine operating conditions, fuel conditions, etc.

If the answer to 1224 is yes, the routine continues to adjust both fuels in 1226. Otherwise, the routine continues to 1228 to adjust fuel type 1.

In this way, different fuel types can be used to provide air-fuel feedback control for different conditions so that overall operation is improved. For example, where port injection is used to control lower frequency feedback adjustments than direct injection, faster feedback control can be achieved while reducing wall wetting dynamics, and still utilizing feedback adjustment of both fuel types. Further, issues with minimum or maximum injector fueling can be addressed, while still maintaining accurate overall air-fuel ratio control.

Figure 13:
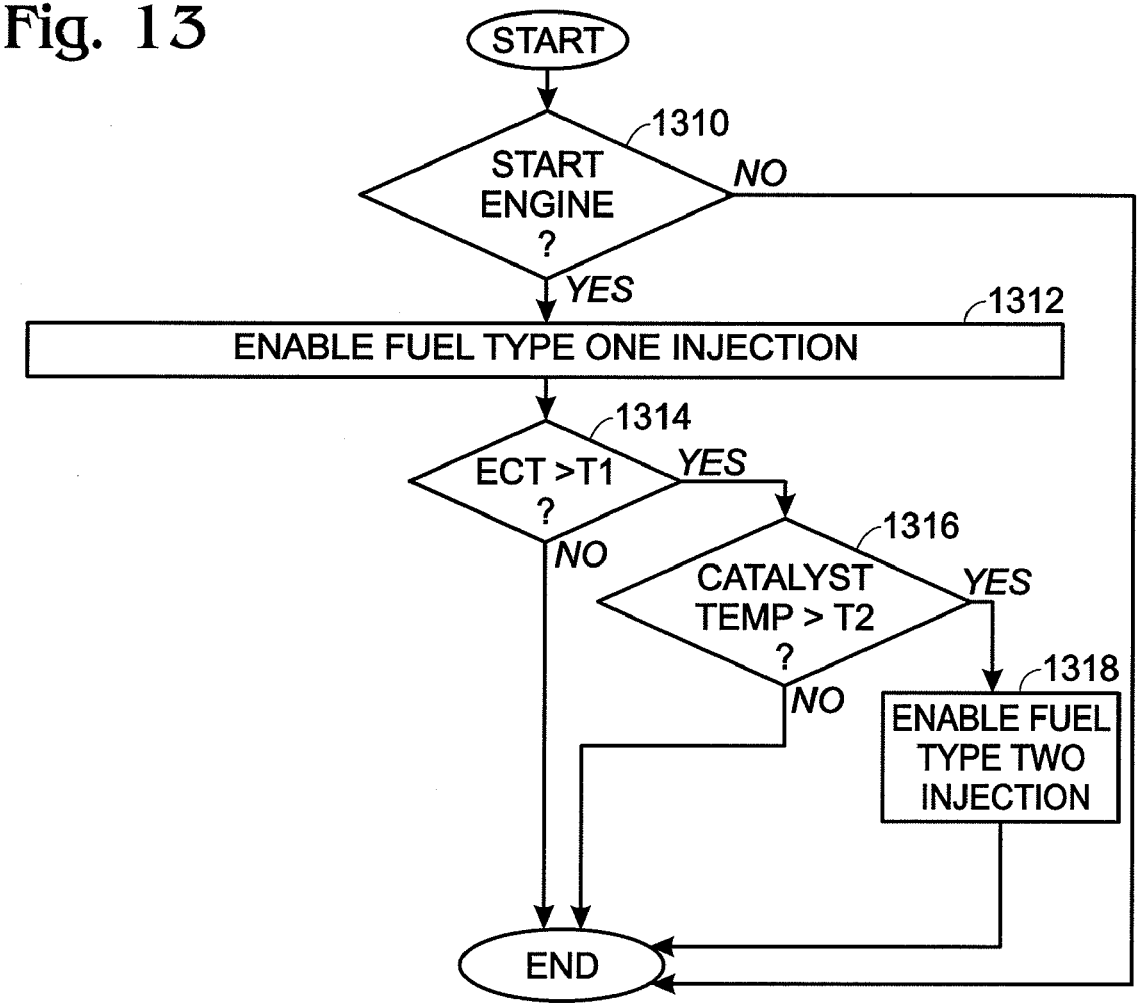
FIGS. 13-14 and 16 show high level flow charts for fuel type enablement.

Referring now to FIG. 13, a first embodiment example starting routine is provided for enabling fuel types based on engine, vehicle, and/or ambient operating conditions. First, in 1310 the routine determines whether an engine start has occurred. For example, the routine can monitor engine speed, cranking motor, key-on operation, or various other parameters to identify an engine start. If the answer to 1310 is yes, the routine continues to 1312 to enable fuel type 1 delivery or injection. Then, the routine continues to 1314 to determine whether engine coolant temperature (ECT) is greater than a limit T1. If so, the routine continues to 1316 to determine whether catalyst temperature is greater than a limit T2. If so, the routine continues to 1318 to enable fuel type 2 delivery or injection. In this way, it is possible to utilize fuel type 1 for engine starting and/or engine warm-up, and avoid fuel type 2 until the engine and exhaust system have warmed, for cases where fuel type 2 is more difficult to vaporize, such as an alcohol containing fuel (e.g., ethanol or an ethanol blend), for example. As noted above, the fuel types may refer to different fuel blends, different injector locations, etc.

While the above example relies on engine coolant temperature, various other parameters may be used, such as ambient air temperature, ambient pressure, oil temperature, etc. Likewise, various exhaust temperatures may be used, such as exhaust gas temperature, catalyst temperature, or estimates thereof. In this way, it is possible to provide an appropriate fuel for engine starting and/or warm-up. Further, the starting approaches herein may be used for re-starting, such as a hot-restart, a re-start after an unsuccessful start, starting after deceleration fuel shut-off, or starting an engine during rotation or from rest, such as with a hybrid vehicle (e.g., hybrid-electric vehicle).

Figure 14A:
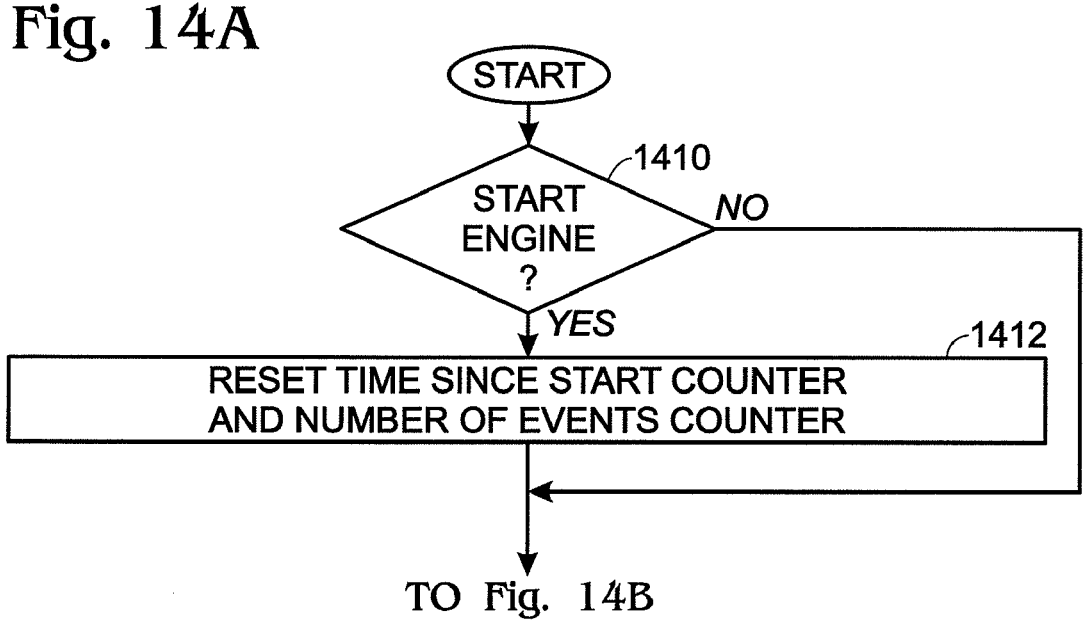
Figure 14B:
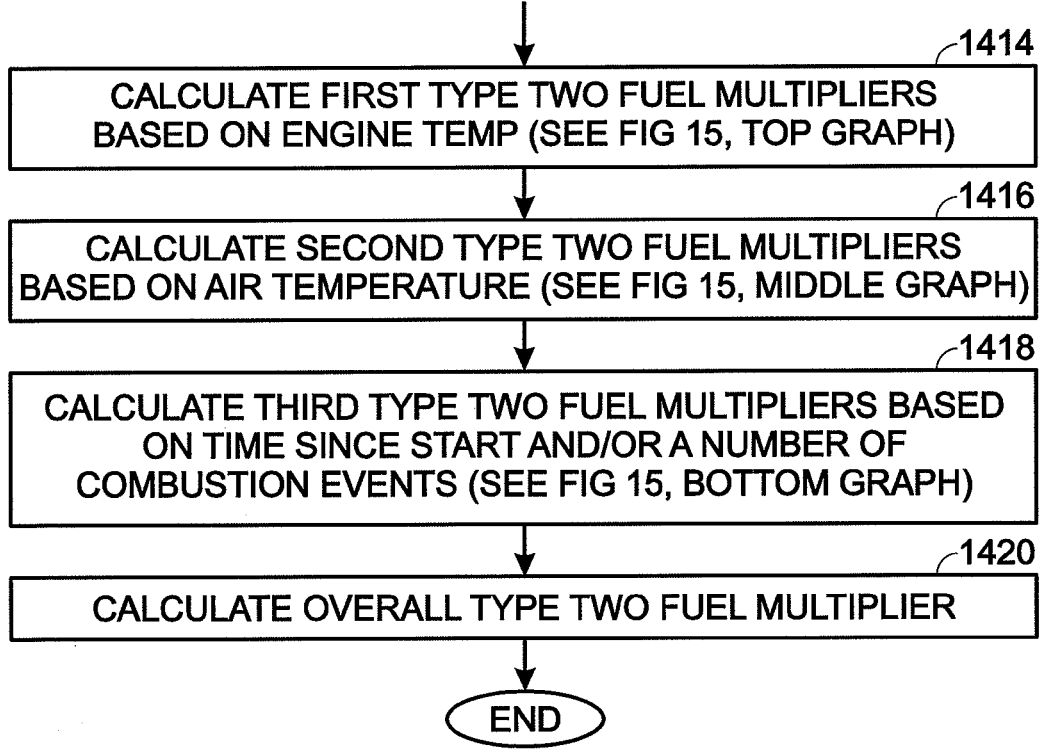
Figure 15:
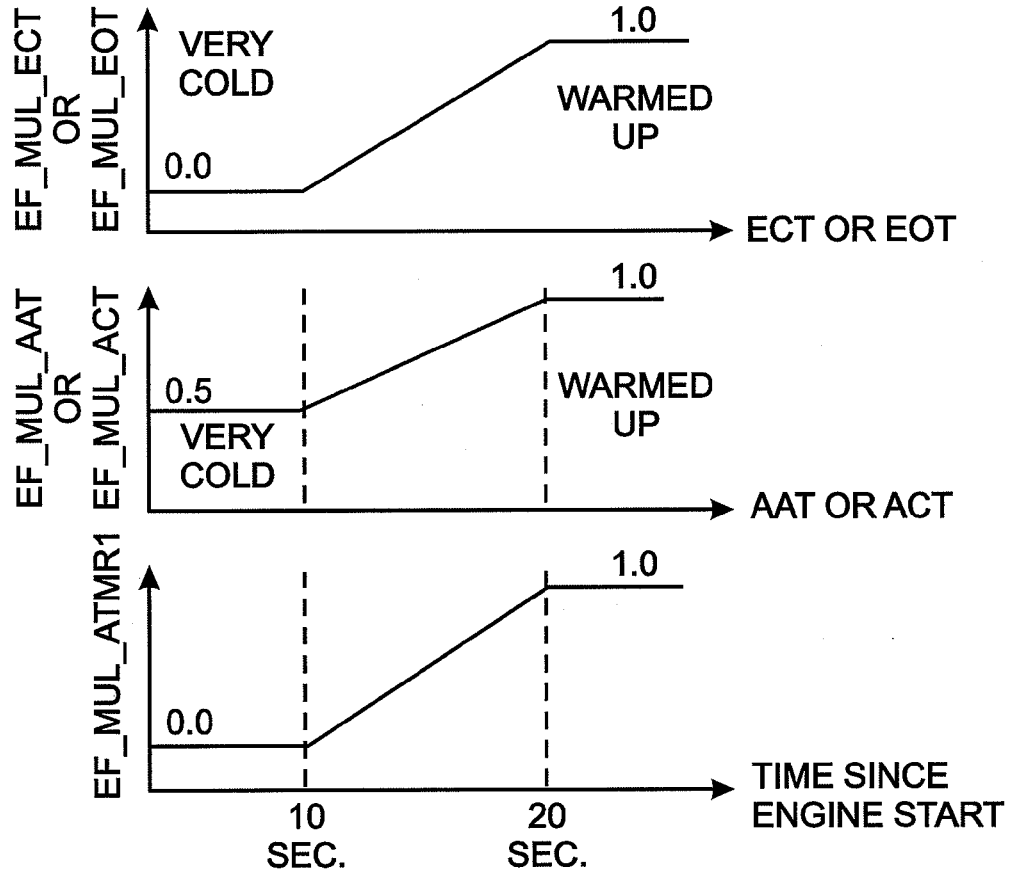
FIG. 15 shows graphs illustrating example ratios of fuel type enablement based on operating conditions.

Referring now to FIGS. 14-15, a second embodiment for enabling fuel types is described that accounts for limiting some fuel types during engine warm-up/starting operation. In this embodiment, a warm-up strategy is described which can apply to various engine concepts using at least two fuel types, such as two PFI injectors per cylinder, one DI and one PFI injector per cylinder, or one ethanol blend injector and one gasoline injector, etc. In this way, engine control strategy can be included to prevent use of a fuel type (such as an ethanol blend) when the engine is too cold, and transition (gradually or abruptly) towards usage as the engine warms up. This can be done for at least the following reasons. (1) In the example where ethanol or an ethanol blend is used, such fuel can be less volatile than gasoline (e.g., 10% vaporization occurs at approximately 100 degrees F. for gasoline vs. 160 degrees F. for 85% ethanol). Attaining adequate vaporization and air-fuel mixing with ethanol may be difficult before the engine is warmed up. (2) Again, in the example where ethanol is used to avoid or reduce knock under selected conditions, the likelihood of knock is may be greatly reduced at cooler temperatures. Thus, it may be desirable, under some conditions, to minimize ethanol consumption when possible, to conserve it for times when knock is more likely.

As will be described in more detail below, once the engine is warmed up, a desired ethanol fraction (EF), or other such parameter, can be determined as a function of speed and load as described, with additional logic for unusual ambient conditions, low fuel level of ethanol or gasoline, etc. The warmed-up desired ethanol fraction can then be modified with one or more multipliers (e.g., an overall multiplier EF_MUL) to account for cold start and warm-up.

The value of EF_MUL can be in the range between zero and one during warm-up (values higher than one may be desired for higher-than-normal temperatures). The value of EF_MUL can be determined from a variety of inputs, including engine coolant temperature, engine oil temperature, ambient air temperature, engine intake air temperature, time since engine start, speed, load, available fuel pressure, ambient humidity, and other parameters. Each of these inputs could be measured or inferred. The value of EF_MUL can be continuously re-calculated during engine operation.

Referring now specifically to FIG. 14, in 1410 the routine determines whether an engine start is present. Then, if so, in 1412 a time since engine start timer is reset to zero and starts counting. Likewise, a combustion event counter is reset to zero and starts counting combustion events from the start.

From either 1412 or when the answer to 1410 is no, the routine continues to 1414, 1416, and 1418 to calculate individual multipliers for the type 2 injection using the calibration graphs of FIG. 15, which in one example is an ethanol or ethanol blend, or another alcohol containing blend. The routine then continues to step 1420.

In one embodiment of step 1420, the routine determines a current value of the overall multiplier on a desired fuel type 2 fraction by multiplying the values of the separate multipliers for each input. In this method, the effects of the input variables can all be accounted for simultaneously, for example:

EF_MUL=EF_MUL_ECT*EF_MUL_EOT*EF_MUL_AAT*EF_MUL_ACT*EF_MUL_ATMR1

Where
EF_MUL=Overall multiplier on desired ethanol fraction, EF_MUL_ECT=Multiplier as a function of engine coolant temperature, EF_MUL_EOT=Multiplier as a function of engine oil temperature, EF_MUL_AAT=Multiplier as a function of ambient air temperature, EF_MUL_ACT=Multiplier as a function of engine intake air temperature, EF_MUL_ATMR1=Multiplier as a function of time since engine start or number of combustion events since engine start.

Example calibrations for these multipliers are illustrated in the top, middle, and bottom graphs of FIG. 15. The graphs show linear changes for each input, but the actual calibration may be non-linear. The values could be determined from look-up tables, from mathematical equations, etc. Note that the minimum calibration of EF_MUL_ATMR1 could be constrained by the time required to build up sufficient ethanol fuel pressure to operate the direct injection system, or an additional multiplier could be used for fuel pressure. Also, some or all of the multipliers may be calculated using more than one input. For example, fuel/air mixing at low temperatures may only be an issue in certain ranges of speed and/or load. Also, while each graph is the same for two multipliers, each multiplier may have a different calibration in practice.

Note that the above multipliers may also be a function of additional parameters, such as a number of combustion events from an engine start.

An alternative embodiment of step 1420 is described for limiting a fuel type during engine warm-up. Specifically, in this embodiment, each input factor is considered as a separate possible constraint on a fuel type use (e.g., ethanol use). The current value of the overall multiplier (for the desired ethanol fraction) can be determined by the input factor which is currently the most constraining. This may involve examining the same input multipliers as above, although the calibration values of these multipliers may be chosen differently. Also, the value of EF_MUL may be continuously re-calculated during engine operation. For example, the following calculation may be used:

EF_MUL=MINIMUM(EF_MUL_ECT,EF_MUL_EOT,EF_MUL_AAT,EF_MUL_ACT,EF_MUL_ATMR1)

With this method, when the engine is first started, EF_MUL_ATMR1 may be the limiting constraint, followed by EF_MUL_ECT until the coolant warms up, followed by EF_MUL_EOT until the oil warms up, and then the remaining constraint may by EF_MUL_AAT in very cold weather.

Figure 18:
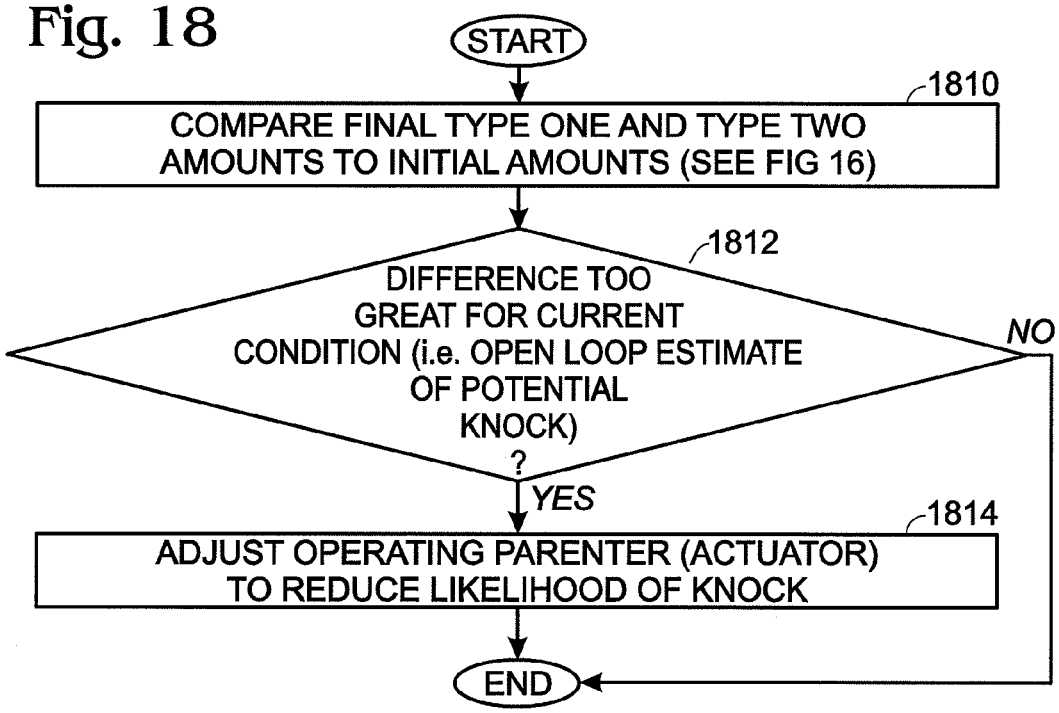
Figure 16:
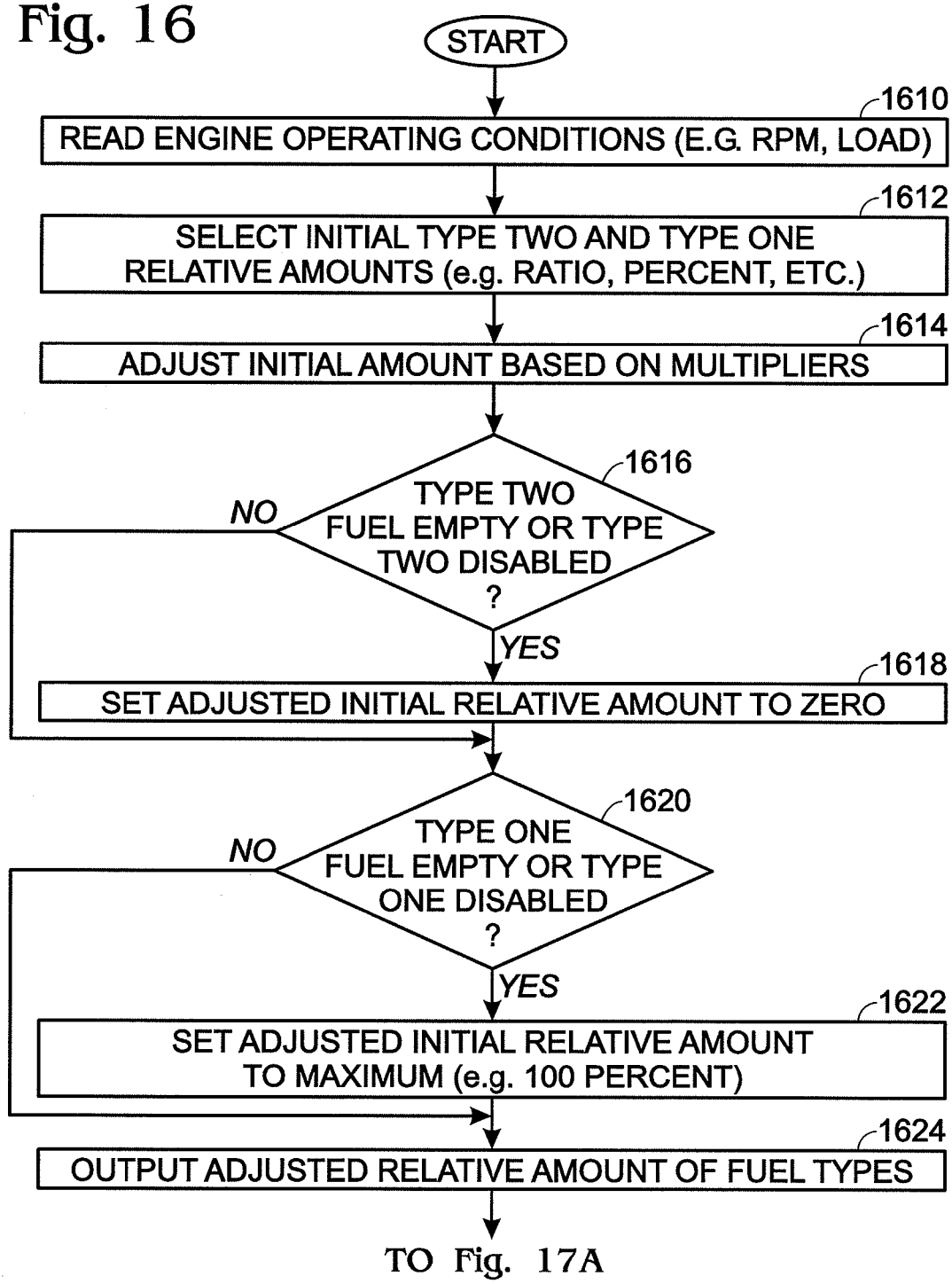

Referring now to FIGS. 16-18, a routine is described for selecting an initial desired relative amount of fuels, and then taking into account one or more multipliers such as those discussed above, as well as other conditions. Further, the routine then performs several adjustments, if necessary, to account for fuel storage quantities and other factors, and then uses the values to coordinate engine operation to meet driver requests.

In 1610 the routine reads various engine operating parameters, such as engine speed, engine load, engine coolant temperature, exhaust temperature, gear ratios, etc. Then, in 1612, the routine selects an initial type 1 and type 2 relative amounts, such as a desired fraction based on the operating parameters. Note that various alternative determinations may be made, such as determining a desired percentage of fuel types, or absolute amounts of fuel types. Further, an adaptive parameter may also be included to account for learned adjustments to the fuel types based on feedback from various sensors, such as a knock sensor. The adaptive terms may be stored as a function of speed, load, temperature, or combinations thereof, for example. In this way, if knock consistently occurs in repeatable locations, an automatic increase in the amount of type 2 injection, for example, may be adaptively learned so that such adjustment can be made without waiting for feedback from a knock sensor.

In one example where type 2 injection is ethanol (or an ethanol blend), the determination in 1612 may be referred to as a desired ethanol fraction (EF). Note, however, that it may be a weight percent, mass percent, volume percent, or ratio. Further, absolute values may also be used, if desired, as noted herein. Further, the selection of the amounts of type 1 and type 2 injections may be based on other factors, such as factors that can affect a tendency for knock. For example, ambient humidity may be used to adjust an amount of type 2 injection for given operating conditions, as increased humidity can decrease knock tendency (and thus less type 2 injection may be needed), and vice versa. Note that a desired spark timing may also be varied as the relative amounts of type 1 and type 2 injection are varied, or as the individual amounts of the type 1 and type 2 injections are varied.

In one example, the amount of type 2 fuel may be determined based on compression ratio, boosting, and temperature so that engine knock may be reduced thus reducing a limit of spark advance. However, as noted herein, additional factors may be used in determining whether to use type 2 fuel, and the amount of type 2 fuel, such as, for example, the amount of type 1 fuel remaining in the tank, the need to learn the content (e.g., blend) of type 2 fuel on-board, minimum pulsewidth issues, and a need to periodically operate with type 2 fuel if it has not been used frequently enough (e.g., to reduce deposit formation and or clogging of fuel lines and/or injectors).

In another example, which may be used in addition to the examples and embodiments noted herein, transient conditions may be detected and used to initiate an open-loop adjustment in the amount of type 2 (and type 1) injection. The adjustment may include a temporary increase in a relative amount of type 2 injection in response to the transient condition detection. In one embodiment, a driver tip-in, such as a rapid tip-in from idle conditions, may be detected. In response to such conditions, a type 2 injection (e.g. direct or port injection of an alcohol-containing mixture, e.g., ethanol or an ethanol blend) may be temporarily increased with a predetermined or actively varying profile. In this way, the heat capacity/heat of vaporization of substances, such as fuel, injected into the engine may be increased, thereby reducing a tendency for tip-in knock. As one example, EF may be temporarily increased by 5-10 percent for one to 10 combustion cycles in response to a driver tip-in.

Continuing with FIG. 16, in 1614, the routine adjusts the initial amount based on various factors, such as the multipliers discussed above with regard to FIGS. 14-15. For example, the minimum multiplier may be used, or all multipliers together may be used, as discussed above. Next, in 1616, the routine continues to determine whether type 2 fuel is empty (e.g., the storage location is empty or below a minimum value) or disabled. If so, the routine continues to 1618 to set the adjusted initial relative amount (e.g., EF) to zero. Alternatively, the routine continues to determine in 1620 whether type 1 fuel is empty (e.g., the storage location is empty or below a minimum value) or disabled. If so, the routine continues to 1622 to set the adjusted initial relative amount (e.g., EF) to 1 (or 100%). Finally, the routine continues to 1624 to output the adjusted relative amount of fuel types. In this way, it is possible to account for various operating factors and/or situations in determining amount of fuel types to be used during engine operation.

The routine then continues to 1710 in FIG. 17 to determine a desired engine torque. The desired engine torque may be based on a driver request, engine speed, gear ratio, cruise control, traction control, vehicle stability control, etc. Then, in 1714, the routine determines a desired air-fuel ratio based on operating conditions. For example, lean, rich, or near stoichiometric conditions may by selected. Then, in 1716, the routine reads the relative amounts type 1 and type 2 fuels from 1624, which accounts for warm-up effects and fuel availability.

In 1718, the routine determines feedforward amounts of type 1 and type 2 injections based on the relative amount, desired torque, desired air-fuel ratio, and/or other operating conditions. For example, the routine can determine a total amount of fuel energy that needs to be provided to provide the desired engine torque, and then proportion the fuel energy among the fuel types based on the desired ratio (or relative amount) of the fuel types taking into account different power density, fuel density, etc. of the fuel types, if present. Further, the routine can then determine an initial fuel amount for each fuel type, that when supplied to the engine at the current conditions, produces the desired torque, assuming sufficient air is present. The fuel amounts may be in various units, including a corresponding fuel pulse width (PW) given the injector characteristics for the fuel type, thus taking into account an injector slope and offset, for example.

Next, in 1720, the routine adds feedback air-fuel ratio adjustments to one or both of the fuel amounts. As described herein, the feedback adjustments may be based on air-fuel ratio sensors in the exhaust, and adjustments may change between different fuel types under different conditions. Again, the adjustments may be in various units, including pulse width (PW).

Continuing with FIG. 17, in 1722 the routine determines whether the type 2 pulse width is less than a minimum value (min_pw_2 for the type 2 injector). If so, the routine continues to 1724 to increase the type 2 fuel amount (e.g., PW) and decrease the type 1 fuel amount by a corresponding amount. In this way, in the example where type 2 fuel is used to decrease a tendency of knock, the system errs on providing additional type 2 fuel so that knock is reduced and operating at low pulse width values is also reduced or avoided.

Alternatively, if the answer to 1722 is no, the routine continues to 1726 to determine whether the type 1 pulse width is less than a minimum value (min_pw_1) for the type 1 injector. If so, the routine continues to 1728 to decrease the type 1 fuel amount (e.g., PW) to zero and increase the type 2 fuel amount by a corresponding amount. Again, in this way, in the example where type 2 fuel is used to decrease a tendency of knock, the system errs on providing additional type 2 fuel so that knock is reduced and operating at low pulse width values is also reduced or avoided.

From either 1728 or when the answer to 1726 is no, the routine continues to 1730 to determine an air amount based on the desired air-fuel ratio and the stoichiometric air-fuel ratio of the actual mixture provided via type 1 and type 2 injectors. The airflow can then be provided via an electronically controlled throttle, valve timing, or other such actuator.

In this way, it is possible to account for varying relative amounts of fuel types and varying total fuel amounts, while compensating for minimum fuel limits and providing a desired engine torque at a desired air-fuel ratio.

Referring now to FIG. 18, a routine is described for compensating for limits on the ability to use different fuel types under different conditions and compensate for the potential of engine knock. For example, in the case where a type 2 injection is used to reduce likelihood of knock (e.g., directly injected ethanol or an ethanol blend), limiting the used of such a fuel under selected conditions, along with other conditions (e.g., increased compression ratio, boosting, etc.) may result in knock occurring. In other words, in the example where ethanol is limited until the engine is warmed up, the control strategy may account for the effect of reduced ethanol on engine operation. And, if one purpose of ethanol is to enable increased compression ratio and/or increased boost pressure (because of ethanol's higher octane and higher heat of vaporization), when ethanol use is being limited (EF_MUL<1), it may be necessary to take additional control actions to avoid or reduce knock (despite the decreased knock tendency at lower temperatures). In one embodiment, feedback knock control where spark timing is adjusted in response to a knock sensor may be used. Alternatively, or in addition, open-loop knock avoidance may also be desired to provide a starting point for the closed-loop knock control system and/or as a back-up system for times that the closed-loop knock control system is degraded.

One approach to open-loop knock avoidance when EF_MUL is less than one can be provided with a combination of additional spark retard, additional enrichment, transmission downshifting (to increase engine speed, because knock may be less likely at higher speeds), load limiting with electronic throttle, and/or boost limiting via wastegate or variable geometry turbocharger adjustments. Depending on operating conditions (e.g. compression ratio and/or boost pressure), various control strategies could be used.

In a first embodiment, sensitivity of knock-limited spark advance may be mapped to a number of variables, such as RPM, torque, air/fuel ratio, engine intake air temperature, and also the amount of ethanol reduction (e.g., EF_MUL) or ethanol fraction as an additional variable.

In a second embodiment, where spark retard alone to avoid knock may be insufficient (e.g., excessive spark retard can cause surge and/or high exhaust temperature), additional modifications may be made. For example, the routine can first retard spark as much as feasible, then enrich the combustion air-fuel ratio to avoid or reduce knock. If the maximum feasible enrichment is encountered, then a transmission downshift may be commanded.

In a third embodiment, the routine can first retard spark as much as feasible, then command a transmission downshift. If there is still a potential for knock, the routine can then enrich enough to avoid or reduce knock.

In a fourth embodiment, the routine can limit maximum load with electronic throttle control. Such an approach may be used alone, or in combination with one of the first, second, and/or third embodiment above if those approaches provide insufficient knock control (because limiting maximum load may cause degraded driver satisfaction). The maximum allowed load can be mapped as a function of EF_MUL or ethanol fraction, engine speed, engine coolant temperature, relative air/fuel ratio, and other variables. For example, the following function may be used:

MAX_LOAD=$f$(EF_MUL or EF, RPM, ECT, a/f, etc.)

In a fifth embodiment, the routine can limit maximum boost with the wastegate and/or compressor bypass valve. Again, such action may be used alone, or in addition to one of the four embodiments above, if those strategies provide insufficient knock control (again because limiting maximum boost may cause driver dissatisfaction). The maximum allowed boost can be mapped as a function of EF_MUL or ethanol fraction, engine speed, engine coolant temperature, relative air/fuel ratio, and other variables, as:

MAX_BOOST=$f$(EF_MUL or EF, RPM, ECT, a/f, etc.)

Numerous variations on these embodiments are possible, for example the second and third embodiments could omit either downshifting or enrichment.

Referring now specifically to FIG. 18, in 1810 the routine compares the final type 1 and type 2 injection amounts to the initial amounts from FIG. 16. For example, the routine may determine a difference by which the fuel types have been adjusted, which may increase a tendency for knock based on the current operating conditions. Then, in 1812, the routine determines whether this difference is too great for the current conditions (e.g., the routine may make an open-loop estimate of whether knock may be encountered). If so, the routine continues to 1814 to adjust an operating parameter to reduce the tendency for knock, such as the five embodiments discussed immediately above herein.

In this way, even when the desired amount of type 2 injection to reduce knock is not available, knock may still be reduced in an efficient manner.

Figure 19:
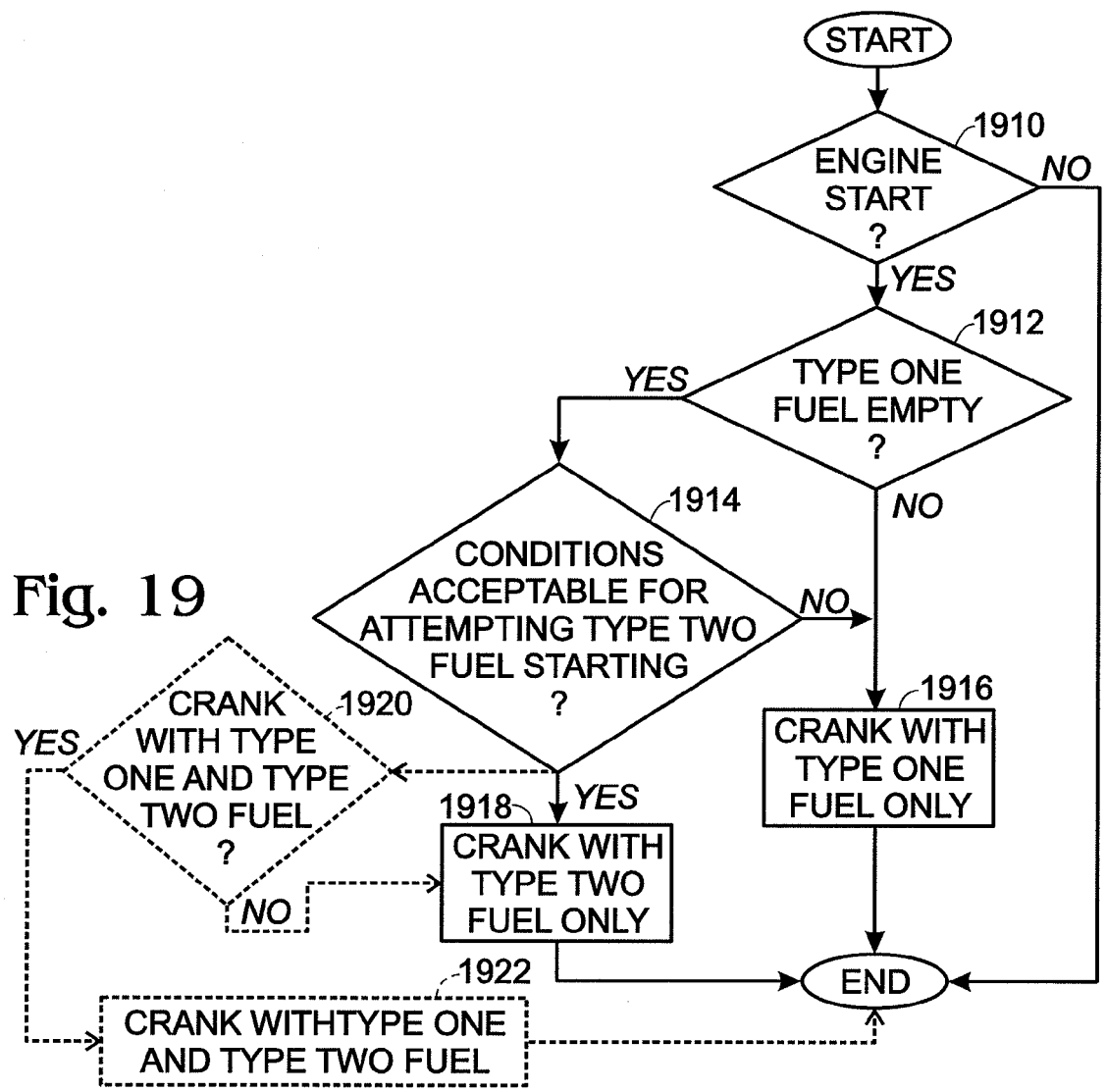
FIG. 19 shows a high level flow chart for engine starting taking into account fuel levels of different fuel types.

Referring now to FIG. 19, a routine is described for dealing with different levels of fuel or injection types during an engine start, and more particularly if a fuel type becomes unavailable since the storage is empty. For example, previous engine operation may result in depleting one fuel type. However, due to the approach described herein, it may be possible to run out of one fuel type without forcing an engine shutdown. Then, the routine of FIG. 19 may be used to decide when to allow the engine to run (or start) when one fuel tank is empty, or when one fuel type is depleted. The routine of FIG. 20 may be used to adjust current engine operation if a fuel type is depleted during engine operation.

Returning to FIG. 19, the routine first determines whether an engine start is requested (e.g., by monitoring key position, etc.). If so, the routine continues to 1912 to determine if the driver is attempting to start the engine when a first fuel type is depleted (e.g., a gasoline fuel tank is empty). If so, the routine continues to 1914 to determine whether to start on a type 2 fuel (e.g., ethanol, an ethanol blend, another alcohol containing fuel or blend, a different injector location, etc. The decision of 1914 may be based on a probability of successful starting using the type 2 fuel, and/or a probability of achieving acceptable exhaust emissions. Both of these factors may depend on factors such as temperature (of engine coolant and/or engine oil and/or engine intake air), and can be determined from:

START_PROB=$f$(ECT, EOT, ACT)

EMIS_OK_PROB=$f$(ECT, EOT, ACT)

If the probability of a successful start is below a threshold (i.e., answer to 1914 is no), then the engine can be cranked without any fuel injection (or operating only injectors for fuel type 1. If the probability of a successful start exceeds the threshold, then a start can be attempted with type 2 fuel in 1918. If a start is attempted but the probability of acceptable exhaust emissions is low, then an indicator light may be activated alerting the driver and an error code can be set.

In this way, it may be possible to provide an engine start even if a fuel type is depleted, while avoiding attempting starts under condition in which the remaining fuel type may cause degraded or unacceptable performance.

In one embodiment, when the answer to 1914 is yes, the routine may continue to 1920 to determine whether starting on both type 1 and type 2 fuel types may be performed. Such operation may desirable under selected conditions, such as based on ECT, EOT, ACT, barometric pressure, or combinations thereof. If so, the routine may proceed to 1922 to crank with both fuel types. And if not, the routine proceeds to 1918 as indicated above.

Figure 20:
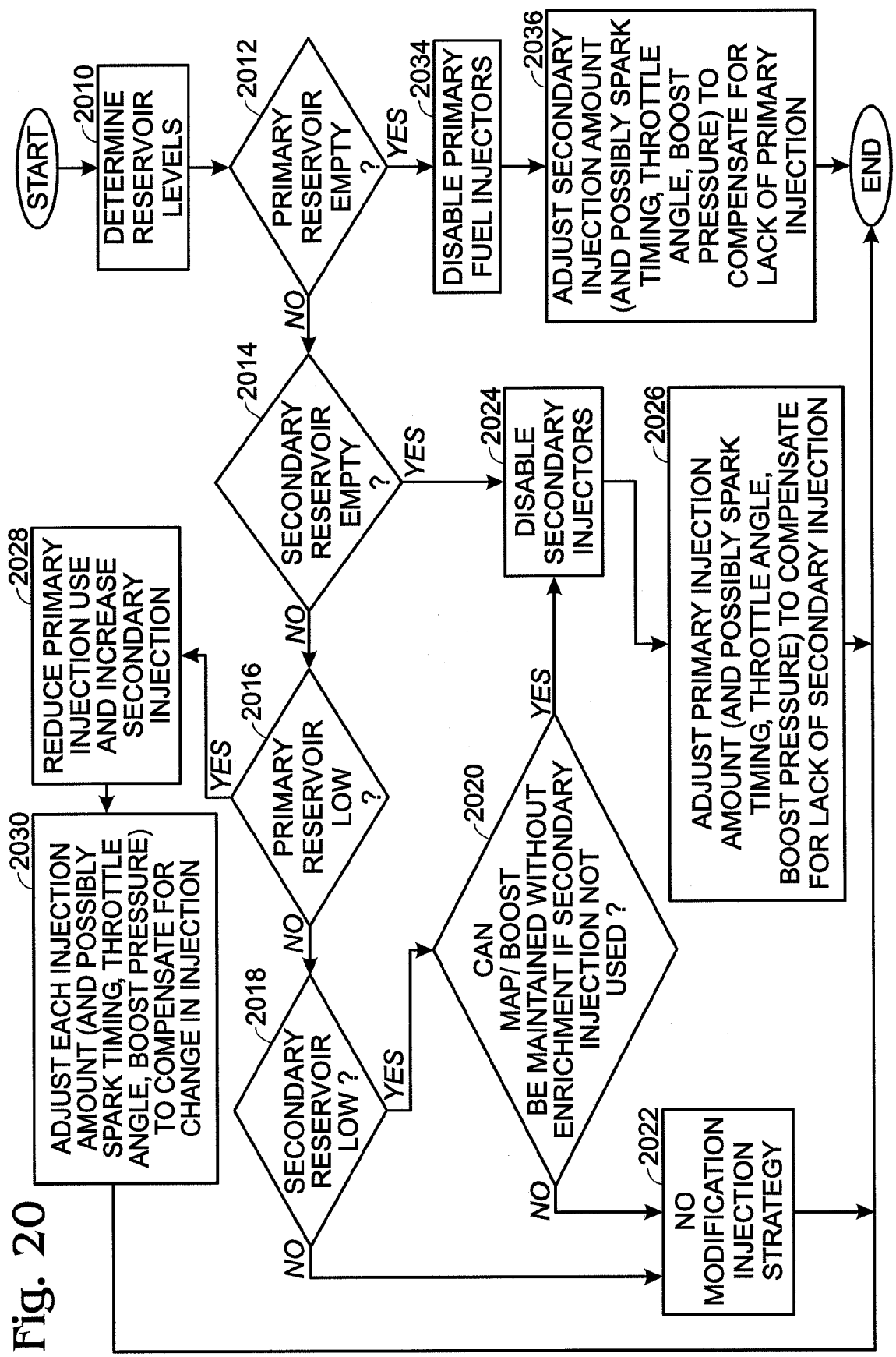
FIG. 20 shows a high level flow chart for compensating for depleting a fuel source.

Referring now to FIG. 20, a routine is described for adjusting operation if an injection type is depleted, such as in the case where a first reservoir coupled to a first injector contains gasoline or a gasoline blend, and a second reservoir coupled to a second injector contains an alcohol blend, such as an ethanol blend, or simply ethanol. Note, however, that the routine can apply to various other situations, such as where the second reservoir contains water or a water blend, for example.

First, in 2010 the routine determines respective reservoir levels of at least a first and second reservoir. As noted herein, the reservoirs may separately hold different fuel blends, where one reservoir is larger than another reservoir, which may be referred to as primary and secondary reservoirs, respectively. Next, in 2012, the routine determines whether the primary reservoir is empty. For example, the routine may determine the reservoir is empty if the fluid level is below an empty threshold, or if an estimate of the amount of fluid used reaches a preselected value, without a refilling event. If not, the routine continues to 2014 to determine whether the secondary reservoir is empty. Again, this may be determined in various ways. If so, the routine continues to 2024, otherwise the routine continues to 2016. In one example, the values that would be considered "low" for each reservoir level could be calibratable so that unmodified injection and engine function could be maintained for a majority of operation, or could be set so that it is maintained as long as possible.

In 2016, the routine determines whether the primary reservoir is low. For example, the routine may determine the reservoir is empty if the fluid level is below a low threshold, or if an estimate of the amount of fluid used reaches a second preselected value, without a refilling event. If so, the routine continues to 2028. If not, the routine continues to 2018 to determine whether the secondary reservoir is low. Again, this may be determined in various ways. If so, the routine continues to 2020, otherwise the routine continues to 2022.

In 2020, the routine determines whether the manifold absolute pressure level, and/or boosting level, can be maintained without enrichment if the secondary injection is not used. In other words, the routine determines whether the secondary injection is needed to avoid knock without adjusting using enrichment and/or spark retard, for example. If the answer to 2020 is yes, the routine continues to 2022. In 2022, the routine continues to use the injection amounts determined herein without modification. Otherwise, the routine continues to 2024 to disable the secondary injectors to one or more cylinders and adjust the primary injection amount in 2026. Specifically, the primary injection is adjusted to compensate for the reduction in secondary injection in terms of air-fuel ratio, torque production, etc. Further, additional adjustments may also be used, such as spark adjustments, throttle angle, boost pressure, or combinations thereof.

Continuing with FIG. 20, in 2028 and 2030, when the primary reservoir is low, the routine reduces primary injection and increases secondary injection. Specifically, the routine adjusts the secondary injection to compensate for the reduction in primary injection on parameters such as air-fuel ratio, torque, etc. In this way, it is possible to reduce usage of the primary reservoir, without increasing a potential for knock. Note that the amount of increase/reduction in 2028 may be based on various factors, such as engine speed and load, vehicle speed, etc. Further, additional adjustments may be used to compensate for the increase/decrease, such as boost pressure, spark retard, throttle angle, etc. For example, as the secondary injection increases, allowable boost (without encountering knock) may be increased.

In general terms, the routine of FIG. 20 can operate to first deplete the secondary reservoir before depleting the primary reservoir, at least in one embodiment. Such an approach can be desirable where the primary reservoir contains a fuel that is the fuel used for starting (e.g., the second reservoir contains a fuel with less volatility). In this way, if the vehicle is shut-off without refueling, engine starting may still be provided under a greater range of conditions.

Further, once it has been determined that the secondary supply is running low, the goal of the control system could be to maintain stoichiometric operation as long as possible to maintain emissions performance. The operating conditions could be evaluated to determine if the desired torque (or close to the desired torque) could be achieved with spark retard and without (or with reduced) fuel enrichment. If the desired torque could be obtained by increasing boost and retarding spark, then the secondary injection (e.g., ethanol or an ethanol blend) could be disabled. However, if enrichment is needed, then the secondary injection could be used. In such a circumstance, acceptable operating conditions in which the secondary injection is disabled could be mapped to determine acceptable spark, fuel, throttle, and boost settings without the secondary injection (e.g., without ethanol or with reduced ethanol). Then, once the secondary reservoir was depleted, the engine could still operate, but with potentially reduced maximum engine performance and/or reduced fuel economy (because of the potential need for additional fuel enrichment and spark retard to counteract knock).

In this way, it is possible to take advantage of multiple reservoirs with different fuel blends to extend engine operation and performance and/or efficiency gains over a greater range.

Figure 21:
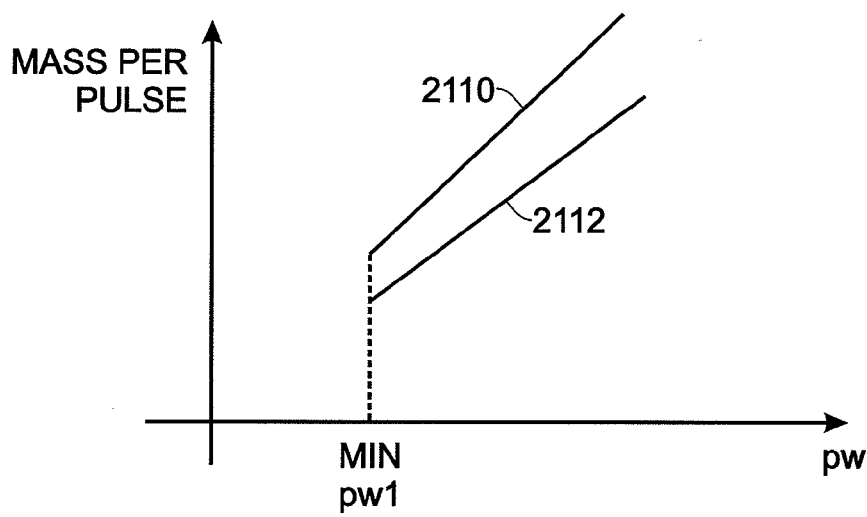
FIG. 21 shows a graph illustrating different fuel injector characteristics for two example injectors.

Referring now to FIG. 21, a graph illustrates different injector characteristics for two example injectors via lines 2110 and 2112. In one example, injector line 2110 can be for type 2 injection (e.g., ethanol, direct injector, water injection, etc.), while line 2112 can be for a type 1 injection (e.g., gasoline, port injector, gasoline blend, etc.). While this example shows each injector having the same minimum pulse width (minpw1), in another embodiment they may have different minimum pulse widths. The graph also illustrates how the injectors are sized for different maximum fuel flows, with different injector slopes. As noted herein, the air-fuel ratio feedback control gains and/or adaptive learning gains for the different injectors may be different to account for the variation in injector slope and/or offset (minimum flow value), as well as different fuel characteristics.

Figure 22:
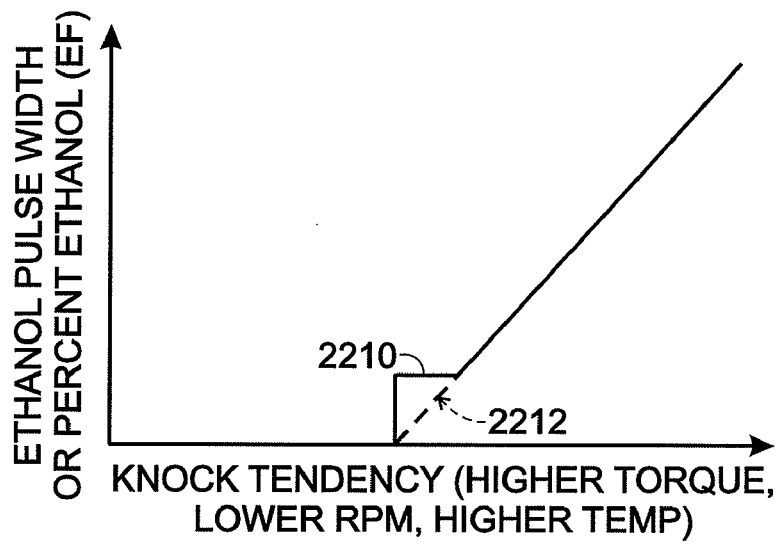
FIG. 22 shows a graph illustrating an example relationship of fuel injection as a function of knock tendency.

Referring now to FIG. 22, a graph is shown illustrating an example determination of an amount of type 2 injection (e.g., ethanol, an ethanol blend, direct injection, open valve port injection, etc.) in response to a determination of knock tendency (e.g., as torque increases, as speed reduces, as temperature increases, as humidity decreases, and/or combinations thereof). The graph illustrates with line 2210 (versus 2212) that when first phasing in ethanol (in addition to gasoline) at medium to high load, for example, near zero ethanol injection may not be feasible. As such, the control system adds a selected amount of ethanol at or near the minimum pulse width. In this way, for example, it is possible to provide sufficient ethanol to reduce tendency for knock without violating the minimum stable pulsewidth of the ethanol injectors.

Note that in the examples described in FIGS. 21 and 22, a single slope was used in the fuel injector response diagram. However, the graph may be non-linear, and for example may have two linear segments, each with its own slope and offset. Further, the graph may also have a curved response.

Figure 23:
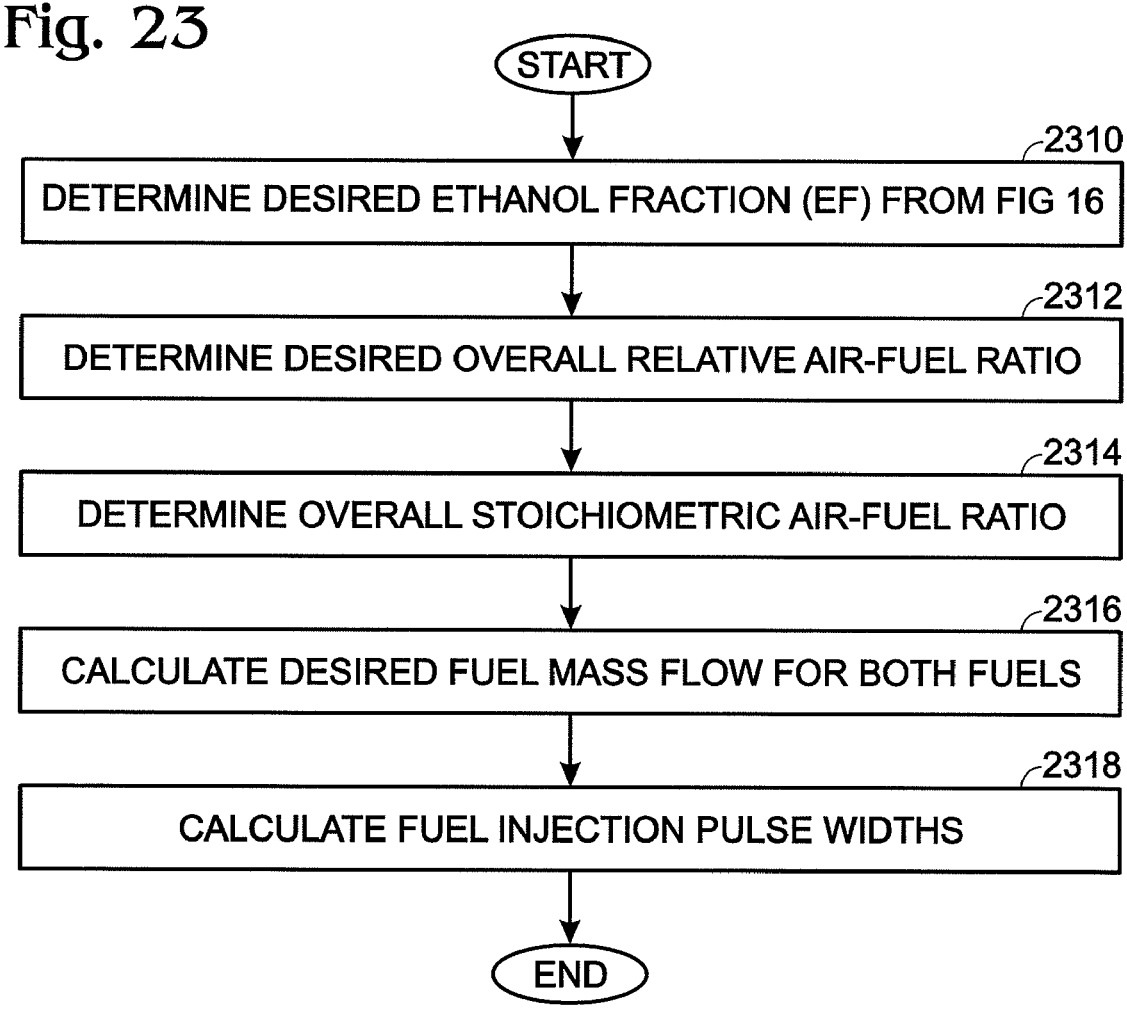
FIG. 23 shows a high level flow chart of an alternative embodiment for controlling fuel injection of a first and second fuel type taking into account minimum pulse width issues and different fuel type characteristics.

Referring now to FIG. 23, an alternative embodiment is described for controlling fuel injection of a first and second injection type, taking into account minimum pulse width issues and different fuel type characteristics. First, in 2310, the routine determines a desired fraction of a fuel type, for example ethanol fraction (EF). Next in 2312, a desired overall air-fuel ratio, or relative air-fuel ratio, is determined. Desired overall relative air-fuel ratio can be determined as a function of speed, load, inferred exhaust temperature, etc. The desired ethanol fraction can be determined primarily as a function of speed and load as described herein, with additional logic for start and warm-up, variable ambient conditions, low fuel levels of ethanol or gasoline, etc.

Next, in 2314, the routine calculates an overall stoichiometric air/fuel ratio for the EF of 2310 as:

$$AF\_stoich\_total = (1-EF)*(AF\_stoich\_gas) + (EF)*(AF\_stoich\_eth)$$

where AF_stoich_total is the overall stoichiometric air/fuel ratio, AF_stoich_gas is the stoichiometric air/fuel ratio for a first fuel type (e.g., for gasoline approx. 14.6), AF_stoich_eth=stoichiometric air/fuel ratio for a second fuel type (e.g., 9.0 for pure ethanol, approx. 9.8 for E85), and EF=desired ethanol fraction from 2310 (or in general, desired fraction of the second fuel type). Note that the stoichiometric values for gasoline and ethanol could be modified based on adaptive learning with feedback from exhaust oxygen sensors.

Next, in 2316 the routine calculates a desired fuel mass flow for the gasoline injector (which may be a port injector) and for the ethanol injector (which may be a direct injector) as:

fuel_mass_total=air_mass/[(AF_stoich_total)*(lambda)]

fuel_mass_gasoline=(1−EF)*(fuel_mass_total)

fuel_mass_ethanol=(EF)*(fuel_mass_total)

where lambda is a desired relative air-fuel ratio from 2312, AF_stoich_total is an overall stoichiometric air/fuel ratio from step 2314, and air_mass is an air mass entering the cylinder to be fueled, which may be measured or inferred.

Continuing with FIG. 23, in 2318, the routine then calculates fuel injection pulse width commands for the two injectors based on fuel masses calculated in 2316. Further, the routine includes adjustments to maintain the ethanol injection at least at the minimum pulse width (by reducing gasoline pulse width if necessary, or by turning off the gasoline injection if it reaches a minimum pulse width and increasing ethanol pulse width accordingly, as noted above herein with regard to FIGS. 17 and 22, for example).

Figure 24:
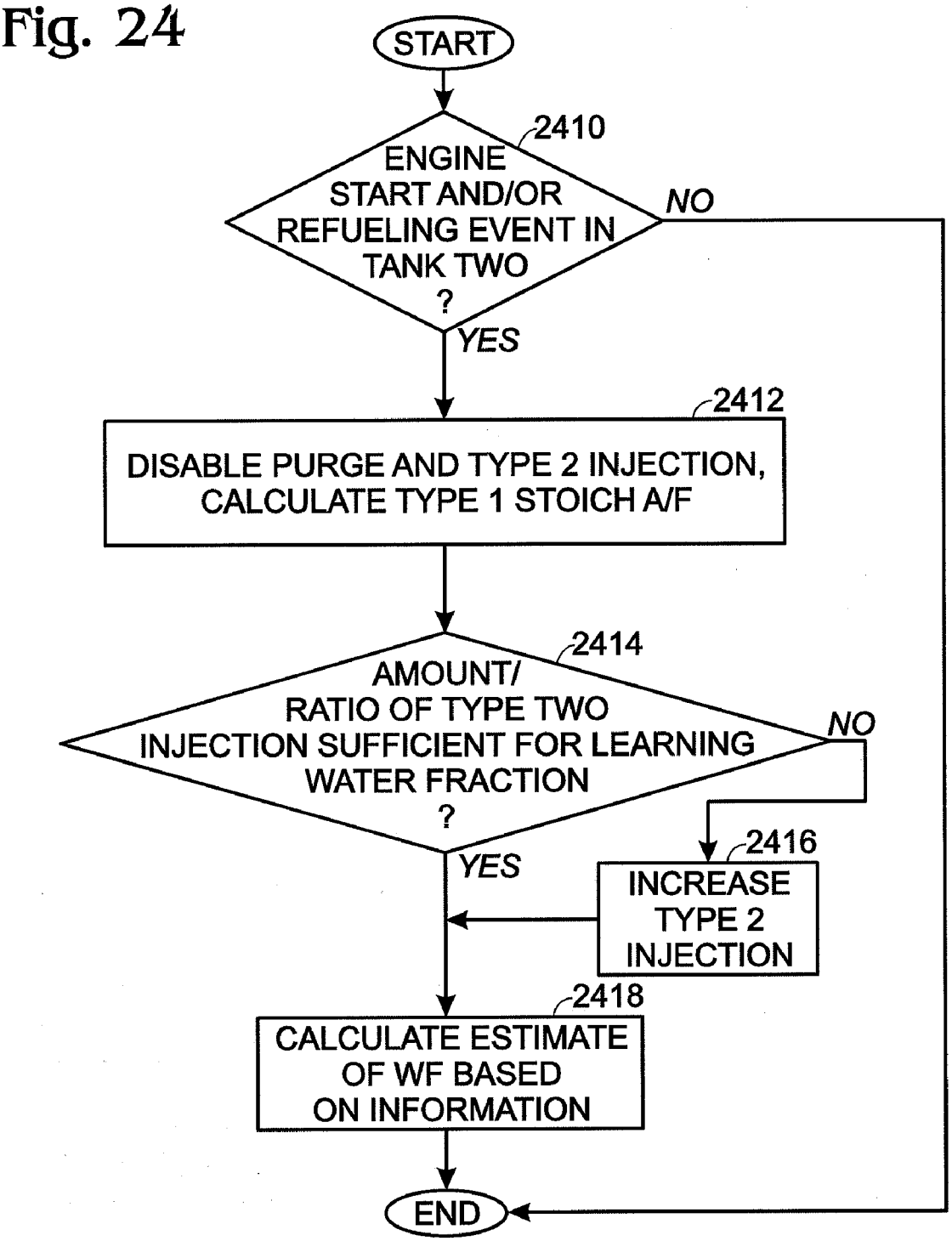
FIGS. 24-25 show high level flow charts for controlling operation using water injection.

Referring now to FIG. 24 et seq., routines and graphs are shown for an example where a first injection type is gasoline or diesel fuel, and a second injection type includes water, such as pure water, a water and alcohol blend, or a water and ethanol blend, or a water and methanol blend, or others as noted herein. Further, in one embodiment, type 1 injection is port injected fuel to a cylinder, while type 2 injection is directly injected fuel to the cylinder. In another embodiment, both types of injection can be port injection, such as shown in FIG. 4 or 5.

As discussed herein, a possible benefit of multiple fuel types, such as using gasoline and ethanol, is that knock may be suppressed under conditions where it may otherwise occur due to a combination of higher fuel octane and increased charge cooling (e.g., due to the ethanol's higher heat of vaporization). The charge cooling effect may also be enhanced by providing the charge cooling effect mostly by the air, with little or no evaporation from metal surfaces like the intake manifold, via direct injection or targeted port injection with open valve injection.

However, ethanol (or other alcohol based fuels) may be expensive or unavailable at some times and/or locations. Thus, if relying on such fuels, if they are unavailable, engine torque and/or performance may be limited. To reduce or eliminate such torque and/or power limitations, one approach could include added hardware and/or control logic to allow use of water (or water/ethanol, or water with an alcohol containing mixture, or other mixtures) in the second (e.g., ethanol) fuel system.

For example, water, or a water mixture, could attain part or all of the knock benefit of ethanol at high loads. Although water has no specific octane value, it does have a higher heat of vaporization (approximately 2256 kJ/kg, compared to approximately 840 for ethanol and approximately 350 for gasoline). Therefore, by enabling injection (direct or port) of water (or a water alcohol mixture), similar knock improvements may be achieved. Further, an additional benefit of water/ethanol flexibility may be the ability to use very late injection of water (when the tank is filled with mostly water). Late injection could be used for exhaust temperature control and/or increased boost at low RPM and/or reduced turbo lag.

In one approach, when enabling a second injection source to have a varying ratio of water and an alcohol blend (e.g., water and ethanol, or water and an ethanol/gasoline blend), it may be beneficial to be able to measure or infer the Water Fraction (WF) in the ethanol/water fuel tank, or conversely, the ethanol fraction. WF may vary from zero (pure ethanol) to one (pure water), in this example. This information can then be used for various features, including determining the desired amount of gasoline and the water/ethanol blend to provide a desired torque while reducing knock, and also to maintain accurate control of combustion overall air/fuel ratio.

In one embodiment, a sensor could measure one or more properties that differ between water and ethanol, for example any of the following, or combinations thereof, may be used: specific gravity (about 1 for water, and about 0.789 for ethanol), viscosity (about 21 lb-s/ft2 for water and about 25 for ethanol), capacitance, resistance, or others. Sensor readings may use compensation for temperature and other changes that affect the properties of water and/or ethanol, if desired.

In another embodiment, an inferred estimate of the water fraction (WF), or equivalent parameter may be used. One process of inferring WF may include performing the estimate at specific times, for example after each engine start and/or after a refueling event is detected via fuel level sensor. The WF inference process can occur when the engine is running on gasoline in closed-loop air/fuel control (e.g., stoichiometric feedback control), with vapor purge disabled.

The WF inference process may include gradually increasing pulse width on the water/ethanol injector(s) while maintaining an overall stoichiometric air/fuel ratio based on closed-loop control using exhaust oxygen sensors via corresponding reduction of the gasoline injection pulse width. The pulse width values and/or changes of the gasoline and water/ethanol injectors can then be used to calculate WF. For example, if the pulse width of the water/ethanol injectors can be greatly increased and/or decreased with no or minimum decrease and/or increase in gasoline injector pulse width, then WF is one (pure water).

Alternatively, or in addition, a combination of feedback information and other information can be used to estimate WF. For example, one can use the airflow (e.g., from the MAF sensor) and air/fuel ratio (e.g. from an exhaust sensor) to determine a total amount of fuel provided by the injectors, and then use the injector slopes and offsets to determine an amount and ratio of water in the water/ethanol mixture.

In one embodiment, various factors may be considered, including injector transfer functions (fuel mass flow vs. pulse width) may include compensation for changes in specific gravity and viscosity, which can be themselves a function of the water fraction. Thus, the water fraction (WF) may be referred to as the fraction of water in an ethanol/water mixture, although other fractions may be used, such as the fraction of water in the overall ethanol/water/gasoline mass. In the example where the water fraction is the fraction of water in an ethanol/water mixture, the following procedure may be used for calculating/estimating the water fraction (WF) during engine operation:

(1) First, the method may be enabled once the system has attained convergence about stoichiometry with feedback from one or more exhaust gas oxygen sensor(s), using type 1 injectors only (e.g., gasoline injectors in this example).

(2) Next, a turn-on pulsewidth near a minimum pulsewidth on the type 2 injectors (e.g., ethanol/water injectors in this example) may be set. A smaller pulsewidth is desired to reduce excursions in the air/fuel ratio when injecting an unknown, or relatively unknown water mixture (where the mixture may be an ethanol/water mixture in one example). The minimum pulsewidth can be the pulsewidth which gives stable and repeatable flowrate control, and may be variable with operating conditions. In one example, to improve accuracy in determining a water fraction (WF), a larger pulsewidth may be used to increase the signal to noise ratio (i.e., generate a larger amount of water to be detected). The turn-on pulsewidth may be determined in at least two ways: (a) mapping of representative hardware, and determination of minimum pulsewidth for accurate WF calculations (this may be a function of speed, load, temperature, etc.), or (b) starting with the minimum stable pulsewidth, and gradually increasing pulsewidth of the ethanol/water injectors during (3) below, until the pulsewidth of the gasoline injectors changes sufficiently to ensure an accurate WF calculation.

(3) Next, the controller can adjust a pulsewidth of the type 1 (e.g., gasoline, in this example) injectors to regain closed-loop stoichiometry based on exhaust oxygen sensor(s).

(4) Then, by using the pulsewidth adjustment amount of the gasoline injectors, the controller can calculate a mass of gasoline per cylinder per combustion event, or fuel_mass_gas. This can be done using a conversion that includes the injector slopes, such as described with regard to FIG. 35.

(5) Using the mass of gasoline from (4), the measured or inferred air mass, and the known stoichiometric air/fuel ratios of the fuels being combusted (e.g., gasoline and ethanol), the controller can calculate an ethanol fraction (EF) using the equation below. The controller can calculate the stoichiometric air/fuel ratio of the gasoline during step (1) above, based on measured or inferred air mass and on injector mass flow vs. pulsewidth (thus accounting for variations due to oxygenated gasoline etc). Specifically, an example ethanol fraction (EF) can be calculated as:

$$EF = \frac{(air\_mass - fuel\_mass\_gas * AF\_stoich\_gas)}{\left(\begin{array}{c}air\_mass - fuel\_mass\_gas * AF\_stoich\_gas + \\ fuel\_mass\_gas * AF\_stoich\_eth\end{array}\right)}$$

where
EF=ethanol fraction of total gasoline+ethanol (not water)
air_mass=mass of air per cylinder per combustion event
fuel_mass_gas=mass of gasoline per cylinder per combustion event
AF_stoich_gas=stoichiometric air/fuel for gasoline (approximately 14.6, or from (1))
AF_stoich_eth=stoichiometric air/fuel for ethanol (approximately 9.0 for pure ethanol, or approximately 9.8 for E85, or from previous closed-loop operation on ethanol similar to (1)).

(6) Using the mass of gasoline from (4) and the ethanol fraction from step (5), the controller can calculate the mass of ethanol using the equation below.

fuel_mass_ethanol=(EF*fuel_mass_gas)/(1−EF)

where fuel_mass_ethanol=mass of ethanol per cylinder per combustion event.

(7) Using the mass of ethanol from (6) and the pulsewidth of the ethanol/water injectors, the controller can calculate the water fraction (WF) using one of the equations below.

If the injector characteristics (slopes) are not a function of water fraction, the equation is:

WF=1−{fuel_mass_ethanol/[(PW−OFFSET1)*ALOSL]} where
WF=water fraction, of total ethanol+water (not gasoline in this example)
PW=pulsewidth of the ethanol/water injectors
OFFSET1=ethanol/water injector offset (initial delay) as a function of voltage
ALOSL=slope of ethanol/water injectors (mass per time) at low PW If the injector characteristics (slopes) are a function of the water fraction, the equation is:

$$\frac{-ALOSL\_eth*(k-2) - sqrt[ALOSL\_eth^2 * (k-2)^2 - 4*ALOSL\_eth*(1-k)* (ALOSL\_eth - fuel\_mass\_ethanol/(PW - OFFSET1))]}{(2*ALOSL\_eth*(1-k))}$$

where
ALOSL_eth=slope of ethanol/water injectors at low PW with ethanol
ALOSL_water=slope of ethanol/water injectors at low PW with water
k=ALOSL_water/ALOSL_eth
sqrt[ ]=square root of expression in brackets While the above equations show one approach for performing the calculations and determinations, they may be modified to include alternative fuel types, alternative injector characteristic equations (for example mass flow vs pulsewidth may be curved), etc. Further, various modifications may be made to the equations to improve accuracy, or improve simplicity of calculation, if desired.

To illustrate the source of the above equations and thus provide details for modification of the equations, the relationship between the mass of gasoline, the measured or inferred air mass, the known stoichiometric air/fuel ratios of the fuels being combusted (e.g., gasoline and ethanol), and the ethanol fraction (EF) can be derived by first noting that: fuel_mass_gas=(1−EF)*fuel_mass_total, and then manipulating this equation to substitute for the fuel mass in terms of the air mass and overall air-fuel ratio as: fuel_mass_gas=(1−EF)*air_mass/AF_stoich_total. Then, the individual air-fuel ratios of the fuel types can be inserted as: fuel_mass_gas=(1−EF)*air_mass/[(1−EF)*AF_stoich_gas+EF*AF_stoich_eth]. From this, the equation can be rearranged to give: fuel_mass_gas*AF_stoich_gas−EF*fuel_mass_gas*AF_stoich_gas+EF*fuel_mass_gas*AF_stoich_eth=air_mass−EF*air_mass, which leads to the equation listed above in (5).

Likewise, the mass of ethanol may be derived by noting that fuel_mass_ethanol=EF*fuel_mass_total. Then, by manipulating this equation, the equation listed in (6) can be obtained.

Further, the water fraction (WF) can be derived (in the case where any interaction between WF and slope/offset changes is ignored) by starting with the following equation 1:

PW=OFFSET1+LBM_INJ_TOT/ALOSL   [equation 1]

where
PW=pulsewidth of the ethanol/water injectors
OFFSET1=ethanol/water injector offset (initial delay) vs battery voltage
LBM_INJ_TOT=total mass of ethanol/water mixture injected per cylinder per combustion event
ALOSL=slope of ethanol/water injectors (mass per time) at a lower PW Note that the water fraction determination process occurs with the ethanol/water injectors at low pulsewidths, so these equations are based on the steep part of curve with slope ALOSL (it will be apparent that similar equations could easily be derived for higher pulsewidths if desired).

Then, using a definition of WF and rearranging to solve for LBM_INJ_TOT gives:

WF=fuel_mass_water/LBM_INJ_TOT=(LBM_INJ_TOT−fuel_mass_ethanol)/LBM_INJ_TOT

Note that WF is the fraction of water in the ethanol/water mixture in this example, not the overall ethanol/water/gasoline mass, although such a parameter may be determined and used for engine control. The equation above can be rearranged to give equation 2:

LBM_INJ_TOT=fuel_mass_ethanol/(1−WF)  [equation 2]

Rearranging equation 1 and substituting LBM_INJ_TOT from equation 2 gives: (PW−OFFSET1)*ALOSL=fuel_mass_ethanol/(1−WF), which can be rearranged to give:

WF=1−{fuel_mass_ethanol/[(PW−OFFSET1)*ALOSL]}

In an alternative embodiment, the equations may be derived for the case where the injector slope (and/or offset) is a function of the water fraction. In this example, the characteristics of FIG. 35 may again be utilized. As above, in one example, the water fraction determination process may occur with the ethanol/water injectors at pulsewidths below a threshold value (such as below PW_BP), and thus the following equations can be based on the steeper part of the injector curve with slope ALOSL, although similar equations could be derived for higher pulsewidths, if desired.

In this example, it is assumed that the offset (OFFSET1) is not a function of water fraction, because the offset is the time required to overcome inertia of the injector pintle and electrical inertia of the driver circuit, although it may be a function of other parameters, such as battery voltage and temperature. Assuming that the injector slope changes linearly in proportion to the water fraction, the slope would be measured with pure water and with pure ethanol (or E85) and expressed as:

ALOSL_total=WF*ALOSL_water+(1−WF)*ALOSL_eth where
ALOSL_water=slope of ethanol/water injectors at low PW with water
ALOSL_eth=slope of ethanol/water injectors at low PW with ethanol
ALOSL_total=slope of ethanol/water injectors at low PW with ethanol/water mixture
Substituting ALOSL_total into equation 1 yields:

PW=OFFSET1+LBM_INJ_TOT/[WF*ALOSL_water+(1−WF)*ALOSL_eth]  [equation 3]

Substituting LBM_INJ_TOT from equation 2 gives:
PW=OFFSET1+[fuel_mass_ethanol/(1−WF)]/[WF*ALOSL_water+(1−WF)*ALOSL_eth], which can be rearranged to give:

WF*WF*(ALOSL_eth−ALOSL_water)+WF*(ALOSL_water−2*ALOSL_eth)+ALOSL_eth−fuel_mass_ethanol/(PW−OFFSET1)=0

Expressing the injector's water slope as a constant multiplied by its ethanol slope gives ALOSL_water=k*ALOSL_eth, which can then be substituted into the previous equation as:

WF*WF*(ALOSL_eth−k*ALOSL_eth)+WF*(k*ALOSL_eth−2*ALOSL_eth)+ALOSL_eth−fuel_mass_ethanol/(PW−OFFSET1)=0

Solving the quadratic function yields two possible results, with the physically meaningful solution having WF greater than or equal to zero. Further, in this example, k should be greater than one because water has a higher density and lower viscosity than ethanol. Approximating injector flow with the equation for orifice flow, it becomes clear that k may also be less than two in this example. From this, the appropriate selection of the equation for WF can be obtained, which is set forth above herein in (7).

Referring now specifically to FIG. 24, a routine is described for estimating a water fraction using the equations noted herein. In 2410, the routine determine whether an engine start and/or refueling event in the tank for the water (or water blend) has occurred. If so, the routine continues to 2412 (if not, re-calculation of WF is not necessary). In 2412 the type 2 injection (e.g., water/ethanol injection) and fuel vapor purging systems are disabled, and stoichiometry for type 1 injection (e.g. gasoline) is calculated based on measured or inferred air mass and on feedback from the exhaust gas oxygen sensor. Then the routine continues to 2414 to determine whether the amount and/or ratio of type 2 injection is sufficient to provide accurate learning/estimation of a water fraction.

If not, the routine increases the amount and/or frequency of type 2 injection in 2416 to increase sensitivity and/or accuracy of the measurement. Further, in 2416, the routine may also purge a water/ethanol mixture through the fuel lines after a refueling event, to ensure that the inferred WF reading has sufficient accuracy and correlation to the mixture in the tank. The purging could involve bypassing the water/ethanol fuel rail on a return fuel system. In the example of a return-less fuel system, the WF inference process described above may continue for a sufficient time or number of injections to ensure that the water/ethanol mixture in the fuel lines has been used and the new mixture ratio is provided to the engine thus providing accurate estimates. This time can be calculated from the known volume of the fuel line and summation of the water/ethanol used during the WF inference process, if desired. Finally, the routine continues to 2418 to update the estimate of WF based on the sensed information using a rolling average filter, or other such filter.

While the above approaches have been described for estimating a water fraction, various modifications and/or changes and/or additions may be used. For example, the estimation may occur at periodic intervals, or throughout engine operation, rather than only in response to an engine start or refueling event. Further, type 2 injection may be provided specifically for estimation, even when not needed to reduce knock, so that an estimate can be updated, or the estimate could be updated only when type 2 injection is needed to reduce knock.

By providing an accurate estimate of the water fraction, it is possible to provide more accurate delivery via the type 2 injection and thus provide improved knock resistance and efficient use of the type 2 resources. An example of a routine to take advantageous use of such information is provided below with regard to FIG. 25.

Figure 25:
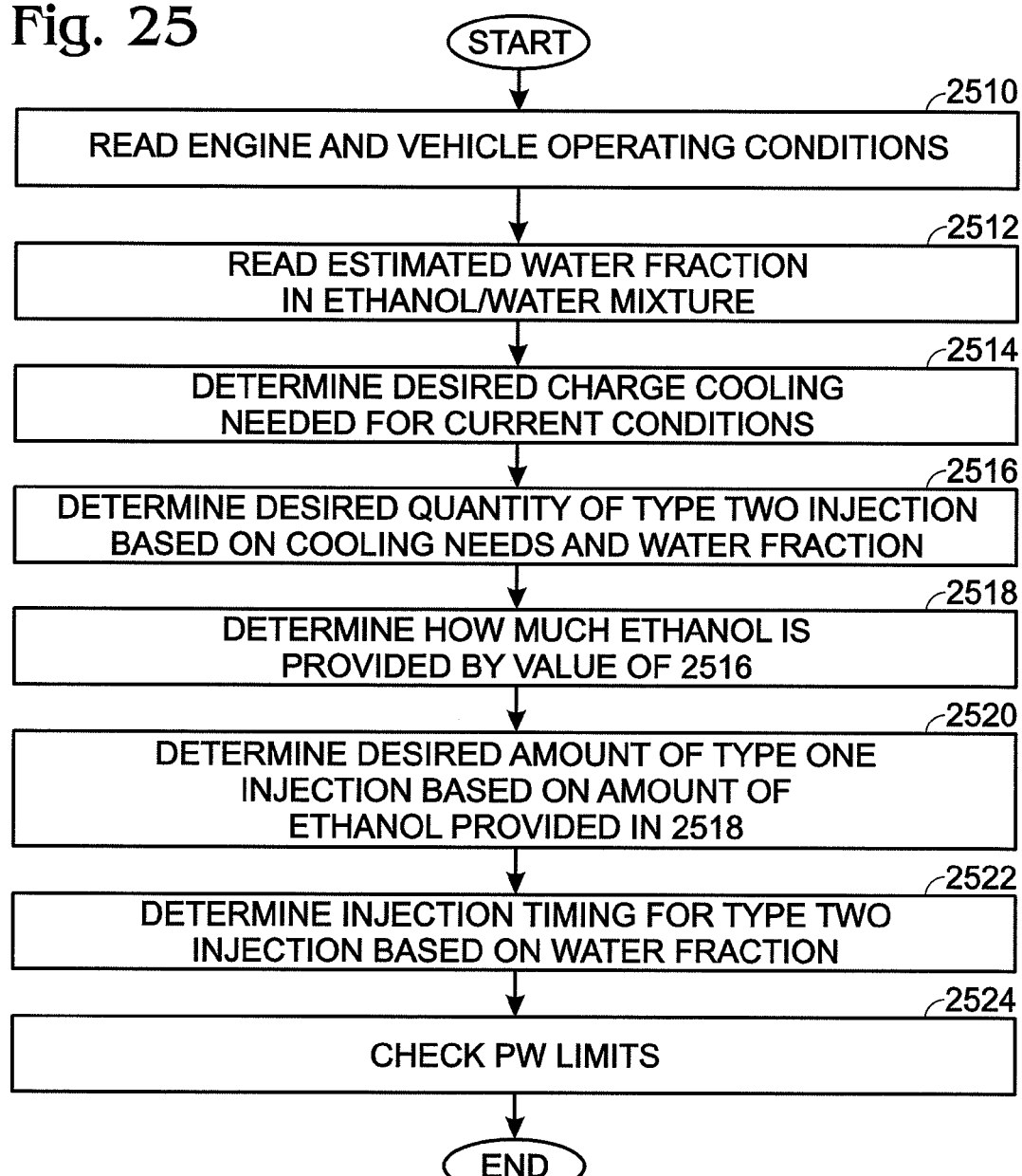

Referring now specifically to FIG. 25, a routine is described for controlling engine operation based on a water fraction of an ethanol/water blend in a tank provided via a direct injector or port injector to the engine, in addition to a gasoline injector (port or direct).

In this example, various parameters are adjusted as the water fraction in a water/ethanol blend varies. For example, the measured or inferred water fraction may be used to control the amount of gasoline injection and the amount of water/ethanol injection for a given set of operating conditions. Further it may be used to adjust a desired air-fuel ratio and/or desired ethanol fraction due to changes in cooling and octane effects. It may be used to adjust injection pulse width of the water/ethanol injector in order to attain the desired mass flow of water and/or ethanol. It may also be used to limit maximum torque and/or power and/or boost to reduce engine degradation, at least under some conditions.

The measured or inferred water fraction may also be used to vary injection timing. In particular, if the WF is close to one, then very late injection (during the expansion and/or exhaust stroke) can be used to control exhaust temperature. Such an approach may be used when there is little or no ethanol in the mixture, thus avoiding to potential emissions (e.g. HC, aldehydes, CO, etc.) that may be produced from the late injection of ethanol. In this way, late water injection for exhaust temperature control may be used under some conditions.

Also, on a turbocharged engine, late injection may also be used to increase mass flow to the turbine, which may increase boost at low RPM and/or reduce turbo lag. While there may be a penalty from lowering temperature/energy to the turbine (which may offset the benefit of added mass flow), it may be possible to avoid or reduce this penalty by injecting at a time when the water spray is likely to impinge on the piston and/or cylinder walls. Such operation may avoid excessive cooling of the exhaust gas.

In 2510, the routine reads engine operating parameters, such as engine speed, engine load, etc. Then, in 2512, the routine reads an estimated water fraction (WF) in an ethanol/water mixture, such as described above with regard to FIG. 24. Next, in 2514, the routine determines a desired charge cooling or knock reduction based on current operation conditions, and optionally based on feedback from a knock sensor or other sensor indicative of knock.

Figure 26:
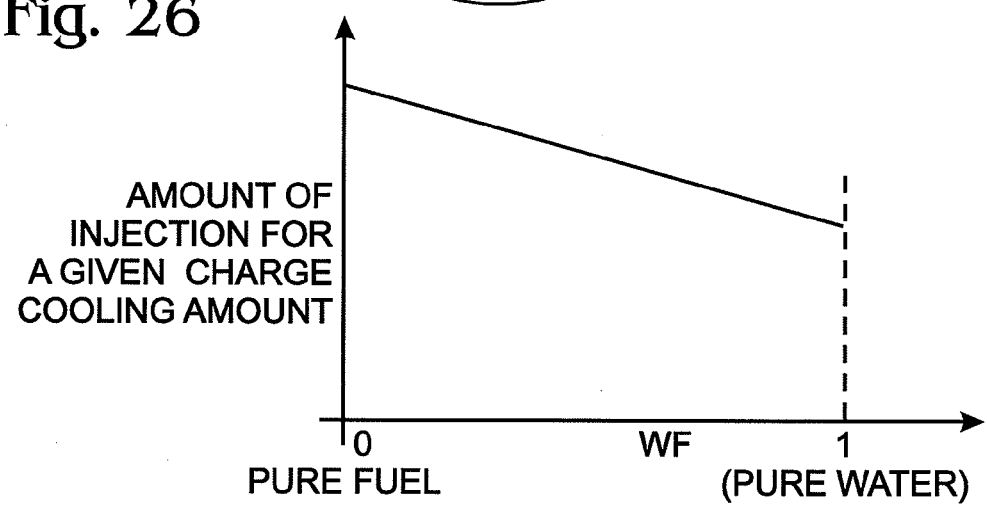
FIGS. 26-27 show graphs illustrating an amount of injection to reduce knock for varying water content and varying amounts of desired charge cooling.

Then, in 2516, the routine determines a desired quantity of type 2 injection based on the knock reduction needed and the water fraction. For example, as shown by FIG. 26, due to the greater charge cooling effect of water, as the water fraction increases, a smaller quantity (or PW) of type 2 injection may be desired. Further, as the water fraction increases, less adjustment to the type 1 injection (e.g., gasoline injection) is needed as less combustible fuel is provided via the type 2 injection, which compensation is provided via 2518 and 2520. These determinations identify how much ethanol (or ethanol blend, or another alcohol or alcohol blend) is provided based on the amount determined in 2516, and then determine the amount of adjustment to the type 1 injection. Then, in 2522, the routine determines injection timings for the type 2 injection based on the water fraction and the value from 2516. Finally, the PW limits are checked in 2524 and adjustments are made if necessary, as described herein above.

Various advantages may be achieved by such operation. In one example, it is possible to use knowledge of the water fraction to provide a correct amount of charge cooling to reduce knock, even when the water fraction is changing. Further, it is possible to maintain accurate engine air-fuel ratio control and torque output by compensating for variability in water fraction by appropriate adjustment of the type 1 fuel injector based on the water fraction.

In this way, it is possible to use water injection, or a blend of water injection, to increase compression ratio and/or boost pressure due to decreased knock at high loads, while also compensating for variability in the water fraction and alcohol (e.g., ethanol) fraction of the mixture. Further, a vehicle customer is able to achieve improved engine operation using one or both of water and an alcohol based fuel as a secondary injection in the engine. Further still, late injection for exhaust temperature control and/or increased boost at low RPM and/or reduced turbo lag can be provided with water injection, for example directly injected water or water blend.

Figure 27:
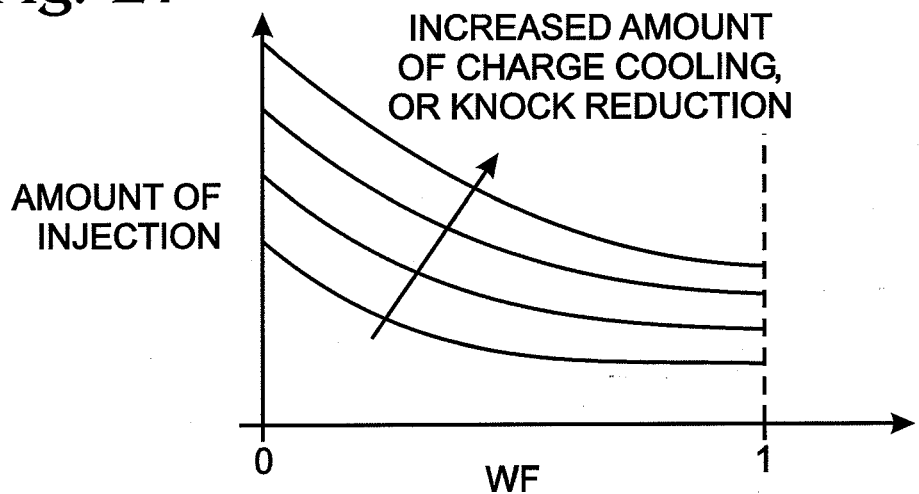

As noted above, FIG. 26 shows the amount of type 2 injection for a given charge cooling amount. Note that while a linear curve is shown, this is just one example, and the curve may be nonlinear. Also note that this is just one curve shown for a single desired amount of charge cooling. A different curve may be used for each amount of charge cooling, providing a family of curves, as shown in FIG. 27.

Figure 28:
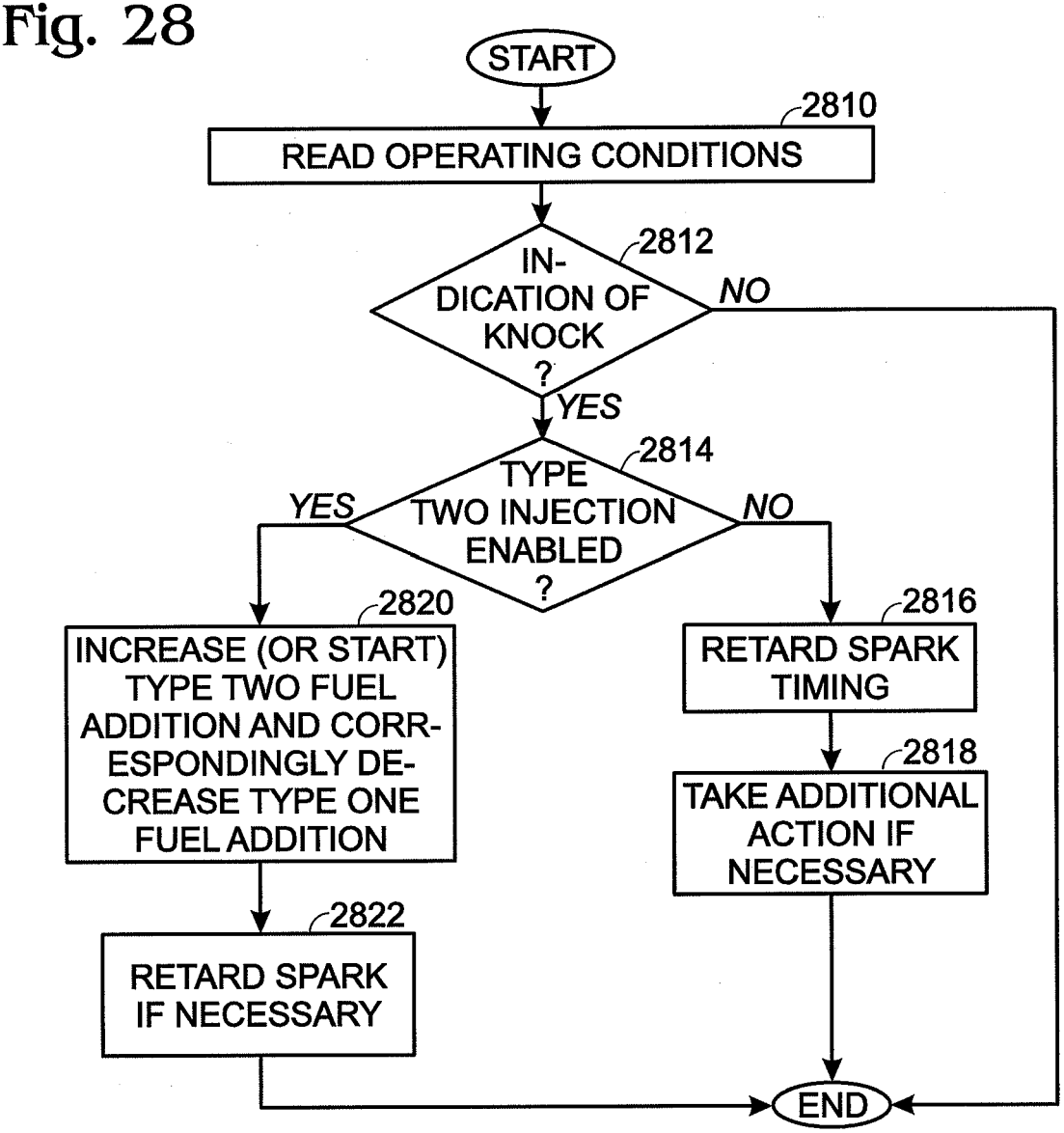
FIG. 28 shows a high level flow chart for controlling fuel type injection amounts (and relative amounts) and/or adjusting ignition timing to reduce knock.

Referring now to FIG. 28, a routine is described for reacting to an indication of engine knock, such as from a knock sensor, cylinder pressure sensor, or other indication that knock is occurring, or is about to occur. In 2810 the routine reads current operating conditions, such as speed, load, etc. Then, in 2812, the routine determines whether a measure of knock from knock sensor 182 has reached a threshold value thus providing an indication of knock. As noted above, various other indications may be used, if desired.

If knock is indicated in 2812, the routine continues to 2814 to determine whether type 2 injection is enabled and whether additional type 2 injection/fueling is feasible. In other words, the routine determines whether conditions are acceptable to use any type 2 injection, such as, for example, coolant temperature, whether type 2 fuel is depleted, and various others as noted herein, and whether type 2 pulsewidth is less than maximum. If not, the routine proceeds to 2816 to retard spark timing to reduce knock, and then takes additional actions in 2818, optionally, if necessary, such as reducing airflow, etc.

If the answer to 2814 is yes, the routine proceeds to 2820 to increase type 2 injection (e.g., ethanol injection) and correspondingly decrease type 1 injection to reduce a tendency for knock, assuming that it is possible to increase type 2 injection and/or decrease type 1 fuel injection. Alternatively, the desired ethanol fraction (EF) may be increased to increase a relative amount of ethanol to gasoline, assuming it is possible to further increase the fraction. In other words, resort to spark retard and other operations as noted herein to reduce knock may be used if type 2 injection is near a maximum available amount. Thus, spark may optionally be retarded relative to its current timing before or concurrently with the type 2 injection increase in 2822, and then returned once the fuel adjustments have been effective. Note that the combination of spark timing and fuel adjustment may be beneficial in that the spark timing change may have a faster response on knock than the fuel change under some conditions. However, once the fuel adjustment has been effected, the spark timing may be returned to avoid fuel economy losses. In this way, fast response and low losses can be achieved. Under other conditions, only spark adjustments, or fuel adjustments without spark adjustments may be used so that even temporary retard of spark timing is reduced.

Various examples of such alternative operation are shown in the graphs of FIG. 29, which show an indication of knock in the top graph (where the dashed line is a limit above which knock is identified, where the threshold may be variable with operating conditions), spark timing relative to a reference (dashed line) in the second graph, type 1 injection amount (e.g., port fuel amount) in the third graph, and type 2 injection amount (e.g., direct cylinder alcohol containing fuel amount) in the bottom graph.

In this example, at time t1 an indication of knock rises above a threshold value and the spark timing is retarded while the type 1 and type 2 injection amounts are also adjusted. In this case, the fuel adjustments are offsetting in direction and of different amounts to account for the different power density and stoichiometric air-fuel ratio between the fuel types. The spark timing is than returned to avoid further fuel economy losses.

Then, at t2, the engine output torque is gradually increased by increasing airflow and respective fuel amounts until at t3, an indication of knock is again generated. At t3, the routine adjusts type 1 and type 2 injection amounts without additional spark retard to reduce knock, while still increasing the total fuel injection energy. Then, fuel injections and airflow increases, and then decreases until at time t4 knock again reaches a threshold value. At this point, spark timing is retarded until t5, at which point the fuel injection amounts are adjusted, while still continuing to reduce the total amount of fuel energy. At t5, the effect of the relative fuel adjustment between the fuel types takes effect and the spark timing may be gradually returned to its desired position to avoid further fuel economy losses from retarded ignition timing.

In this way, it is possible to provide varying levels of total fuel injection amounts, while varying the relative amounts of fuel types and ignition timing to reduce knock.

Figure 30A:
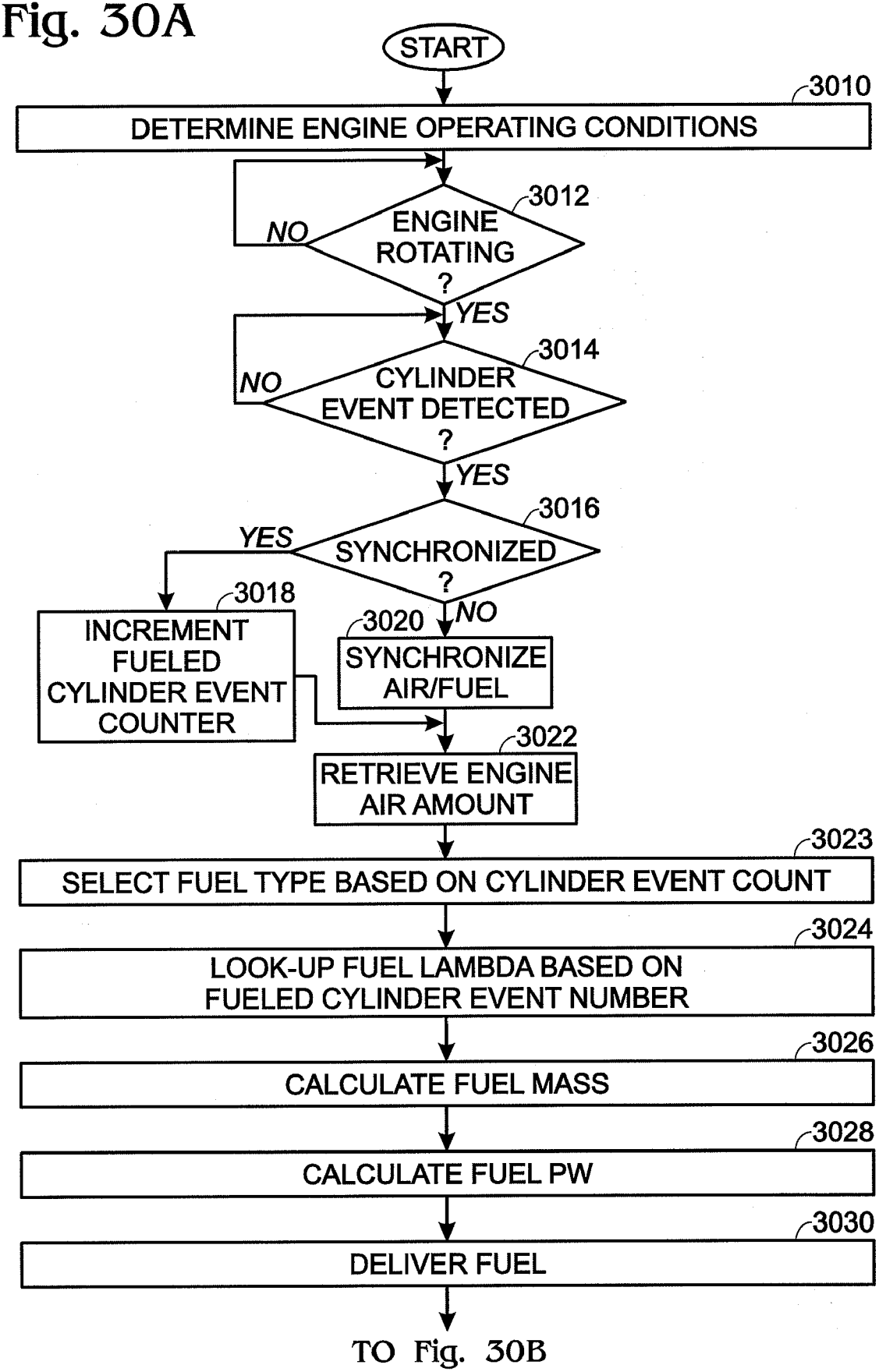
FIG. 30 shows a high level flow chart for event-based engine starting.
Figure 30B:
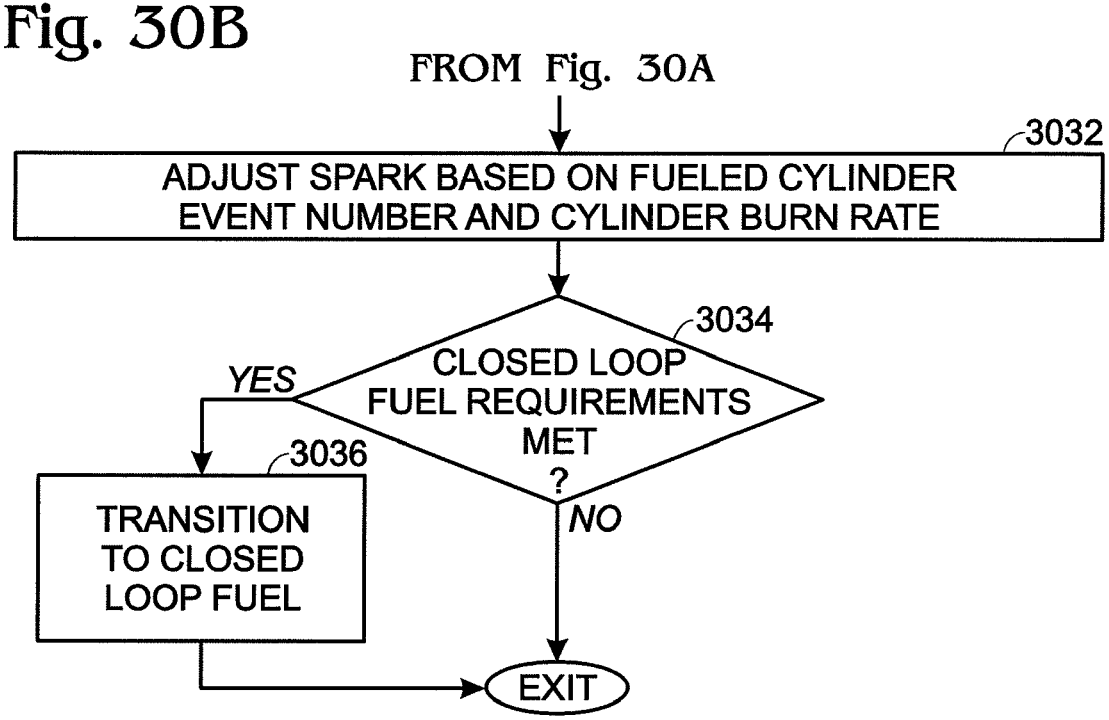

Referring now to FIG. 30, an alternative engine starting routine is described that may be used. In this example, the routine controls fuel injection type, and amount, based on a fueled cylinder event strategy. Various methods may be used to identify a cylinder event, such as by decoding engine position based on cam sensor and crank sensor signals. A cylinder event signal identifies when a given engine cylinder reaches top-dead-center of compression stroke, in one example. Alternatively, other cylinder events may be used.

In step 3010, engine operating conditions are read. Measured or inferred operating conditions such as engine coolant temperature, catalyst temperature, time since engine last operated (soak time), and other parameters may be used. These parameters may be used to compensate the engine fuel request in 3024, described below. These parameters can influence engine operation in different ways depending on their state. For example, low engine coolant temperatures may lead to air-fuel enrichment, but normal engine coolant temperatures may lead to stoichiometric air-fuel.

In 3012, the routine decides to proceed based on whether the engine is rotating. If the engine is not rotating, the routine waits until a crank position sensor detects engine rotation. If the engine is rotating, the routine proceeds to 3014. In 3014, the controller determines if a cylinder event has occurred, if so, the routine proceeds to step 3016. If no new cylinder events have occurred, the routine waits until a cylinder event is observed. In step 3016, the routine determines if synchronization between controller 12 and engine 10 has occurred. Synchronization can occur when engine timing is aligned with engine controller operation. If synchronization has occurred, the routine proceeds to step 3018, if not, the routine proceeds to step 3020.

In 3018, the number of fueled cylinder events is incremented since a cylinder event has been detected and the engine and controller 12 are in synchronization, thus indicating that fuel delivery may occur. The number of fueled cylinder events may then be used to determine an amount of fuel to be delivered to the cylinder or cylinders currently being fueled. Further, as noted below, is may also be used to select where fuel is delivered and/or a type of fuel delivered and/or when during a cycle fuel is delivered. For example, injection timing may be varied based on a number of fueled cylinder events. Likewise, a selection of type 1 and/or type 2 fuel may be based on a number of fueled cylinder events as noted in 3023 below. Further, a selection of a desired air/fuel ratio (or relative air-fuel ratio) may be based on a number of fueled cylinder events.

Note that alternatively to, or in addition to a number of fueled cylinder events, a number of combustion cylinder events and/or other factors may be used.

Continuing with FIG. 30, in 3020, the routine observes cam and crank signals that allow determination of engine position. When engine position is established, engine controller 12 aligns operations, spark and fuel delivery, to engine timing, becoming synchronized. Fuel delivery may be suspended until synchronization occurs in this example. Upon synchronization the fueled cylinder event counter is set to zero and the routine continues to 3022 where an engine air amount prediction is retrieved from an engine air amount algorithm. Alternatively, a mass air flow meter may be used to determine the engine air amount. By integrating the air mass signal over a cylinder event and then predicting future engine air amounts by extrapolation, using previous engine air amounts, a predicted engine air amount can be calculated.

In 3023, the routine selects a fuel type based on the number of fueled cylinder events. For example, where different fuels are injected (e.g., port gasoline and direct injection ethanol), a port injector may be used to inject gasoline into each cylinder on an event basis (i.e., each cylinder has a unique amount of fuel injected based on the combustion event number). After a predetermined number of events, inferred cylinder temperature, time, and/or other factors, the engine could be transitioned over to direct injection. For example, both injection types may be enabled after a selected number of events, or only direct injection may be used after a selected number of events.

In 3024, a desired air-fuel ratio for the up coming fueled cylinder event is determined based on a number of fueled cylinder events and other factors, such as coolant temperature, etc.

In 3026, individual cylinder fuel mass is calculated based on the desired air-fuel ratio calculated in 3024, predicted engine air amount retrieved from 3022, and the fuel type selected in 3023. If two fuel types are selected, the calculation for each fuel type is performed by further using a desired ratio or fraction of fuel types, which may be a function of engine speed, load, and/or other operating parameters. Further, other modifications may be used based on fuel puddle dynamics for any fuel injected via a port injector.

In 3028, the fuel pulse width(s) is(are) determined from the calculated fuel mass(es) and a function that represents the time to deliver a given fuel mass, and the respective injector slopes/offsets. The routine then continues on to 3030 where injectors are activated to deliver the desired fuel masses. The routine then advances to 3032. In 3032, the routine passes the fueled cylinder event number to a spark delivery routine that can adjust spark based on the fueled cylinder event number and cylinder burn rate. Typically, desired spark is advanced if the burn rate is slower and retarded if the burn rate is faster. The burn rate may be determined by the cylinder design and type of fuel, e.g., gasoline, ethanol, methanol, or blend. Base spark timing is retrieved from predetermined values stored in a table. The base spark table has x indices of engine coolant temperature and y indices of fueled cylinder events. If the burn rate of the fuel being used changes, a function FNBUR_SPK, alters the spark demand by adding an offset to the base spark. FNBUR_SPK is empirically determined and outputs spark offset as a function of burn rate. As the burn rate changes, depending on the fuel type, spark is advanced or retarded appropriately. In other words, the base spark angle that is based on the number of fueled cylinder events is modified based on cylinder burn rate. By linking spark angle to cylinder burn rate and fueled cylinder events, engine emissions can be reduced on a variety of fuel types. The routine then continues to 3034.

In 3034, engine operating conditions are evaluated to determine if closed loop fuel control is desired. Common signals used to determine desired closed loop engine operation include; time since start, exhaust gas sensor temperature, engine coolant temperature, and engine load. If closed loop fuel control is desired the routine proceeds to 3036 where fuel control transitions from open loop control to closed loop control by ramping fuel toward the desired air-fuel ratio, which may be stoichiometry. If closed loop fuel control is not desired the routine exits until it is called again to determine fuel for the next cylinder. Closed loop control may be executed as described above herein.

Alternatively, another embodiment delivers fuel based on the number of fueled cylinder events then transitions to time based fuel delivery. This method benefits from the advantages of fueling based on the number of fueled cylinder events during starting then reduces computations by using time based fueling. In another alternative, simultaneous use of fueled cylinder event based and time based fueling is provided. Event based fueling offers the before-mentioned advantages. Time based fueling permits simplified calibration of fuel compensation for slower changing conditions, such as fuel vaporization. By using both methods, fuel amount can be compensated for both engine conditions that change slowly and engine conditions that change rapidly.

In still another embodiment, non-sequential fueling may also be used on an event basis.

The above routine can achieve various advantages since the routine can provide selective fuel delivery on an individual cylinder basis. By determining individual cylinder fuel amounts and types, individual cylinder mixtures and combustion may be better controlled.

Referring now to FIGS. 31-34, routines for controlling and adapting to fuel vapor purging as well as injector and airflow sensor errors is described. Specifically, in FIG. 31, a routine for controlling a single source (e.g., valve) of fuel vapors (such as shown in FIG. 8 or 10, for example), which may be from one or more tanks or storage canisters, is described. Specifically, in 3110, the routine determines whether fuel vapor purging is requested. The request may be based on various operating conditions, such as speed, load, temperature, etc. Next, in 3112, the routine adjusts a purge valve to provide a desired amount of flow into the intake manifold. The desired amount of flow may include gradually ramping the flow up when first enabling purging, and varying the flow with operating conditions, such as speed and load, for example.

In 3114, the routine adjusts fuel injection from one or more injectors per cylinder based on feedback from exhaust gas oxygen sensors to maintain a desired air-fuel ratio. In addition, compensation based on a feedforward estimate of vapors in the purge flow may be used, if desired. The adjustment of fuel injection may utilize various types of air-fuel ratio control, such as, for example, the approach described herein with respect to FIG. 11. The approach may include injector selection based on various additional factors, such as whether injectors are active, or based on a content of vapors in the purge flow, as described in more detail with regard to FIG. 33.

Further, the selection may be based on minimum and/or maximum injector pulsewidth values, as well as other operating conditions. In one embodiment, a port injector injecting gasoline may be adjusted as purge flow and/or concentration varies. In another embodiment, a direct injector injecting a mixture containing an alcohol may be adjusted as purge flow and/or concentration varies. In still another embodiment, combinations of variation of both port and direct injectors may be used.

Figure 31:
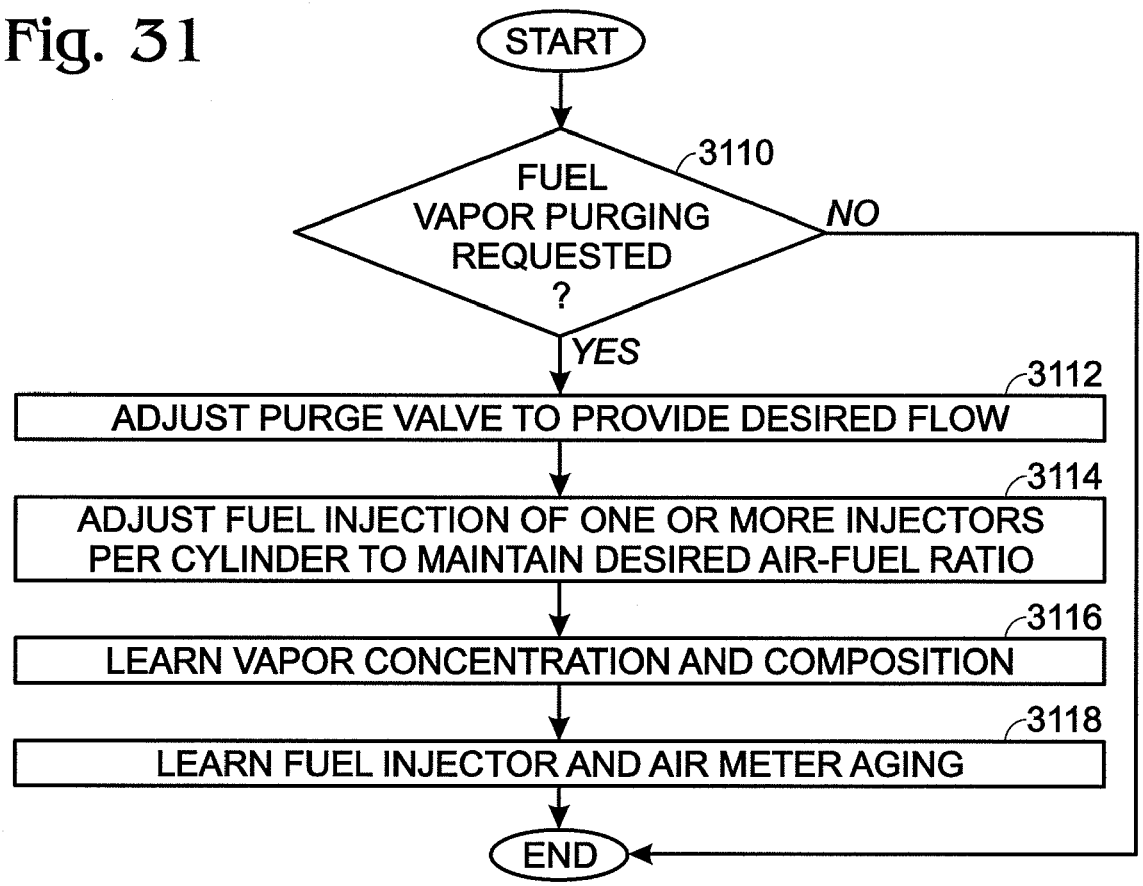
FIGS. 31-34 shows high level flow charts for fuel vapor purging control, estimation, and adaptive learning.
Figure 34A:
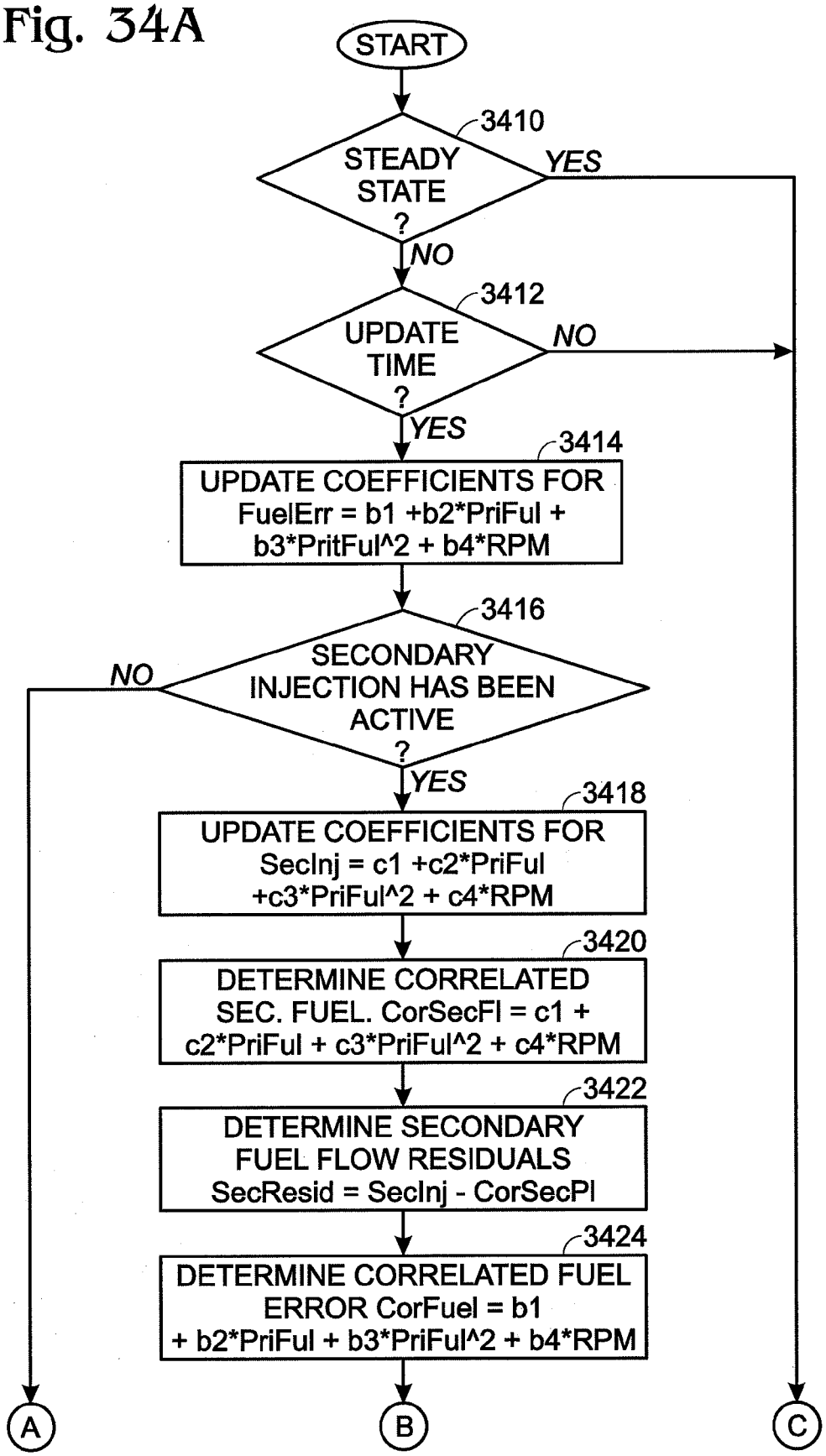
Figure 34B:
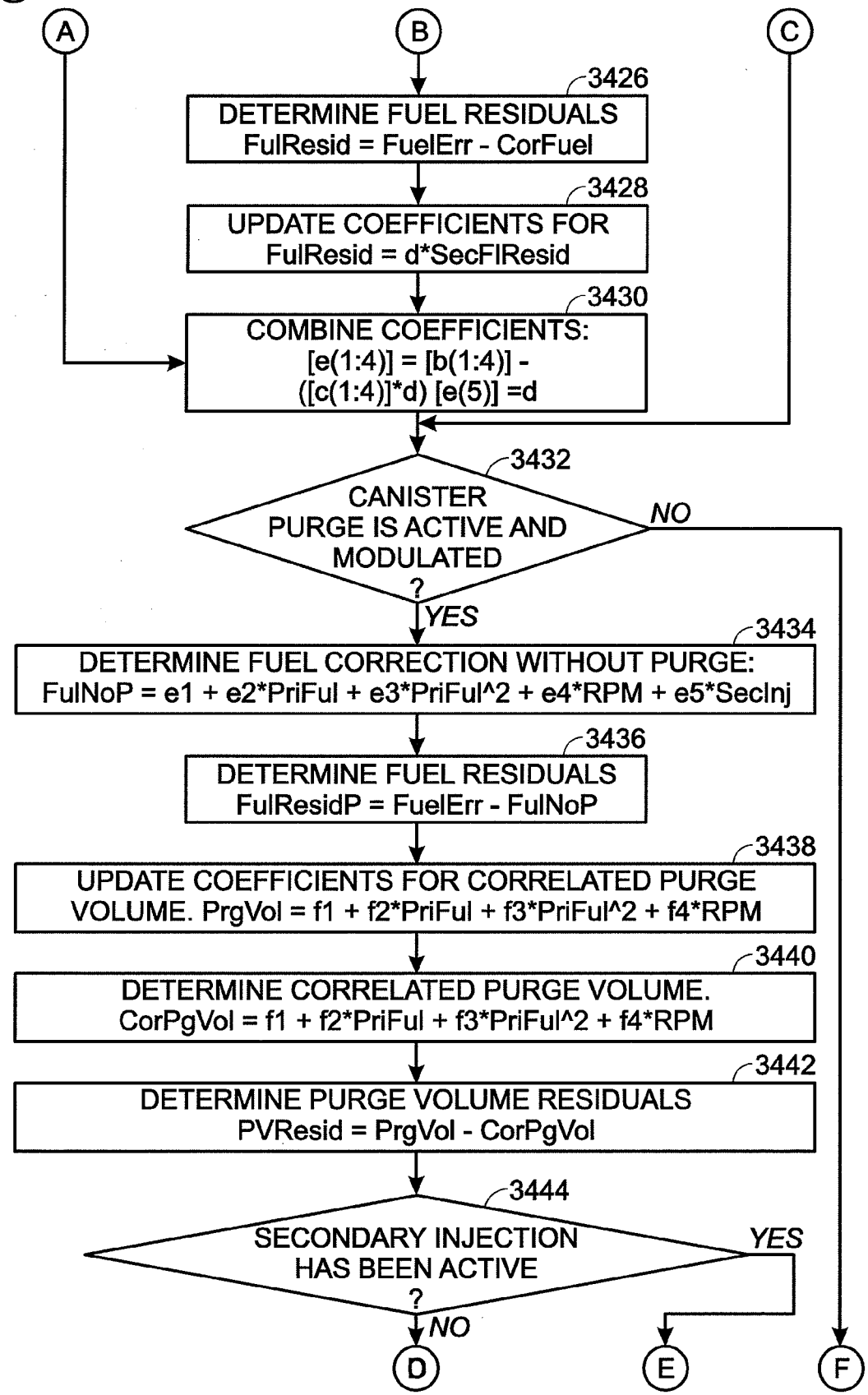
Figure 34C:
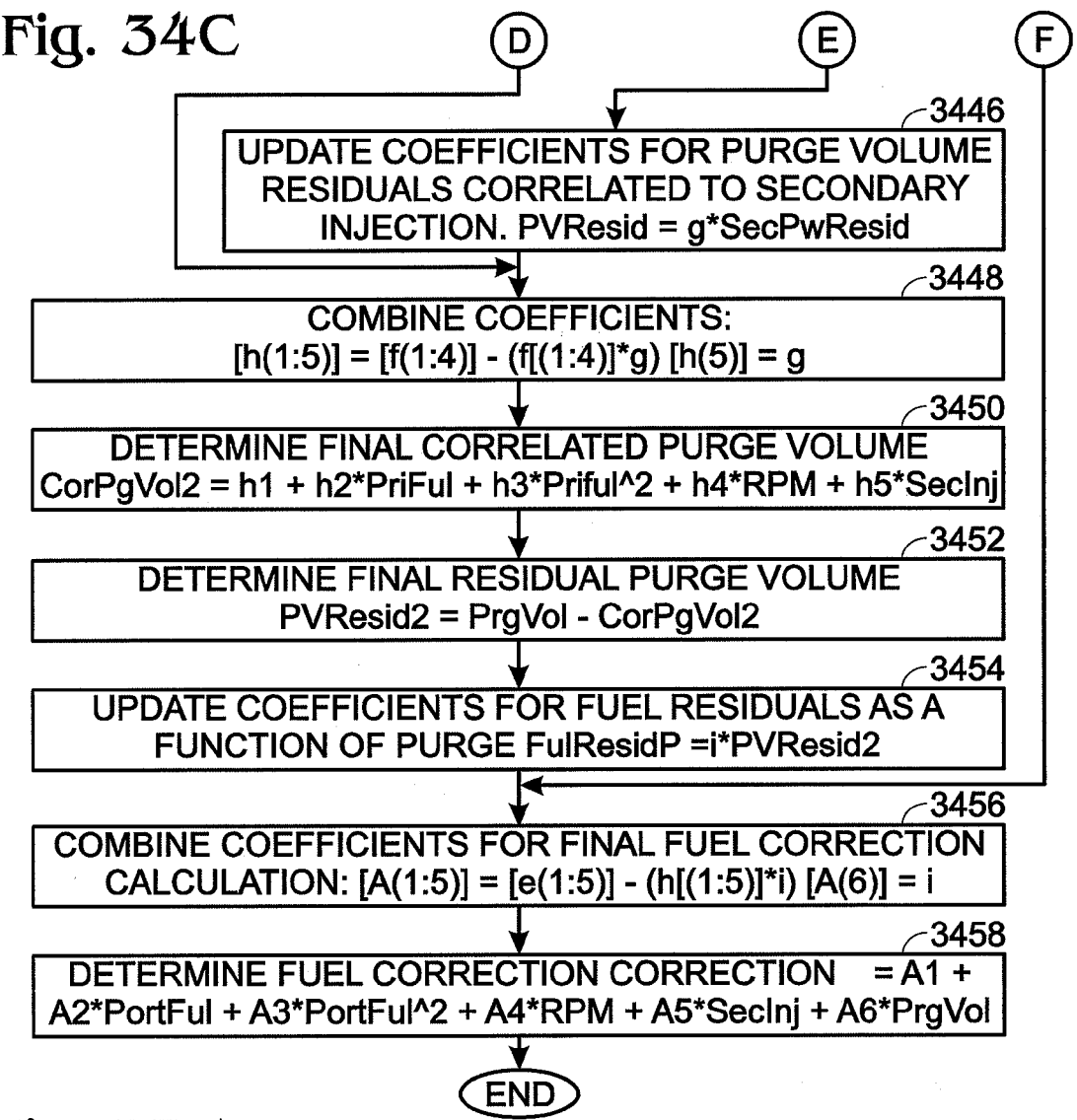

Continuing with FIG. 31, in 3116 the routine learns a vapor concentration and/or composition in the purge flow, and then learns fuel injector(s) and air meter aging values, as described herein with regard to FIG. 34.

In this way, it is possible to provide robust compensation for fuel vapor purging even when the content of the vapor varies, while still maintaining a desired overall amount of fuel types during combustion. For example, where the vapor may contain varying amounts of gasoline and ethanol, the routine can appropriately use compensation of gasoline and ethanol injection to maintain desired total amount of combustion gasoline and ethanol under varying operating conditions. Further, it is possible to provide compensation even when one fuel type is depleted or not enabled during the current operating conditions, thus providing improved opportunity to purge fuel vapors.

Figure 32:
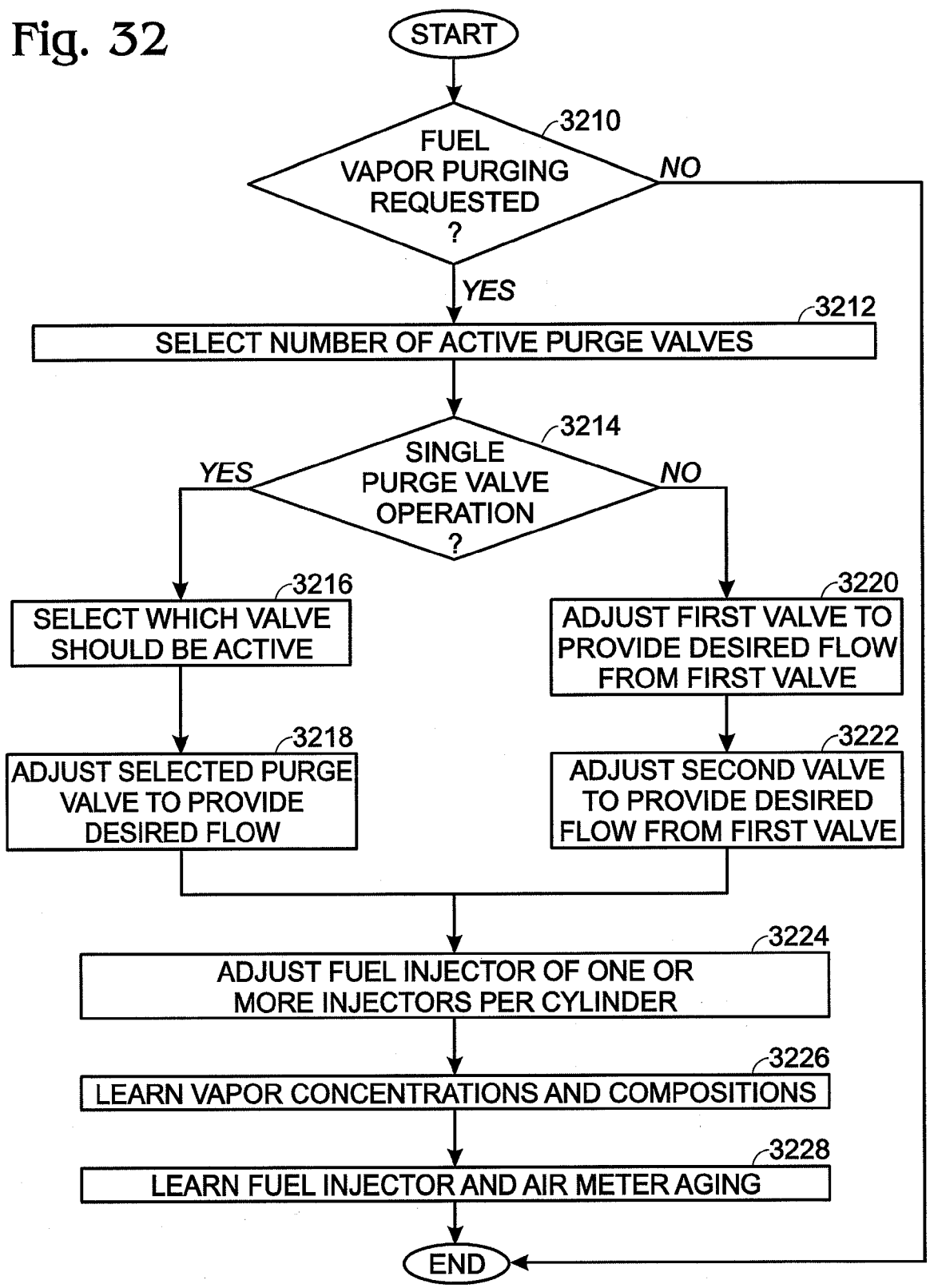

Referring now to FIG. 32, a routine similar to that of FIG. 31 is described, except that more than one purge control valve may be provided. In this specific example, two valves are provided. In one example, the valves can control vapors from different fuel sources, such as shown with regard to FIG. 9. First, in 3210, the routine determines whether fuel vapor purging is requested. The request may be based on various operating conditions, such as speed, load, temperature, etc. Next, in 3212, the routine selects a number of active purge valves to be operated. For example, under some conditions, a first valve may be used to enable fuel vapor purging of only a first fuel type, and under other conditions, a second valve may be used to enable fuel vapor purging of only a second fuel type. These conditions may include the amount of vapors generated in the respective systems, temperature, speed, load, desired ethanol fraction, or others. In another example, the routine may enable purging of from both valves during common operating conditions, and concurrently with each other. Thus, in 3214, the routine determines whether single purge valve operation, or multiple purge valve operation, is selected.

If single operation is selected, the routine continues to 3216 to select which valve should be active. For example, purging from different valves may alternatively be activated so that both systems are able to purge fuel vapors. The relative amounts and durations of activation can be varied with operating conditions and/or with desired ethanol fraction. For example, purging from the ethanol system may be preferred when higher ethanol fraction is desired. Also, systems having higher volatility fuels may need additional amounts of purging (such as greater flows, longer durations, etc.). Next, in 3218, the routine adjusts the selected purge valve to provide a desired flow amount.

Alternatively, if dual purge valve operation is selected, the routine continues to 3220 to adjust a first purge valve to provide a first desired flow amount, and then to 3222 to adjust a second purge valve to provide a second desired flow amount. Then, from either 3222 or 3218, the routine continues to 3224 to adjust fuel injection of one or more fuel injectors per cylinder to compensate for the fuel vapors based on exhaust gas oxygen sensor feedback and optionally feedforward estimates. As noted above, such operation may include selection and variation of which injector provides adjustment based on operating conditions, as well as selection criteria described with regard to FIG. 11 and FIG. 33.

Continuing with FIG. 32, in 3226 the routine learns a vapor concentration and/or composition in the purge flow, and then learns fuel injector(s) and air meter aging values in 3228, as described herein with regard to FIG. 34.

In this way, it is possible to provide robust compensation for fuel vapor purging even when the content of the vapor varies, while still maintaining a desired overall amount of fuel types during combustion. For example, where the vapor may contain varying amounts of gasoline and ethanol, the routine can appropriately use compensation of gasoline and ethanol injection to maintain desired total amount of combustion gasoline and ethanol under varying operating conditions. Further, it is possible to provide compensation even when one fuel type is depleted or not enabled during the current operating conditions, thus providing improved opportunity to purge fuel vapors. Finally, it is possible to provide desired purging of more than one fuel type.

Figure 33:
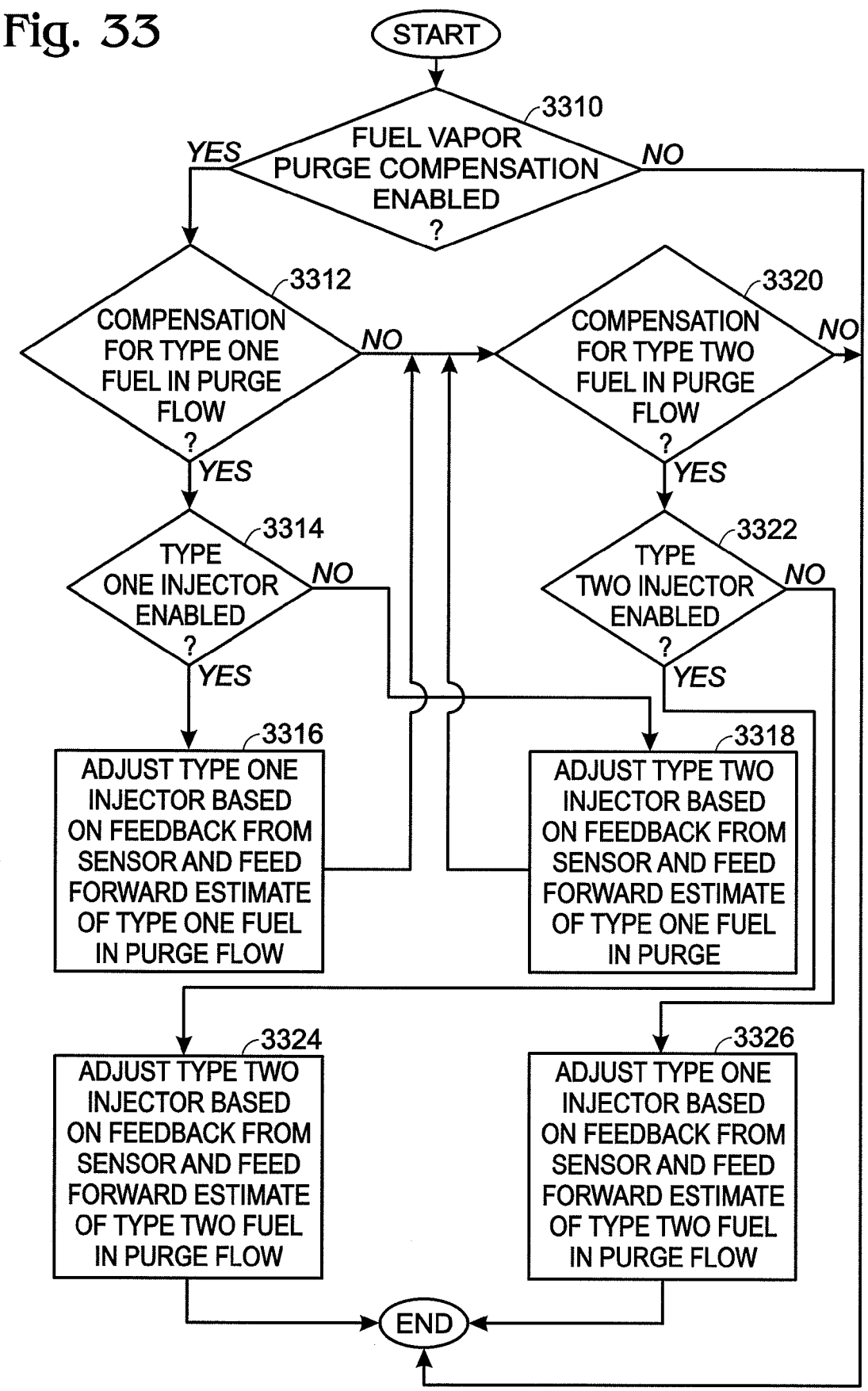

Referring now to FIG. 33, a routine is described for selecting injectors to provide compensation for fuel vapor purging from one or more fuel vapor purge control valves and/or one or more fuel types contain in fuel vapors. In this example, the routine selects one or more injectors per cylinder to provide adjustment to fuel vapors based on content of the vapors, as well as other factors, to maintain a desired air-fuel ratio. In one embodiment, such operation provides an ability to maintain a desired overall relative amount or ratio of different fuel types. Specifically, in 3310, the routine determines whether fuel vapor purge compensation is enabled. If so, the routine continues to 3312 to determine whether compensation for type 1 fuel contained in the purge flow is requested. In one embodiment, the routine determines whether type 1 fuel is contained in the vapors being purged into the engine. If so, the routine continues to 3314 to determine whether type 1 injection is enabled at the current conditions. If so, the routine adjusts type 1 injection to compensate for type 1 fuel in the fuel vapors based on feedback from exhaust gas oxygen sensors and possibly using feedforward estimates of vapor contents in 3316. In this way, an increase in type 1 fuel attributed to fuel vapor purge can be compensated by a corresponding decrease in type 1 fuel injected into the cylinder, thus provide accurate air-fuel control and maintenance of a desired amount of type 1 fuel at the given operating conditions.

Alternatively, when the answer to 3314 is no, the routine continues to 3318 to adjusts type 2 injection to compensate for type 1 fuel in the fuel vapors based on feedback from exhaust gas oxygen sensors and possibly using feedforward estimates of vapor contents. While this may vary the amount of fuel types in the cylinder, it is still possible to maintain a desired air-fuel ratio, and thus improve emission control even when type 1 fuel injection may be disabled, such as due to degradation.

The routine then continues from either 3316 or 3318 or a NO in 3312 to 3320. In 3320, the routine determines whether compensation for type 2 fuel contained in the purge flow is requested. In one embodiment, the routine determines whether type 2 fuel is contained in the vapors being purged into the engine. If so, the routine continues to 3322 to determine whether type 2 injection is enabled at the current conditions. If so, the routine adjusts type 2 injection to compensate for type 2 fuel in the fuel vapors based on feedback from exhaust gas oxygen sensors and possibly using feedforward estimates of vapor contents in 3324. In this way, an increase in type 2 fuel attributed to fuel vapor purge can be compensated by a corresponding decrease in type 2 fuel injected into the cylinder, thus providing accurate air-fuel control and maintenance of a desired amount of type 2 fuel at the given operating conditions.

Alternatively, when the answer to 3322 is no, the routine continues to 3326 to adjust type 1 injection to compensate for type 2 fuel in the fuel vapors based on feedback from exhaust gas oxygen sensors and possibly using feedforward estimates of vapor contents. While this may vary the amount of fuel types in the cylinder, it is still possible to maintain a desired air-fuel ratio, and thus improve emission control even when type 2 injection may be disabled, such as due to degradation.

Note that in an alternative embodiment, the routine may vary different fuel injector amounts for a cylinder based on the type of vapors being purged and/or based on a quantity of types of vapors being purged.

Figure 36:
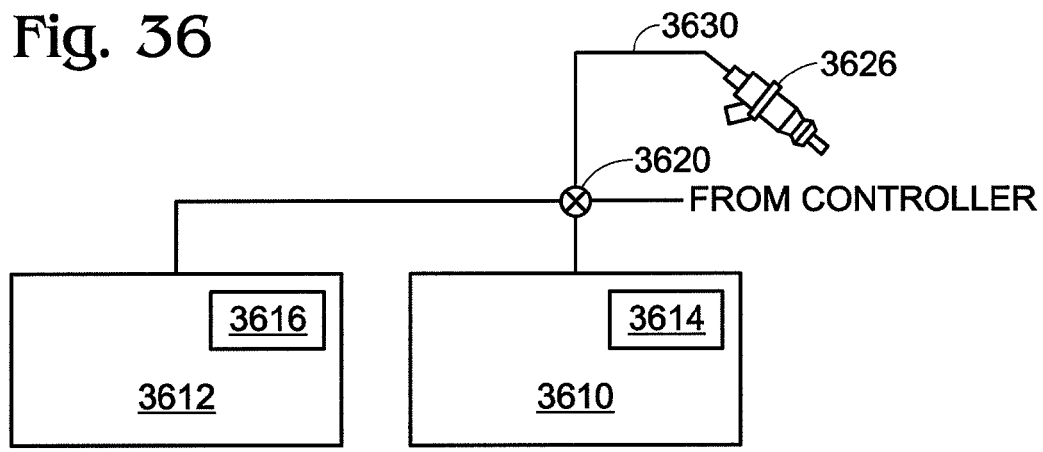
FIGS. 36-38 show example fuel tank and pump configurations.
Figure 37:
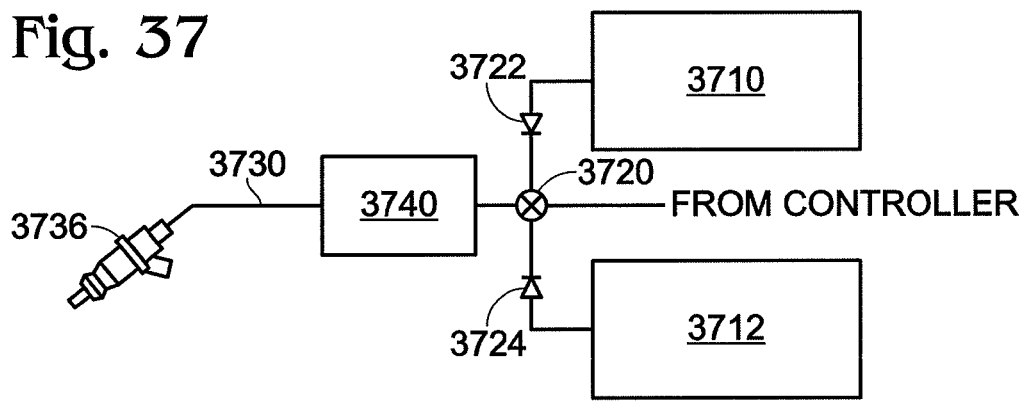

Referring now to FIG. 34, a routine is described for adaptively learning corrections in the air and fuel metering system, such as fuel injector corrections, for system configurations having multiple fuel injectors per cylinder, such as the various examples described herein, or for systems having multiple fuel metering devices for different fuel types, such as FIG. 36 or 37, for example.

In one particular embodiment where one injection type is a fuel such as gasoline (which may be port or directly injected) and a second injection type includes an alcohol containing fuel (such as ethanol, or an ethanol blend, which may be port or directly injected), a method is provided that takes advantage of regression techniques to independently determine the characteristics of the elements of the air and fuel metering system. In one example, a routine may be used that schedules the injection of type 2 injection as a function of an engine parameter, such as air mass or load, and then learns an air and fuel correction as a function of that engine parameter. Thus, if the injection of alcohol via the in-cylinder injectors is scheduled strictly as a function of air mass, an adaptive system that determines an air fuel correction as a function of air mass may be used to correct for an air fuel error from a system with air meter errors (slope) and primary and secondary injector errors (slope and offset).

However, if the amount of type 2 injection varies with other parameters, such as in response to temperature and/or knock sensor feedback or exhaust gas oxygen sensor feedback, an alternative approach may be used. Specifically, in this example, the approach described in U.S. Pat. No. 6,138,655 (which is incorporated herein by reference) may be adapted and modified. The method may include air mass squared and purge volume squared terms based on vehicle experience. Further, different algorithms may be used, such as the Potters Square Root algorithm or the Recursive Least Squares algorithm depending on numerical stability issues.

In particular, by determining the coefficients of the following equation, improved adaptive learning of air and fuel errors may be achieved:

$$\text{FuelCorrection} = a_0 + a_1 * \text{AirMass} + a_2 * \text{AirMass}^2 + a_3 * \text{RPM} + a_4 * \text{PurgeVolume} + a_5 * \text{PurgeVolume}^2 + a_6 * \text{SecondaryInjectorPulsewidth}$$

Where "SecondaryInjectorPulsewidth" refers to pulsewidth of a type 2 injector, for example. The coefficient in this term would be updated only when the secondary injection is active using a series of liner regressions that can be separately enabled. Alternatively, rather than using pulsewidth, secondary injector flow may also be used. Also it may be advantageous to add terms such as secondary injector flow or pulsewidth squared and/or secondary injections per minute to account for non-linearities such as errors in the injector offset. Further, in still another alternative, the air mass and air mass squared terms may be replaced with type 1 fuel flow and type 1 fuel flow squared. Thus, in an alternative approach, the following may be used:

$$\text{FuelCorrection} = A_1 + A_2 * \text{PrimaryFuelFlow} + A_3 * \text{PrimaryFuelFlow}^2 + A_4 * \text{RPM} + A_5 * \text{SecondaryFuelFlow} + A_6 * \text{PurgeVolume}$$

Referring now to FIG. 34, a routine describes one example embodiment for adaptively learning errors.

First, in 3440, the routine determines whether the vehicle is operating under near steady state conditions, such as based on a rate of change of engine speed, vehicle speed, pedal position, fuel flow, injector pulsewidth(s), throttle position, or combinations thereof. For example, if the variation in input parameters is below an acceptable level (e.g., engine speed, fuel flow), updates to the coefficients related to speed and fuel flow may have increased error. Therefore, in steady state, the routine proceeds to 3432. If enough activity is present (driven by transient operating conditions), the routine proceeds to 3412. In 3412, the routine determines whether sufficient time has passed to perform an update. In this way, it is possible to provide the opportunity to slow down or speed up the adaptive routine by only providing a pre-determined delay between coefficient updates. If it is not yet time to perform updates to the parameters, the routine jumps to step 3432. Otherwise, continue to 3414.

In 3414, the routine updates adaptive coefficients b1, b2, b3, and b4 using a regression in the equation:

$$\text{FuelErr} = b1 + b2 * \text{PriFuel} + b3 * \text{PriFuel}^2 + b4 * \text{RPM}$$

where: FuelErr is the difference between the commanded fuel flow and "measured" fuel flow (equal to measured air flow divided by the air fuel ratio measured in the exhaust); PriFul is the commanded fuel to be injected by the primary injectors—for example, gasoline injected into the intake ports; PriFul^2 equals PriFul squared; and RPM is the measured engine speed.

One method that could be used to perform the regression is the commonly known "recursive least squares" method. Alternatively, "Potters square root" algorithm may also be used. Having completed the update of the coefficients, the routine continues to 3416 to determine if the secondary injection (e.g. in cylinder injection of alcohol or an ethanol blend, for example) is active or has been active recently. In this example, a regression of secondary injection data is not enabled until the secondary injection has been enabled, or was recently enabled. Once secondary injection is disabled, the routine may continue the regression for a short, predetermined, time to collect data at zero or low secondary fuel flow. Thus, if the secondary injection is not active, the routine continues to 3430. Otherwise, the routine continues to 3418.

The following acts performed by the routine are directed to determining the coefficients of the fuel correction equation described herein. However, since portions of this regression may only be performed at certain times, or under selected conditions, (e.g., when sufficient modulation of the independent variables (primary and secondary fuel flow, engine speed, purge flow, or others) is available), the regression may be performed via a series of regressions of the various terms. Also, regarding determination of the terms related to the secondary injection, in one approach it may be advantages to independently control the secondary injection from the above parameters, e.g., by selecting values that were statistically independent of the engine speed and primary fuel flow or others. However, the secondary flow may be based on one or more of these parameters to provide the desired engine response. As a result, there is the potential for some degree of correlation between the secondary injection and these terms. Therefore, in one approach, it may be beneficial to determine how the secondary injection correlates with the terms, and subtract the correlated, and already compensated for, effects of secondary injection. To do this a similar approach as used above in 3414 may be used to update the coefficients of the equation:

$$\text{SecInj} = c1 + c2 * \text{PriFul} + c3 * \text{PriFul}^2 + c4 * \text{RPM}$$

where: SecInj is the commanded secondary fuel flow; and c1, c2, c3, and c4 are the coefficients being updated. Further, since some of the same independent variables are being used again, some of the intermediate matrices calculated for recursive least squares or Potters square root algorithm may be used from above and may not need to be re-calculated.

Having determined the coefficients for the correlated secondary fuel flow in 3418, in 3420 the routine determines how much of the current secondary fuel flow, at the current operating conditions, has already been accounted by applying those coefficients. Subtracting the correlated secondary fuel flow from the actual secondary fuel flow in step 3422 gives the secondary fuel flow residuals that may be used in 3428.

In 3424, the routine determines how much of the fuel error has already been accounted for by the regression in 3414 by using the updated values of the coefficients b1 through b4 and the current operating conditions. In 3426, the routine determines the unaccounted for fuel error (fuel error residuals) that are available for the regression in 3428. In 3428, the routine updates the coefficient for the equation:

$$\text{FuelResid} = d * \text{SecFlResid}$$

where: FulResid is the residual fuel error calculated in 3426; SecFlResid is the residual secondary fuel from step 3422; and d is the coefficient to be determined. A similar approach as in 3414 may be used, with a different independent variable, and thus previous intermediate matrices are not re-used.

It may be advantageous to expand the regression performed in 3428 to include additional terms such as secondary fuel flow squared to account for nonlinearities in the secondary fuel flow error. In this case the equation and coefficients to be updated could be of the form:

$$\text{FuelResid} = d1 * \text{SecFlResid} + d2 * \text{SecFlResid}^2$$

Where: SecFlResid^2 is the secondary fuel residuals squared.

Having determined the correlation between fuel errors, primary and secondary fuel flow, and engine speed, the routine now combines the terms from the previous regressions in step 3430 as follows:

$$e1 = b1 - (c1 * d)$$

$$e2 = b2 - (c2 * d)$$

$$e3 = b3 - (c3 * d)$$

$$e4 = b4 - (c4 * d)$$

$$e5 = d$$

to get the coefficients for the equation that describes the expected fuel error without considering the effects of carbon canister purge:

$$\text{FulNoP} = e1 + e2 * \text{PriFul} + e3 * \text{PriFul}^2 + e4 * \text{RPM} + e5 * \text{SecInj}$$

This equation is used in step 3434, and the coefficients are again used in 3456.

Again, the routine updates coefficients for an equation if the independent variables are significantly changing. For carbon canister purge, however, it once it has been enabled and stabilized from the initial opening, the flow may be modulated to improve regression results, if desired. For example, it may be modulated independently from variable such as injector flow, speed, etc.

Continuing with FIG. 34, the routine determines at 3432 whether the purge flow has been enabled and is currently being modulated. If the purge has not yet been enabled (e.g. following a cold start), the routine proceeds to 3456. Otherwise, the routine continues to 3434 through 3454 to determine how the carbon canister purge is contributing to the measured fuel flow errors.

In 3434, the routine determines how much of the fuel error has already been accounted for above. Then, in 3436, the routine determines the residual fuel errors that may be caused by the canister purge flow. Next, in 3438, 3440, and 3442, the routine determines how the canister purge correlates to the primary fuel flow and engine speed and calculates the residual (unaccounted for) canister purge. These steps are similar to some above and thus may re-use some intermediate calculations, if desired.

If secondary injection has been active, the routine also determines how the canister purge correlates to the secondary fuel flow, where the decision to make this determination is made in step 3444. Next, in 3446, the routine performs correlation between the purge residuals and the secondary fuel flow residuals to update coefficient g. If, in 3428, a regression with an additional term such as secondary fuel flow squared was used, this term would also be included here. Again, since the inputs to the regression are similar to those in 3428, some intermediate values used in the regression can be reused. If secondary injection is not active, the routine proceeds to 3446, and in either case, to 3448.

In 3448, the routine combines the coefficients related to the canister purge flow using the technique to arrive at the equation used in 3450:

$$CorPgVol2 = h1 + h2*PriFul + h3*PriFul\hat{\,}2 + h4*RPM + h5*SecInj$$

This equation gives the purge volume that correlates to, and has already been accounted for, in the regressions from steps 3414 through 3430.

Continuing with FIG. 34, in 3450 through 3454, the routine determines how the fuel error residuals correlate to the canister purge flow residuals in a manner similar to that above. Again, it may be advantageous to add a purge volume squared term to the regression, under some examples. This term would account for changes in the fuel content of the purge flow as the purge flow changes and may also tend to account for errors in the estimated purge flow that are likely at low purge flow rates.

Having determined the effects of the various independent parameters in the above series of regressions, at 3456, the routine combines the coefficients to determine the final fuel correction equation used in step 3458. The coefficients are combined as follows:

$$A1 = e1 - (h1*d)$$

$$A2 = e2 - (h2*d)$$

$$A3 = e3 - (h3*d)$$

$$A4 = e4 - (h4*d)$$

$$A5 = e5 - (h5*I)$$

$$A6 = I$$

to provide the final fuel correction equation:

$$Correction = A1 + A2*PortFul + A3*PortFul\hat{\,}2 + A4*RPM + A5*SecInj + A6*PrgVol$$

This compensation may then be used to modify the injected fuel flow, for example, as described herein.

Note that in the above algorithm using a Potters Square Root Algorithm, it may be executed where values for the algorithm coefficients may be stored in memory. The values stored can be predetermined initial values that are used when the computer keep-alive memory has been reset, or will be the values updated in the last iteration of this algorithm.

Figure 35:
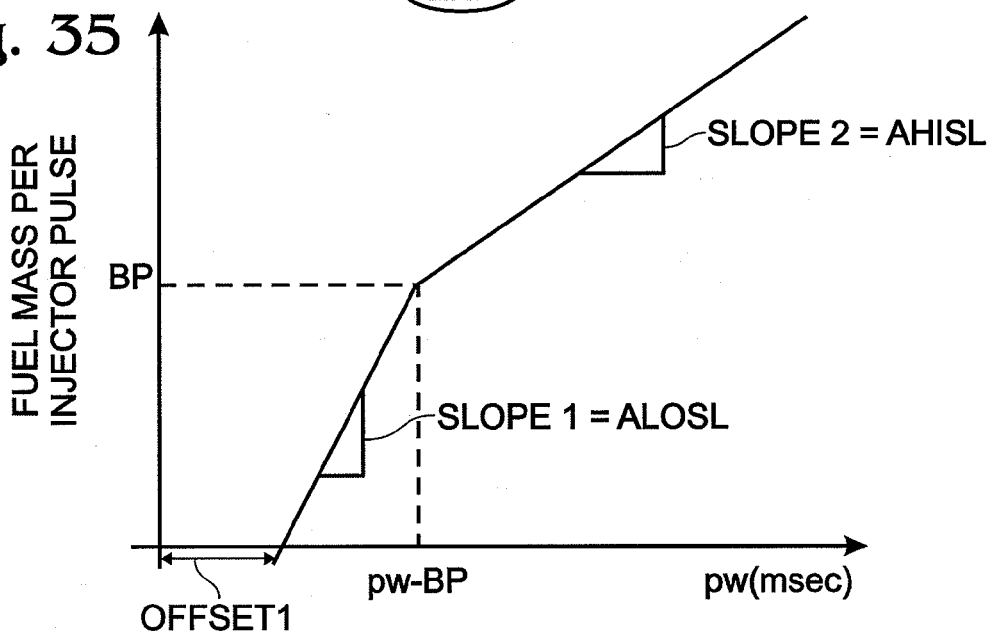
FIG. 35 shows a graph of an example injector characteristic.

Referring now to FIG. 35, a graph is shown of an example injector transfer function, illustrating a relationship between fuel mass per injector pulse and pulsewidth (PW). The graph shows an example two-slope approximation, changing at a breakpoint (BP).

Referring now to FIG. 36, an example fuel delivery system is shown for an example with a single injector per cylinder may be employed, where the single injector may be a direct injector or a port injector. In this example, a first fuel tank 3610 and a second fuel tank 3612 are shown for holding a first and second fuel type, such as gasoline and an alcohol blend. Each fuel tank has an internal fuel pump (3614 and 3616, respectively), although an external pump may also be used, or a dual pump system may be used. Each fuel tank leads to a mixing valve 3620 that may be adjusted via controller 12 to vary a relative amount of each of the fuel types, from only type 1 to only type 2, and any relative amount in between. The mixing/control valve leads to a fuel rail 3630 having one or more fuel injectors 3626 coupled thereto. In this way, a relative amount of fuel types may be delivered to the engine without requiring two fuel injectors.

Referring now to FIG. 37, an alternative embodiment is shown of a fuel delivery system in which two fuel tanks are used with a fuel pump and a single injector per cylinder, to further reduce system cost. In this example, fuel tanks 3710 and 3712 (each storing a respective fuel type such as gasoline and an ethanol or alcohol mixture) leads to mixing/control valve 3720 via respective one way valves 3722 and 3724, which may optionally be included to reduce any backflow. Then, valve 3720, leads to a pump 3740 and then to fuel rail 3730 having one or more injectors 3736. Again, a multi-stage pump, or multiple pumps may be used to further boost pressure, with each pump compressing a mixture of the fuel types.

Figure 38:
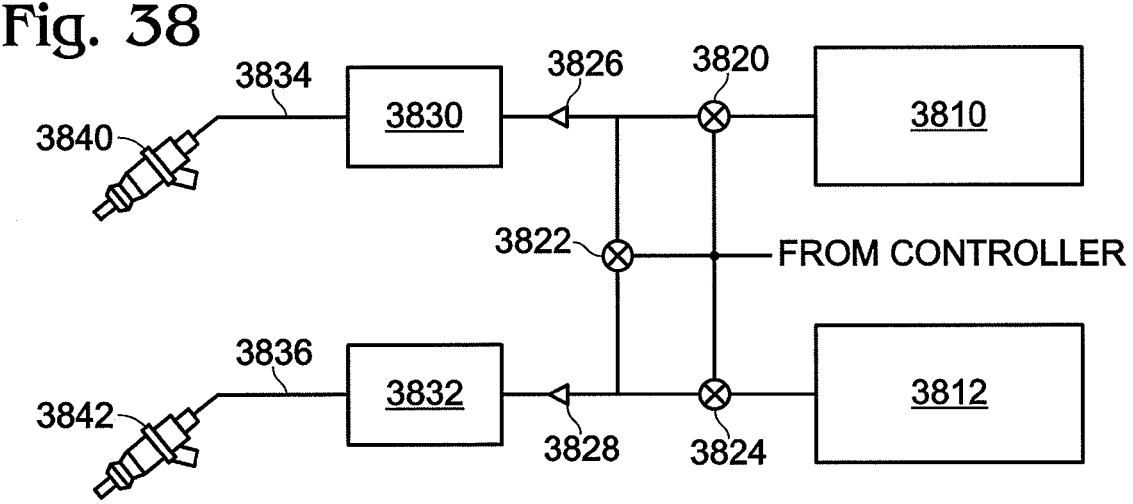

Referring now to FIG. 38, an alternative embodiment is shown of a fuel delivery system in which two fuel tanks are used with fuel pumps and two injectors per cylinder, to provide flexibility in delivering fuel types via different injectors. For example, one injector may be a direct injector for a cylinder, and the other injector may be a port injector for the cylinder, or they may both be port or direct injectors for the same cylinder, with different targeting, spray patterns, etc.

In this example, fuel tanks 3810 and 3812 (each storing a respective fuel type such as gasoline and an ethanol or alcohol mixture) are each coupled to a first and second fuel pump 3830 and 3832 via a set of three controllable/mixing valves 3820, 3822, and 3824. Specifically, valve 3820 is coupled directly to tank 3810 and valve 3824 is coupled directly to tank 3812. Each of these valves may lead through an optional one way check valve (3826 and 3828, respectively) to respective pumps 3830 and 3832. A line between the two pumps may be controlled via valve 3822, which may be used instead of or in addition to valves 3820 and 3824. Each of the pumps leads to a respective fuel rail 3834 or 3836, having one or more fuel injectors 3840 and 3842, respectively. In one example, tank 3810 holds type 1 fuel and injector 3840 is a port injector, and tank 3812 holds a type 2 fuel, and injector 3842 is a direct cylinder injector for the same cylinder as injector 3840.

This example configuration can enable either fuel type to be fed to ether injector, or combinations of fuel types to either injector. Also, the control valves can be located upstream of the pumps so that one can deliver either fuel at either pressure, in the case where the pumps generate different fuel pressures. Note, however, that the valves may be located downstream of the pumps if the fuel pumps generated similar pressures/flows, which could be either a high pressure fuel system or a low pressure fuel system.

In one example, valve 3820 may be closed, and valves 3822 and 3824 open to allow flow from tank 3812 to both pumps/injectors. Alternatively, all valves could be open, where the relative amounts of each valve are adjusted to vary an amount of different fuel types to different injectors, where the valves may be adjusted based on operating conditions, whether fuels are enabled, etc. In this way, improved operation may be achieved by tailoring the fuel types and relative amounts to different injectors for different operating conditions. In another embodiment, valves 3820 and 3824 may be omitted, and both tanks may be coupled to the inlet of valve 3822, thus allowing control of relative amounts of fuel types to both injection systems (although only one injection system may be operating at any given time).

However, with the operation of the example systems of FIGS. 36-38, relative fuel amount adjustment response to conditions, such as knock, may be slower since it takes time for fuel to travel from the valve to the injectors for delivery. Thus, in the case where adjustments in the amounts, or relative amounts, of fuel types are used to reduce knock, it may be advantageous to first utilize spark retard and/or airflow control and/or boost control in response to engine knock. Then, once an adjustment to a relative amount of fuel types is made and takes effect in the combustion chamber, the spark retard and/or airflow control and/or boost control may be reduced so that improved fuel economy and/or performance may be achieved, while still reducing knock via appropriate adjustment of relative amounts of fuel types, such as increased ethanol injection.

Figure 39:
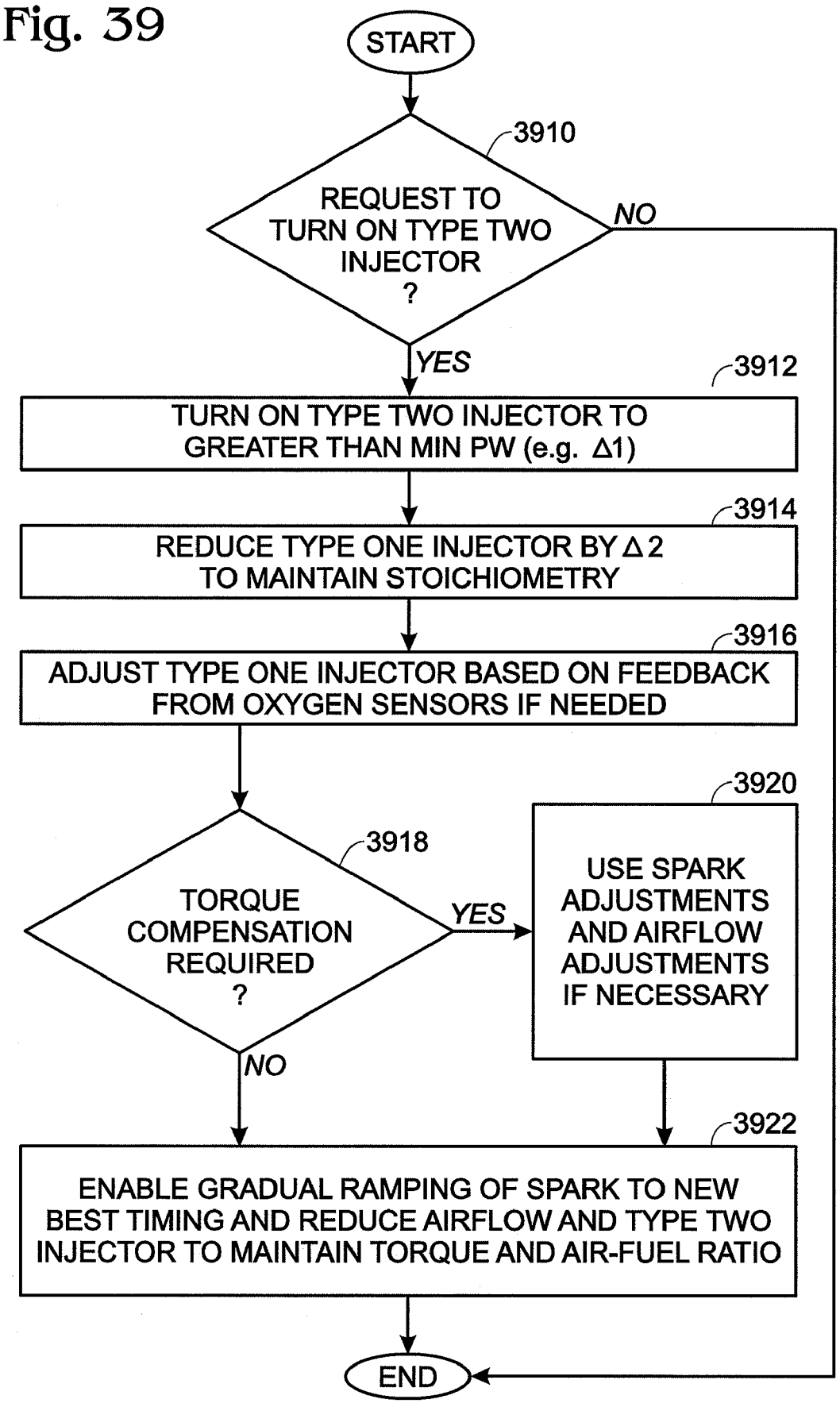
FIG. 39 shows a high level flow chart for transitioning on a second fuel type.

Referring now to FIG. 39, a routine is described for managing a transition when first providing type 2 injection (e.g., ethanol) in view of minimum pulse width operation of fuel injectors. Specifically, in 3910 the routine identifies a request of activation or commencing of type 2 fuel (e.g., via a second injector in a cylinder) based on a demand as determined by FIG. 16, for example. If such a request is present, the routine continues to 3912 to turn on a type 2 injector to a pulsewidth at or greater than a minimum pulsewidth required for stable and repeatable operation, which may be identified by an amount $\Delta 1$. Then, in 3914, the routine reduces type 1 injection by an amount ($\Delta 2$) to maintain an overall stoichiometric ratio. The size of $\Delta 2$ may calculated based on $\Delta 1$, the first and second injector characteristics (e.g., slopes, offsets), and the stoichiometric air-fuel ratio of the type 1 and type 2 fuels, as described for FIG. 23. For example, where the type 1 fuel is gasoline and the type 2 fuel is ethanol, the amount of total mass reduction in gasoline is smaller than the size of the mass increase in ethanol due to the differential stoichiometric ratios.

Note that the above adjustments are described for two injectors in a single cylinder, however for a multi-cylinder engine, each cylinder may be transitioned in a similar way in sequence. Also, in another example, only one or a subset of the cylinders may be transitioned to operate with both fuel types. Further, the transition may be serial, or all cylinders may be transitioned at substantially the same time.

Further note that the above approach assumes that the relative power density in the fuels compensates for the change in total fuel mass being provided. In other words, when increasing the type 2 injector by $\Delta 2$ and decreasing the type 1 fuel by a smaller $\Delta 1$ so that an appropriate amount of fuel is provided to burn with the already present air, the overall torque of the combustion may change due to power density differences in the fuels. As the ratio of the stoichiometric air-fuel ratios between ethanol and gasoline is similar to the ratio of power densities, only a negligible torque disturbance may be present. However, in some cases, such a torque disturbance may be perceptible. Thus, in 3918, the routine determines whether additional compensation may be used. If so, the routine proceeds to 3920 to use spark and/or throttle and/or boost adjustments to compensate for such torque variation. In one example, if the overall torque after the transition may increase, spark retard may be used commensurate with the change in fuel amounts, and then gradually ramped out as the throttle and/or boost level is ramped to decrease airflow. In another example, if the overall torque after the transition may decrease, spark retard along with increasing airflow before the transition may be used and then the spark retard may be removed commensurate with the change in fuel amounts.

If the answer to 3918 is no, the routine continues to 3922 to compensate for the effect of changing the relative amounts of fuel types on optimal ignition timing. In other words, by adding type 2 fuel, it may be possible to advance ignition timing without incurring engine knock, thus providing more efficient operation. As such, the routine gradually ramps to the new desired ignition timing while gradually reducing airflow to account for the increased efficiency. In this way, it is possible to commence an alternative fuel type during engine operation without violating minimum pulse width requirements and thereby achieve improved efficiency and maintaining engine output torque.

Figure 40:
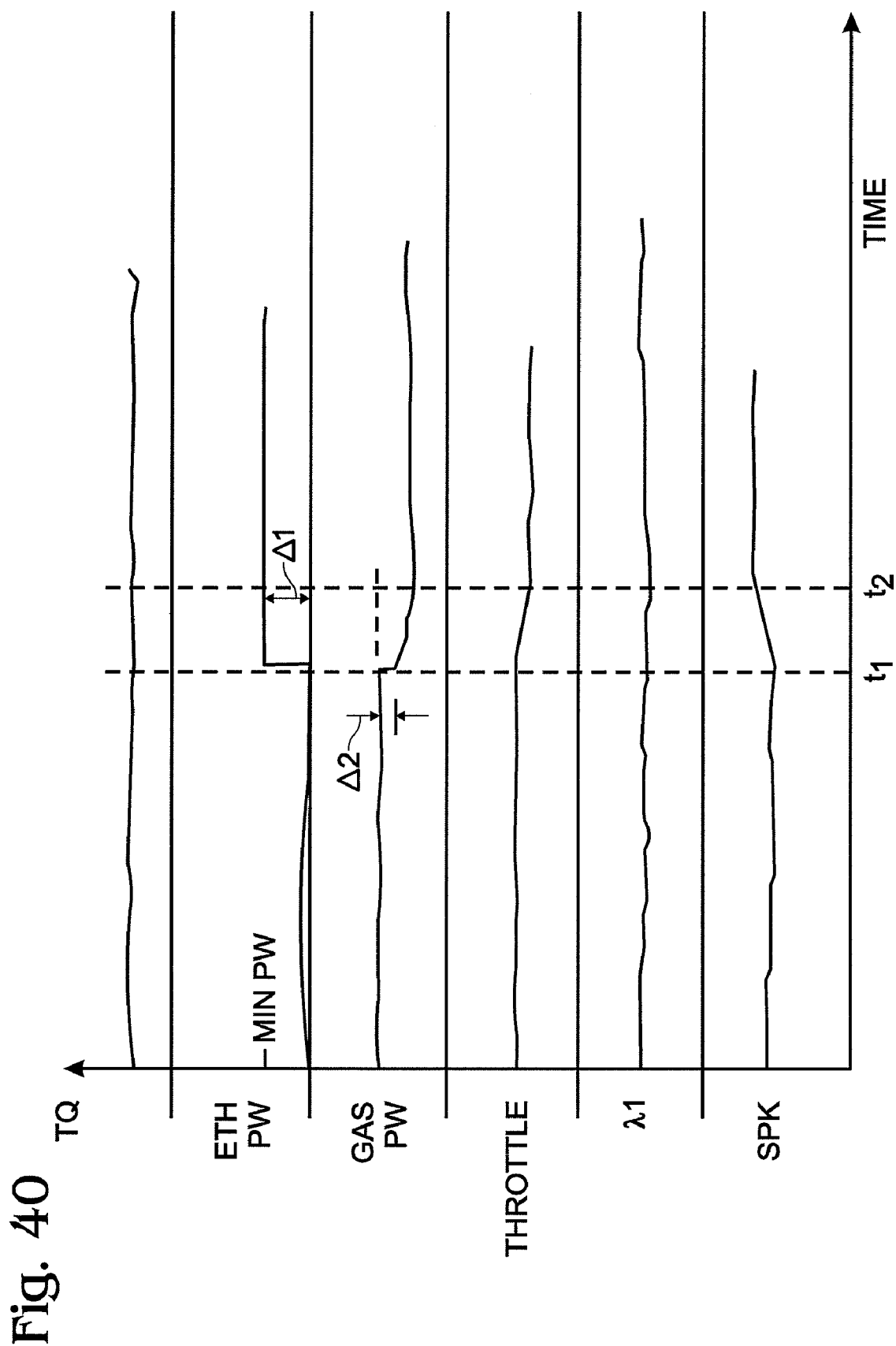
FIG. 40 shows example operation according to the routine of FIG. 39.

FIG. 40 shows an example of such operation where type 1 fuel is gasoline and type 2 fuel is ethanol or an ethanol blend. The top graph shows engine output torque (Tq), the second graph from the top shows the ethanol pulsewidth, the third graph from the top shows the gasoline pulsewidth, the fourth graph from the top shows throttle position, the fifth graph from the top shows relative air-fuel ratio of the combustion gasses ($\lambda$), and the bottom graph shows spark angle. In this example, at time t1 the ethanol injector is activated to a minimum pulse width and the gasoline injector is correspondingly decreased. Then, from t1 to t2, the spark is gradually ramped to a new optimal timing (which is more advanced due to the added charge cooling of the ethanol), while the throttle is gradually ramped closed to compensate for the increased efficiency of the engine due to the spark timing change.

In this example, fueling adjustments are shown for a fixed engine speed and load, and without delays from puddle dynamics, although compensation for these may be added, if desired. Further, additional adjustments may be present due to other transient conditions, such as feedback from exhaust gas oxygen sensors, etc.

Figure 41:
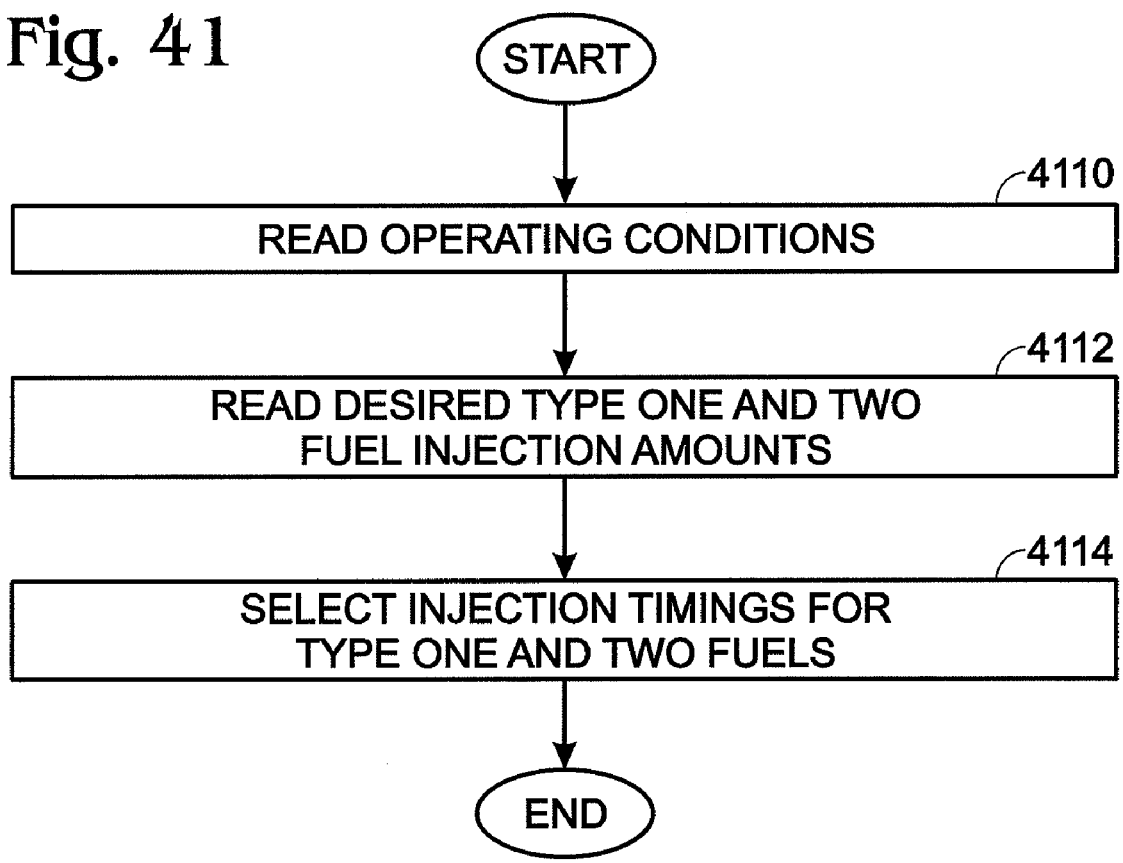
FIG. 41 shows a high level flow chart for selecting injection timing(s)

Referring now to FIG. 41, a routine is described for adjusting injection timing based on an amount of fuel types delivered to the engine cylinder. Further, the timing of delivery of more than one fuel type may be varied (e.g., interval between start of injection of the types, interval between end of injection of the types, overlap of injection, the timing of one fuel type, etc.) in response to pressure in the intake manifold of said engine, a time or number of cylinder events since the start of said engine, an atmospheric condition surrounding said engine (e.g., barometric pressure, humidity, and ambient air temperature), a temperature of the fuel injected by said first injector or the temperature of the fuel injected by said second injector, engine speed, engine load, coolant temperature, water fraction in the alcohol/water blend, desired ethanol fraction, knock sensor indication, the duration of fuel injection for a first injector type or a second injector type, or combinations of these and/or other factors. For example, each or both of an injection timing of a port injector and a direct injector for a common cylinder may vary with these operating conditions to vary an injection overlap, to vary vaporization, mixing, or others. As another example, the duration between start of injection between two injectors for a common cylinder may vary depending on the amount of fluid delivery by one or both of the injectors.

Specifically, in 4110 the routine reads operating conditions such as speed, load, coolant temperature, valve and/or cam timing, air temperature, humidity, barometric pressure, fuel temperature, etc. Then, in 4112, the routine reads a desired type 1 and type 2 desired fuel delivery amounts, and then selects the timings for type 1 and type 2 fuel injection based on the conditions of 4110 and the amounts of 4112. Thus, as the conditions of 4110 change and/or the amount of fuel types vary, injection timing of one or both fuel types may vary. As shown herein with regard to FIG. 42, various combinations of open valve injection via a port fuel injector and closed valve injection of a direct injector may be used. Further, when only a single injection source is active, different injection timing may be used than when more than one injection source is active. Further, the injection timings may overlap under some conditions and not overlap under other conditions.

Figure 42:
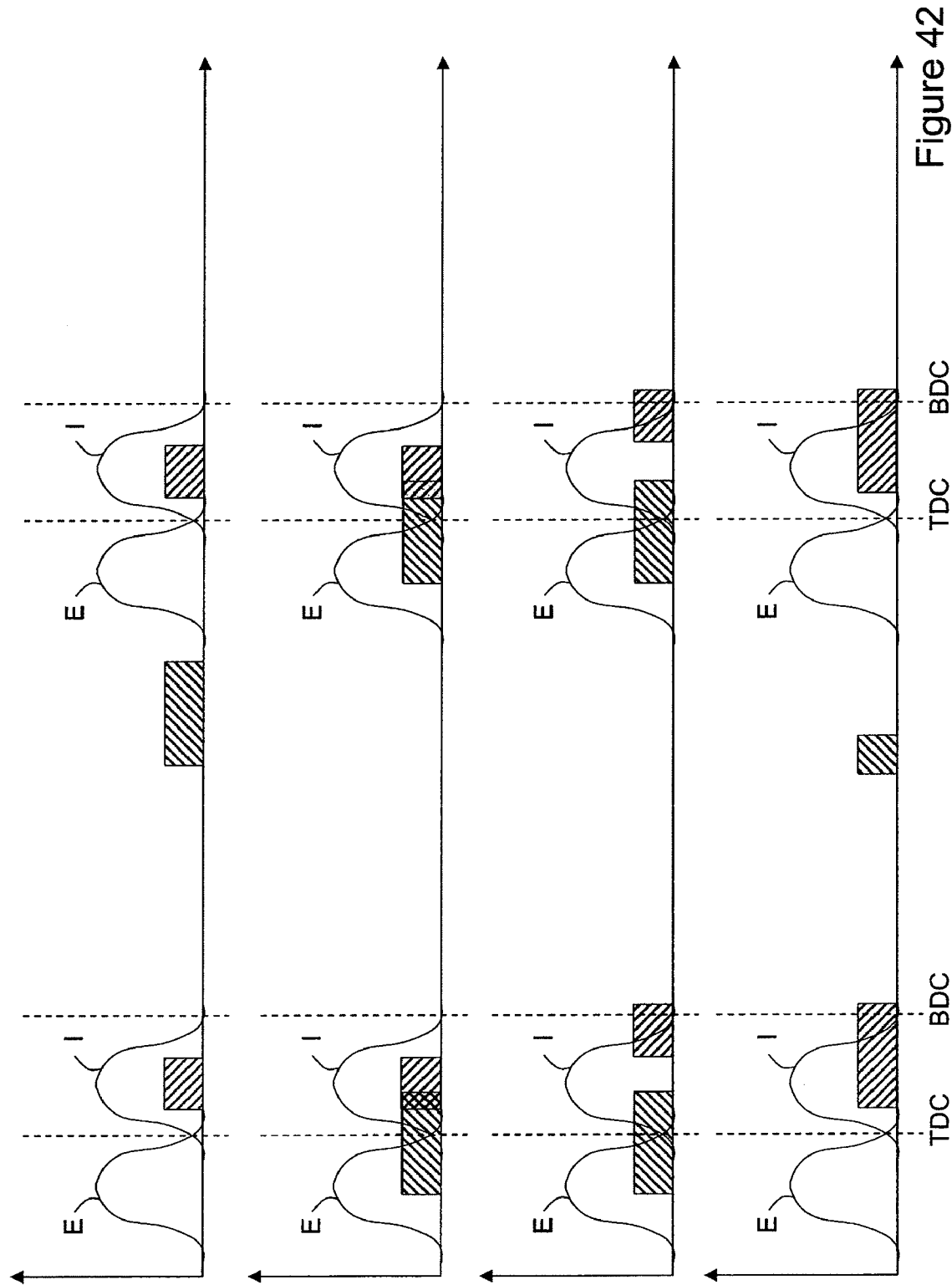
FIG. 42 shows a graph illustrating example injection timing operation.

FIG. 42 thus shows an example of port fuel injection of gasoline (or a blend thereof, cross-hatching from bottom left to upper right) and direct injection of ethanol (or a blend thereof, cross-hatching from upper left to bottom right). The top graph shows an example of closed valve injection of port fuel and open valve injection of direct fuel during an intake stroke. The next graph shows an example of both closed and open valve injection of port fuel and open valve injection of direct fuel during an intake stroke, where the injections partially overlap. The next graph shows an example of both closed and both open and closed valve injection of port fuel and open valve injection of direct fuel during an intake stroke, where the injections do not overlap and the direct fuel injection occurs at least partially during compression after the intake valve closes. Finally, the last graph shows an example of closed valve port injection and open valve injection of direct fuel during an intake stroke, where the injections do not overlap and the direct fuel injection occurs at least partially during compression after the intake valve closes. In the first three examples, the port fuel is greater in timing than the direct fuel, where the opposite is true in the last graph.

In one example, during idle conditions, open valve port injection may be used with a smaller amount of direct injection at least partially during a compression stroke to improve combustion stability, such as during a cold start.

Note that in one embodiment, two port fuel injectors may be used. In such a case, a routine similar to that of FIG. 41 may be used. In such a case, various combinations of open valve and closed valve injection via one or more port fuel injectors may be used. For example, when only a single injection source is active, different injection timing may be used than when more than one injection source is active. Further, the injection timings may overlap under some conditions and not overlap under other conditions.

Figure 43:
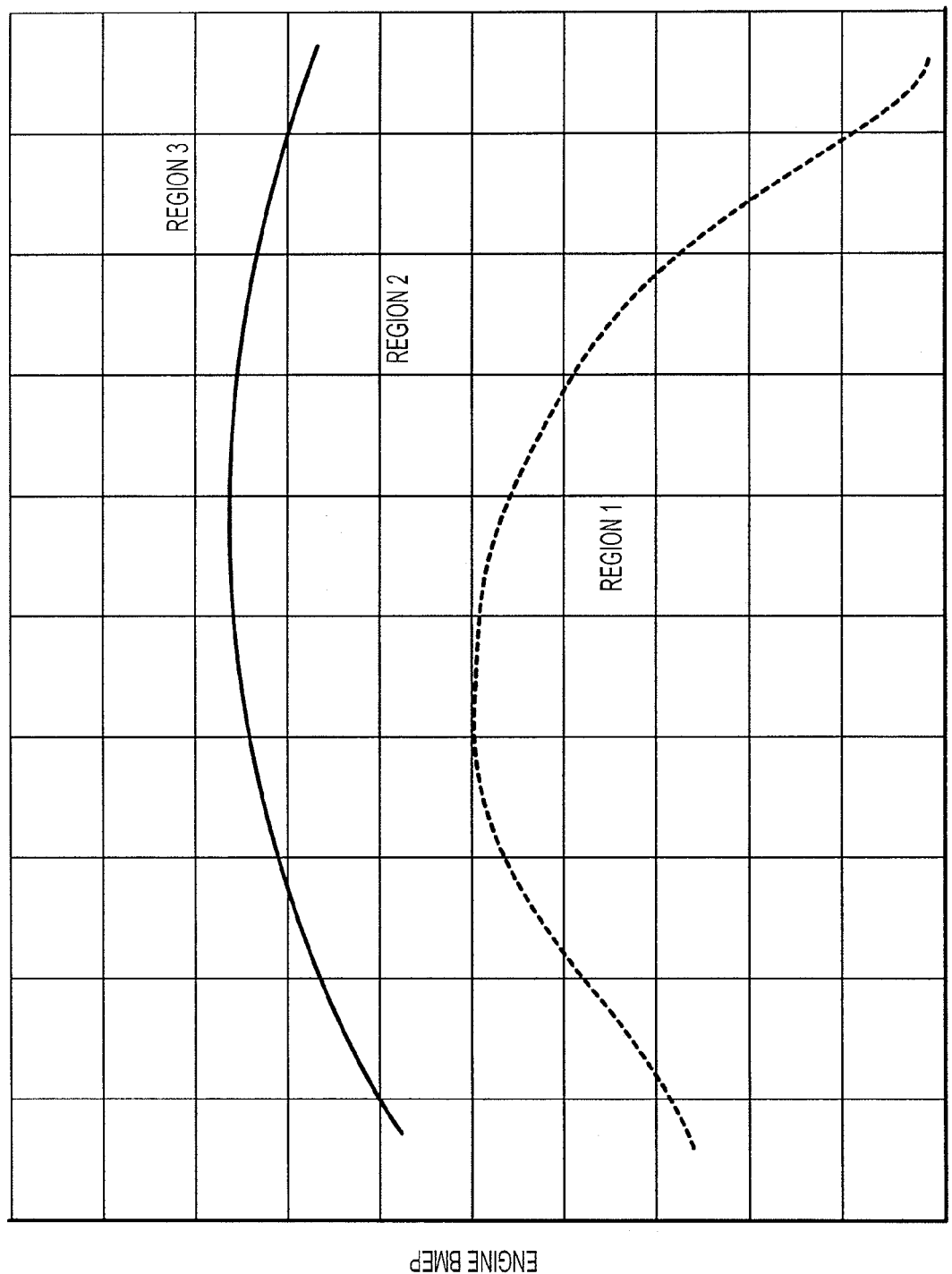
FIG. 43 shows a graph illustrating fuel types and injection timings for various engine speed and load regions.

One example approach for operating multiple port injectors is described with regard to FIG. 43, which shows a speed/load range with three regions (region 1, region 2, and region 3), where region 1 is below the dashed line, region 2 is between the dashed and solid lines, and region 3 is at or above the solid line. In one example, only a first fuel type (e.g., port gasoline injection) may be used in region 1 with closed, or partially closed, valve injection timing. Further, a combination of both injection types may be used in region 2 (e.g., port gasoline injection and ethanol injection, with each having closed and/or open valve injection timing). Specifically, in region 2, as load increases, the amount of fuel types injected may vary, e.g., by increasing type 2 injection and maintaining or decreasing type 1 injection. In one specific example, the injections ramp to only type 2 injection at wide open throttle conditions (the solid line, region 3) with open and/or closed valve injection timing.

Figure 44:
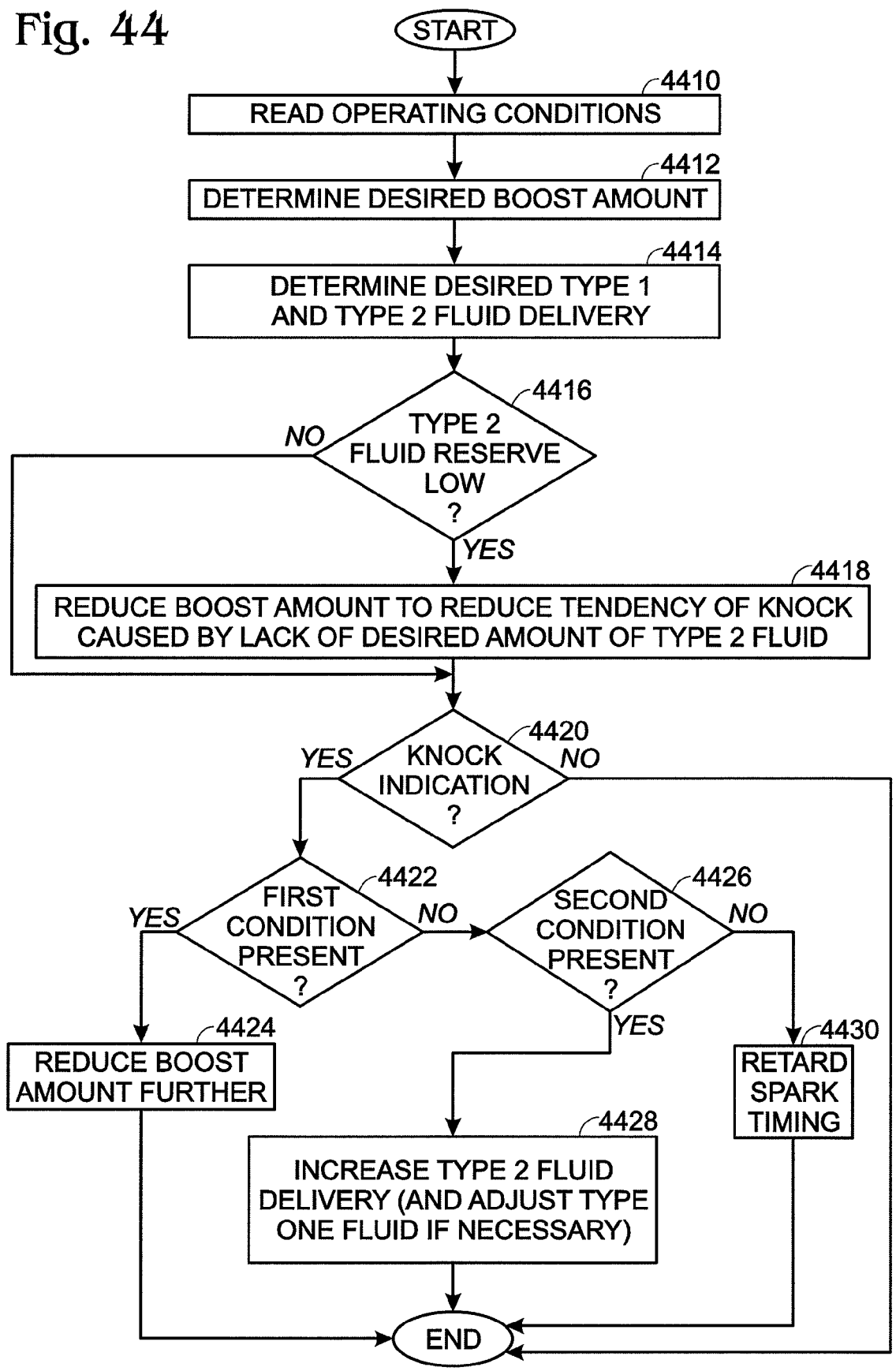
FIG. 44 shows a high level flow chart for controlling boost.

Referring now to FIG. 44, an example routine for controlling boosting (e.g., via a variable geometry turbocharger, electrically controlled supercharger, adjustable compressor bypass valve, or a waste gate) is described. Specifically, in 4410, the routine reads operating conditions, such as engine speed, fluid reserve levels of fuel types (e.g., of gasoline in a first tank and ethanol in a second tank, or blends thereof), desired engine output, temperature, etc. Then, in 4412, the routine determines a desired boost amount (e.g., desired position of a VGT, desired pressure ratio across a compressor, etc.). Then, the routine determines a desired type 1 and type 2 fluid delivery in 4414.

In 4416, the routine determines whether a type 2 fluid reserve is below a threshold value (for example, near empty, or the system is unable to provide the amount desired in 4414). If so, the routine continues to 4418 to reduce the boost amount to reduce a tendency of knock caused by lack of a desired amount of type 2 fluid, for example.

From 4418, or a no in 4416, the routine determines whether a knock indication is present in 4420, such as based on a knock sensor or other approach as noted herein. If so, the routine continues to 4422 to determine if a first condition is present. For example, the conditions may be a high boost presence, a temperature is above a threshold, or other. If so, the routine continues to 4424 to further reduce a boost amount. Otherwise, the routine continues to 4426 to identify if a second condition is present. If so, the routine continues to 4428 to increase a type 2 fluid delivered and adjust a type 1 fluid if necessary to control air-fuel ratio and/or engine torque. Otherwise, the routine continues to 4430 to retard spark timing.

In this way, boost can be adjusted and engine improved engine operation can be achieved under varying conditions.

It will be appreciated that the configurations, systems, and routines disclosed herein are exemplary in nature, and that these specific embodiments are not to be considered in a limiting sense, because numerous variations are possible. For example, the above approaches can be applied to V-6, I-3, I-4, I-5, I-6, V-8, V-10, V-12, opposed 4, and other engine types.

As another example, engine 10 may be a variable displacement engine in which some cylinders (e.g., half) are deactivated by deactivating intake and exhaust valves for those cylinders. In this way, improved fuel economy may be achieved. However, as noted herein, in one example injection using multiple types of fuel delivery (e.g., fuel composition or delivery location) can be used to reduce a tendency of knock at higher loads. Thus, by operating with direct injection of a fuel containing alcohol (such as ethanol or an ethanol blend)

during cylinder deactivation operation, it may be possible to extend a range of cylinder deactivation, thereby further improving fuel economy.

As will be appreciated by one of ordinary skill in the art, the specific routines described herein in the flowcharts and the specification may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these figures graphically represent code to be programmed into the computer readable storage medium in controller 12. Further still, while the various routines may show a "start" and "end" block, the routines may be repeatedly performed in an iterative manner, for example.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine, comprising:
a cylinder of the engine;
a first injector configured to inject a first substance to said cylinder;
a second injector configured to inject a second substance to said cylinder; and
a controller configured to commence combustion in the engine by injecting fuel into said cylinder, where said fuel is injected by only one of said first and second injectors during a start and where selection of said one injection is based on availability of at least one of the first and second substances.

2. The system of claim 1 wherein said first injector is a port injector.

3. The system of claim 1 wherein said second injector is a direct cylinder injector, and wherein said second substance includes ethanol.

4. The system of claim 1 wherein said second injector is a port injector.

5. The system of claim 1 wherein said start is a first combustion event from a non-firing condition.

6. The system of claim 1 wherein said start includes an engine warm-up.

7. The system of claim 1 wherein said start includes cold engine operation.

8. The system of claim 1 wherein said start includes a plurality of initial combustion events.

9. The system of claim 1 wherein said start includes engine cranking via a motor.

10. The system of claim 1 wherein said first substance and said second substance are each a fuel.

11. The system of claim 1 wherein said first substance includes gasoline and said second substance includes an alcohol, and where the availability includes a level of gasoline.

12. The system of claim 1 wherein said first substance includes gasoline and said second substance includes water.

13. The system of claim 1 wherein said first substance includes gasoline and said second substance includes water and ethanol.

14. The system of claim 1 wherein said start includes an engine re-start condition.

15. The system of claim 1 wherein said controller further performs an injection from the second of said injectors after engine coolant temperature reaches a threshold value.

16. A method for controlling an engine, the engine having a cylinder with a first fuel injector configured to inject a first substance to the cylinder, and a second injector configured to inject a second substance to the cylinder, the method comprising:
commencing combustion in the engine by injecting fuel into said cylinder, where said fuel is injected by only one of said first and second injectors during said start; and
enabling injection from an other of said first and second injectors in response to substance availability.

17. The method of claim 16 wherein said first injector is a direct cylinder injector and said second cylinder is a port injector, where only said port injector supplies fuel at least during a portion of said start, said first substance includes gasoline, and said second substance includes ethanol.

18. A system for an engine, comprising:
a cylinder of the engine;
a first direct injector configured to inject a first substance to said cylinder;
a second port injector configured to inject a fuel to said cylinder; and
a controller configured to perform combustion in the engine by injecting fuel into said cylinder, where said fuel is injected by said port injector during selected engine starting conditions, and injection by the first direct injector is enabled based at least on storage level of the fuel.

19. The system of claim 18 wherein said injection is further enabled based on temperature, and wherein said first substance includes ethanol.

20. A method for an engine having a cylinder with a direct injector and a port injector, comprising:
commencing combustion in the engine during an engine-cranking start by injecting fuel into said cylinder by only one of said port and direct injectors, said start being a first combustion event from a non-firing condition; and
enabling injection from another of said direct and port injectors in response to availability of an alcohol-based fuel and engine temperature.

* * * * *